(12) United States Patent
Sasaki et al.

(10) Patent No.: US 11,537,028 B2
(45) Date of Patent: Dec. 27, 2022

(54) ACCESSORY, IMAGE PICKUP APPARATUS ON WHICH SAME IS MOUNTABLE, AND CAMERA SYSTEM

(71) Applicant: CANON KABUSHIKI KAISHA, Tokyo (JP)

(72) Inventors: Kunihiko Sasaki, Tochigi (JP); Masahisa Tamura, Tochigi (JP); Toshinori Yamazaki, Tokyo (JP); Masayasu Shigematsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/182,755

(22) Filed: Feb. 23, 2021

(65) Prior Publication Data
US 2021/0200066 A1 Jul. 1, 2021

Related U.S. Application Data

(63) Continuation of application No. PCT/JP2018/032150, filed on Aug. 30, 2018.

(51) Int. Cl.
*G03B 17/14* (2021.01)
*G02B 7/02* (2021.01)
*G03B 17/56* (2021.01)

(52) U.S. Cl.
CPC ............ *G03B 17/14* (2013.01); *G02B 7/022* (2013.01); *G03B 17/565* (2013.01)

(58) Field of Classification Search
CPC ...... G03B 17/14; G03B 17/565; G02B 7/022; H04N 5/2258; H04N 5/232
See application file for complete search history.

(56) References Cited

U.S. PATENT DOCUMENTS

| | | | | |
|---|---|---|---|---|
| 4,307,954 A | * | 12/1981 | Ludwig | G03B 17/14 |
| | | | | 359/828 |
| 10,775,585 B2 | * | 9/2020 | Sasaki | H04N 5/23248 |
| 11,143,841 B2 | * | 10/2021 | Sasaki | H04N 5/2253 |
| 2018/0348606 A1 | * | 12/2018 | Honda | H01R 13/2471 |
| 2018/0348609 A1 | * | 12/2018 | Ueda | H04N 5/2254 |
| 2021/0181607 A1 | * | 6/2021 | Shigematsu | G03B 17/14 |

FOREIGN PATENT DOCUMENTS

| | | | | |
|---|---|---|---|---|
| JP | 2004-341265 A | | 12/2004 | |
| JP | 2012-78783 | * | 4/2012 | ............ G03B 17/14 |
| JP | 5041092 B2 | | 10/2012 | |
| JP | 2013-003389 A | | 1/2013 | |
| JP | 2014-038300 A | | 2/2014 | |
| JP | 2014-157248 A | | 8/2014 | |

\* cited by examiner

*Primary Examiner* — Christopher E Mahoney
(74) *Attorney, Agent, or Firm* — Canon U.S.A., Inc. I.P. Division

(57) ABSTRACT

An interchangeable lens assembly includes a plurality of lens-side claw portions configured to be engaged with a plurality of camera-side claw portions, and a lock pin groove portion into which a lock pin is inserted, a lens barrel, and a lens mount fixing member. When θ1 is an angle formed by a line passing through a fifth lens-side end and an optical axis, and a line passing through a center of the lock pin groove portion and the optical axis, and θ2 is an angle formed by a line passing through a fourth lens-side end and the optical axis, and a line that passes through the center of the lock pin groove portion and the optical axis, θ1 and θ2 satisfy a predetermined conditional expression.

51 Claims, 28 Drawing Sheets

ACCESSORY, IMAGE PICKUP APPARATUS ON WHICH SAME IS MOUNTABLE, AND CAMERA SYSTEM

CROSS-REFERENCE TO RELATED APPLICATIONS

This application is a Continuation of International Patent Application No. PCT/JP2018/032150, filed Aug. 30, 2018, which is hereby incorporated by reference herein in their entirety.

BACKGROUND OF THE INVENTION

Field of the Invention

The present invention relates to an accessory, an image pickup apparatus on which the accessory is mountable, and a camera system.

Background Art

A camera body and an interchangeable lens discussed in PTL 1 are known as a camera body serving as an image pickup apparatus and an interchangeable lens assembly serving as a camera accessory or an optical apparatus that can be detachably mounted to the camera body. In PTL 1, after the interchangeable lens assembly is inserted into the camera body in an insertion/removal phase, the interchangeable lens assembly is rotated in an attachment direction. This operation causes the lens interchangeable lens assembly to be set in a mounted phase, so that bayonet claw portions on the interchangeable lens assembly side and bayonet claw portions on the camera body side are coupled, and mounting of the interchangeable lens assembly to the camera body is completed.

In PTL 1, a lock pin that can be advanced and retracted in an optical axis direction of the interchangeable lens assembly is provided on the camera body side, and a lock pin groove portion, in which the lock pin is insertable is provided on the interchangeable lens assembly side. In PTL 1, insertion of the lock pin to the lock pin groove portion prevents the interchangeable lens assembly from being detached from the camera body in a case where the lock pin is not advanced or retracted.

An interchangeable lens assembly that is mounted on a camera body is required to be kept mounted on the camera body in a stable manner even in a case in which an external force, such as a vibration, is applied to the interchangeable lens assembly. However, in the interchangeable lens assembly described in PTL1, among three bayonet claw portions, the dispositional relationship between the lock pin groove portion and one of the two bayonet claw portions near the lock pin groove portion into which the lock pin is inserted, and the dispositional relationship between the lock pin groove portion and the other one of the two bayonet claw portions differ greatly. Accordingly, there is a concern that in PTL 1, it is difficult to keep the interchangeable lens assembly mounted to the camera body in a stable manner, when an external force in various directions is applied or when the orientation of the interchangeable lens assembly is changed.

CITATION LIST

Patent Literature

PTL1: Japanese Patent No. 5041092

SUMMARY OF THE INVENTION

One of the disclosures is directed to providing an accessory that is capable of being mounted on an image pickup apparatus in a more stable manner, an image pickup apparatus on which the accessory is mountable, and a camera system.

According to the one of the disclosures, an accessory is detachably mountable to an image pickup apparatus including a first mount portion and a pin, the first mount portion including a plurality of first bayonet claw portions. The accessory includes a second mount portion that includes a plurality of second bayonet claw portions configured to be engaged with the plurality of first bayonet claw portions, and a recess into which the pin is inserted when the accessory is mounted to the image pickup apparatus, an accessory body, and a mount fixing member for fixing the second mount portion to the accessory body. When, viewed in a central axis direction of the second mount portion, a recess side is a side on which the recess is provided with respect to a boundary line, the boundary line being a line that is orthogonal to a line passing through a center of the recess and a central axis of the second mount portion and that passes through the central axis of the second mount portion, and when, among the plurality of second bayonet claw portions, two second bayonet claw portions at least a part of which is on the recess side are denoted as a first recess side bayonet claw portion and a second recess side bayonet claw portion, $\theta 1 > \theta 2$, and $1.00 < \theta 1/\theta 2 \le 1.40$ are satisfied, where $\theta 1$ is an angle formed between a line that passes through the central axis of the second mount portion and an end of the first recess side bayonet claw portion, the end being close to the recess, and a line that passes through the center of the recess and the central axis of the second mount portion, and $\theta 2$ is an angle formed between a line that passes through the central axis of the second mount portion and an end of the second recess side bayonet claw portion, the end being close to the recess, and a line that passes through the center of the recess and the central axis of the second mount portion.

Further features of the present invention will become apparent from the following description of exemplary embodiments with reference to the attached drawings.

DESCRIPTION OF EMBODIMENTS (Block Configuration of Interchangeable Lens Assembly and Camera Body)

Figure 1:
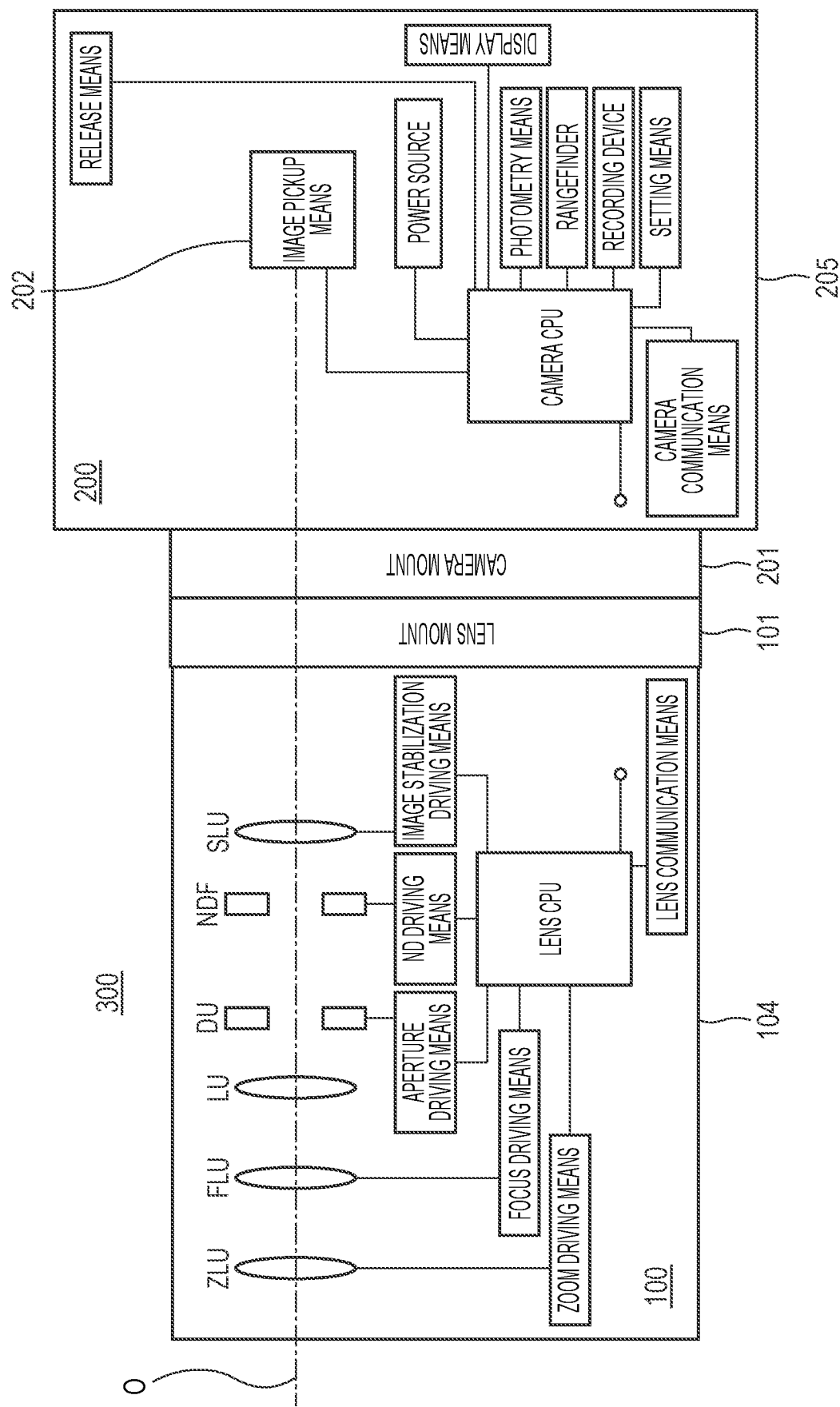
FIG. 1 is a block diagram of a camera body and an interchangeable lens assembly according to an exemplary embodiment of the present invention.

Referring first to FIG. 1, a block configuration of an interchangeable lens assembly 100 and a camera body 200 according to the present exemplary embodiment will be described. FIG. 1 is a block diagram of a camera system 300 including the interchangeable lens assembly 100 (optical equipment, an accessory, a lens apparatus) and the camera body 200. In FIG. 1 and the diagrams described hereinafter, nonessential components, components related to the design, and the like are omitted. The interchangeable lens assembly 100 can be mounted to and dismounted from the camera body 200.

The camera body 200 includes image pickup means 202 that is a photoelectric conversion element or an image pickup element that includes a CCD and a CMOS and converts optical information about a subject obtained through the interchangeable lens assembly 100 into an electric signal (the image pickup means 202 performs photoelectric conversion of the image of the subject). The camera body 200 further includes a camera mount (a first mount portion) 201 to be connected to a lens mount (a second mount portion) 101 on an interchangeable lens assembly 100 side, and a camera housing 205 that holds the image pickup means 202 and the like.

Other than the image pickup means 202 and the camera mount 201, the camera body 200 also includes a camera communication means that communicates with a lens communication means on the interchangeable lens assembly 100 side, a photometry means that performs photometry, a rangefinder that performs ranging, a recording device that records data about a photograph and a moving image that have been captured. The camera body 200 further includes setting means that sets photographing conditions, such as a shutter speed, release means that the user can operate, display means that displays various pieces of information to the user, and a power source. Moreover, the camera body 200 further includes a camera CPU that is control means for controlling the image pickup means 202 and the like.

The interchangeable lens assembly 100 includes a lens barrel 104, and the lens mount (a camera accessory mount) 101. An electric communication between the interchangeable lens assembly 100 and the camera body 200 is performed by the lens communication means and the camera communication means that include a plurality of electrical contacts which are electrically connectable to the counterpart. Various types of information, such as power supplying information and control information, can be exchanged between the camera CPU and a lens CPU.

Other than the lens mount 101, the interchangeable lens assembly 100 includes a zooming lens unit ZLU that moves when zooming, a focusing lens unit FLU that moves when focusing, and a shift lens unit SLU that moves to perform an image blur correction. The interchangeable lens assembly 100 further includes a lens unit LU other than the zooming lens unit ZLU, the focusing lens unit FLU, and the shift lens unit SLU, an aperture unit DU, and a ND filter NDF.

The interchangeable lens assembly 100 further includes zoom driving means that drives the zooming lens unit ZLU, focus driving means that drives the focusing lens unit FLU, and an aperture driving means that drives the aperture unit DU. The interchangeable lens assembly 100 further includes an ND driving means that drives the ND filter NDF, and an image stabilization driving means that drives the shift lens unit SLU. The interchangeable lens assembly 100 further includes the lens communication means and the lens CPU serving as a control means that controls the lens communication means and each driving means described above.

(Configuration of Lens-Side Mount Portion and Camera-Side Mount Portion)

Figure 2:
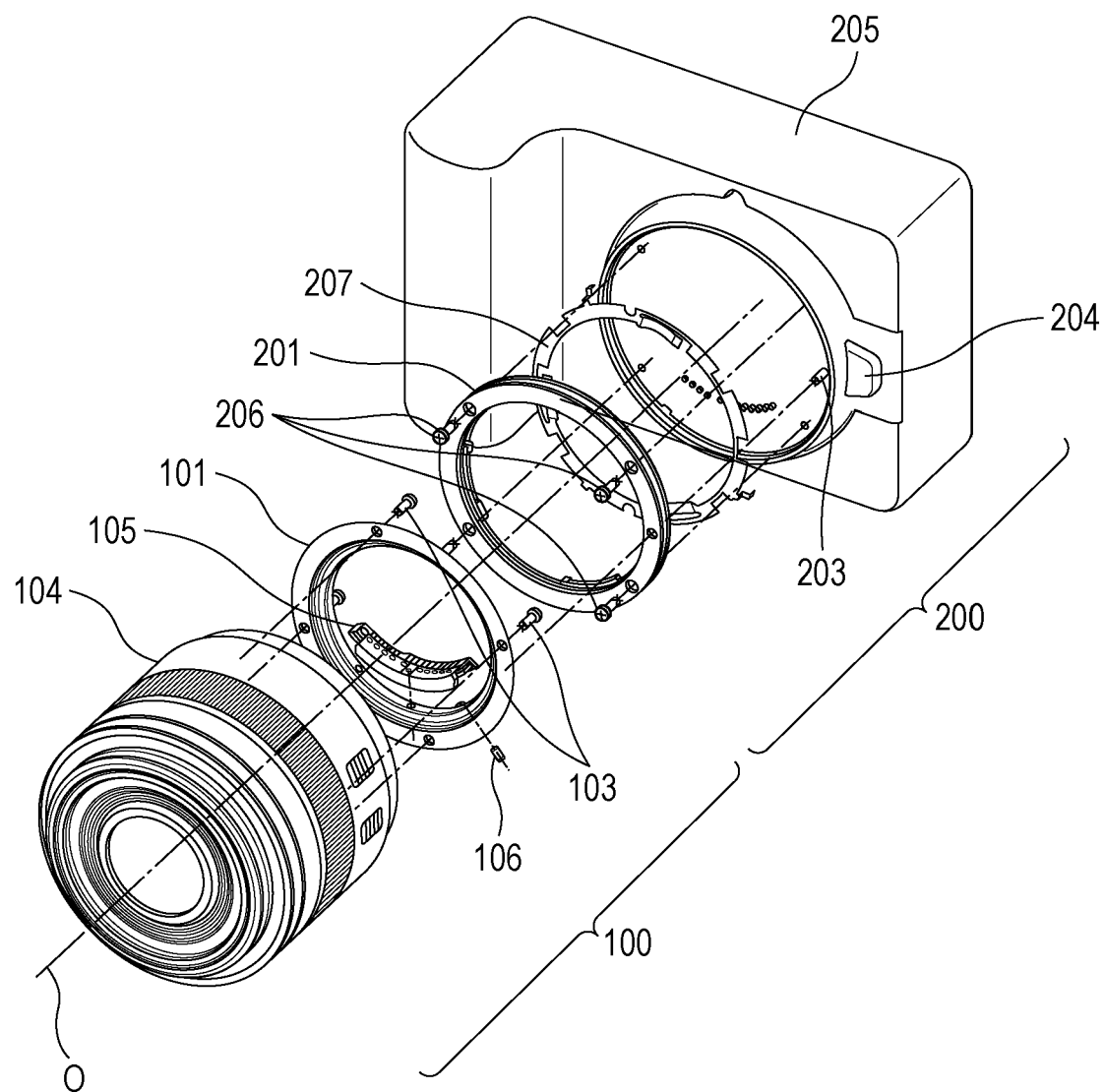
FIG. 2 is an exploded perspective view of mount portions of the exemplary embodiment of the present invention.

Referring next to FIG. 2, the mount portions of the interchangeable lens assembly 100 and the camera body 200 will be described. FIG. 2 is an exploded perspective view of the mount portions of the interchangeable lens assembly 100 and the camera body 200.

An optical axis O is an axis that indicates a center of a light flux guided by the interchangeable lens assembly 100. The light flux travels from the subject ideally confronting directly the interchangeable lens assembly 100. A lock pin (a pin, an insertion portion, a convex portion) 203 is an abutting pin (a restricting portion) that, in a state in which the lens mount 101 and the camera mount 201 are in a mounted state, restricts the cancellation of the mounted state. The lock pin 203 is capable of advancing and retreating in a direction parallel to the optical axis O and has a biasing structure that applies biasing force in the advancing direction at all times.

When the interchangeable lens assembly 100 is in an insertion-removal state with respect to the camera body 200, the lock pin 203 is pushed into a retreat position by being abutted against the lens mount 101. At this time, the lens mount 101 and the camera mount 201 are in contact with each other. In the mounted state, the lock pin 203 enters (is inserted in) a lock pin groove portion (an insertion-receiving portion, a groove portion, a recess) 102 of the lens mount 101, thus restricting the cancellation of the mounted state with the lock pin 203 and the lock pin groove portion 102.

In cancelling the mounted state to remove the interchangeable lens assembly, a release operation member 204 is pushed in, the lock pin 203 is moved from an advance position to a retreat position, and the interchangeable lens assembly 100 is rotated to an unlocking position. In a state in which contact surfaces of the lens mount 101 and the camera mount 201 are in contact with each other (the insertion-removal state), the interchangeable lens assembly 100 and the camera body 200 are relatively moved from the unlocking position to a locking position to be connected to each other (the mounted state).

As described above, the camera housing 205 is a base material that holds each portion of the camera body 200. More specifically, referring to FIG. 2, the camera housing 205 holds the camera mount 201, a holding member of the camera-side electrical contacts (camera-side terminals, first terminals) that are each communication means, camera mount fixing members 206, and a lens mount biasing member 207. The lens mount biasing member 207 is a biasing means that pulls in lens claw portions provided in the lens mount 101 described later towards a camera mount 201 side and is sandwiched in a backlash between the camera mount 201 and the camera housing 205.

The lens mount 101 is fixed to the lens barrel (an accessory main body) 104 with lens mount fixing members (mount fixing members) 103. A lens-contact-portion (lens-side terminal or second terminal) holding member 105 is a holding member that holds a plurality of electrical contacts (terminals) provided on the interchangeable lens assembly 100 side, and is fixed to the lens mount 101 with a lens-contact-portion-holding-member fixing member 106.

Disposition of Bayonet Claw Portions of Lens-Side Mount

Figure 3A:
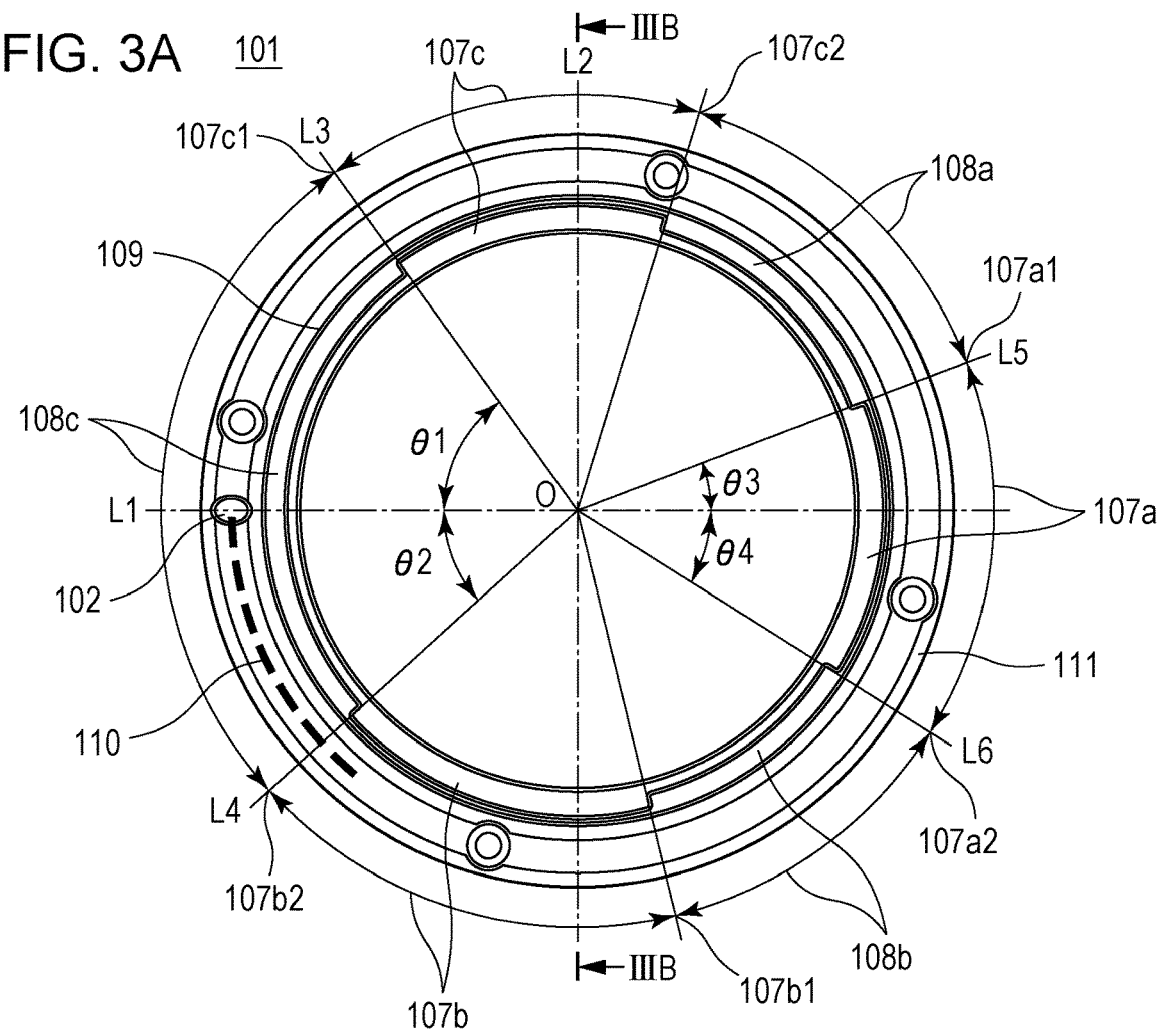
FIG. 3A is a diagram of a lens mount in a normal position viewed from an image pickup plane side.

Referring next to FIG. 3A, a phase (disposition) of lens-side bayonet claw portions of the lens mount 101 will be described. In the present exemplary embodiment, the bayonet claw portions on the lens-side are referred to as lens-side claw portions, and the bayonet claw portions on the camera-side is referred to as camera-side claw portions.

FIG. 3A is a diagram of the lens mount 101 when viewed from an image pickup plane side when the lock pin groove portion 102 in the mounted state, in which the lock pin 203 is engaged with the lock pin groove portion 102, is at a position at which the lock pin groove portion 102 is positioned on the left side when viewed from the image pickup plane side (hereinafter, referred to as a normal position). Note that in the present exemplary embodiment, the lens side can translate into an optical equipment (accessory) side, and the camera side can translate into an image pickup apparatus side.

Figure 3B:
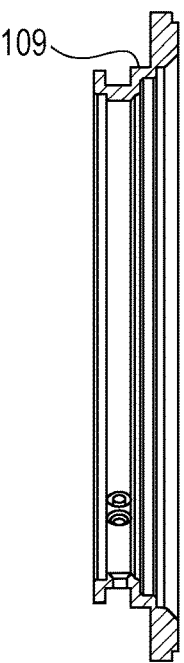
FIG. 3B is a cross sectional view of a lens mount, taken along line IIIB-IIIB.

As illustrated in FIG. 3A, the lens mount 101 includes a first lens-side claw portion 107a, a second lens-side claw portion 107b, and a third lens-side claw portion 107c that have dimensions in a radial direction and a circumferential direction of an opening included in the lens mount 101 when viewed in the optical axis O direction. The first lens-side claw portion 107a, the second lens-side claw portion 107b, and the third lens-side claw portion 107c are included in the interchangeable lens assembly 100, and are a plurality of lens-side claw portions (a plurality of second engagement portions or a plurality of second bayonet claw portions) capable of engaging with a plurality of camera-side claw portions (a plurality of first engagement portions or a plurality of first bayonet claw portions). Furthermore, the lens mount 101 includes a lens-side diameter fitting portion 109 to be served as a restriction in a direction orthogonal to the optical axis when the lens mount 101 is attached to the camera mount 201, as illustrated in FIG. 3B.

In the description hereinafter, a portion between the third lens-side claw portion 107c and the first lens-side claw portion 107a is referred to as a first lens-side cutaway portion (a first cutaway portion, a first recess) 108a, and a portion between the first lens-side claw portion 107a and the second lens-side claw portion 107b is referred to as a second lens-side cutaway portion (a second cutaway portion, a second recess) 108b. Furthermore, a portion between the second lens-side claw portion 107b and the third lens-side claw portion (a third cutaway portion, a third recess) 107c is referred to as a third lens-side cutaway portion 108c. Furthermore, one end of the first lens-side claw portion 107a is referred to as a first lens-side end 107a1 and the other end is referred to as a second lens-side end 107a2. Furthermore, the lens-side ends of the lens-side claw portions are referred to as a third lens-side end 107b1, a fourth lens-side end 107b2, a fifth lens-side end 107c1, and a sixth lens-side end 107c2 in the clockwise direction in FIG. 3A from the second lens-side end 107a2.

As illustrated in FIG. 3A, the first lens-side claw portion 107a is disposed opposite to the lock pin 203 with the optical axis O in between in a state in which the first lens-side claw portion 107a is mounted at a normal position at which the lock pin 203 is positioned on the left side when viewed from a photographer side. Furthermore, the second lens-side claw portion 107b and the third lens-side claw portion 107c are sequentially disposed in the clockwise direction from the first lens-side claw portion 107a.

(Configuration to Mount Interchangeable Lens Assembly 100 on Camera Body 200 in Further Stable Manner)

Dispositions of the lens-side claw portions to mount the interchangeable lens assembly 100 onto the camera body 200 in a further stable manner will be described. Lines and angles needed to describe the dispositions of the lens-side claw portions will be defined first.

A line passing the center of the lock pin groove portion 102 and a central axis of the interchangeable lens assembly 100, in other words, the optical axis O, when viewed in a central axis direction of the interchangeable lens assembly 100 (when viewed in a central axis direction of the lens mount 101), in other words, when viewed in an optical axis direction of the interchangeable lens assembly 100 is referred to as line L1 (a reference line). Note that line L1 may be a line that passes the center of the lock pin 203 and the optical axis O. The central axis of the interchangeable lens assembly 100 or a central axis of the lens mount 101 may be a central axis of an opening of the lens mount 101.

A line that is orthogonal to line L1 and that passes the optical axis O is referred to as line L2. Furthermore, a side on which the lock pin groove portion 102 is provided with respect to line L2 serving as a boundary line, in other words, the left side of line L2 in FIG. 3A is referred to a lock pin groove portion side (an insertion-receiving portion side, a groove portion side, a recess side).

Furthermore, among the lens-side claw portions, the lens-side claw portions that each have at least a portion thereof disposed on the lock pin groove portion side are referred to as a first insertion-receiving portion-side engagement portion (a first recess-side bayonet claw portion, a first groove portion side bayonet claw portion) and a second insertion-receiving portion-side engagement portion (a second recess-side bayonet claw portion, a second groove portion side bayonet claw portion). Referring to FIG. 3A, the first insertion-receiving portion-side engagement portion is the third lens-side claw portion 107c, and the second insertion-receiving portion-side engagement portion is the second lens-side claw portion 107b.

An angle formed between line L1 and line L3 is represented by θ1. Line L3 passes the optical axis O and the fifth lens-side end 107c1, which is a lens-side end of the first insertion-receiving portion-side engagement portion on the lock pin groove portion 102 side. An angle formed between line 1 and line L4 is represented by θ2. Line L4 passes the optical axis O and the fourth lens-side end 107b2, which is a lens-side end of the second insertion-receiving portion-side engagement portion on the lock pin groove portion 102 side.

Here, the interchangeable lens assembly 100 satisfies $$0.65 \leq \theta1/\theta2 \leq 1.35. \tag{1}$$

In the present exemplary embodiment, θ1=54° and θ2=42°, and θ1/θ2=1.29; accordingly, conditional expression (1) is satisfied. In the present exemplary embodiment, θ1 is larger than θ2. In such a case, conditional expression (1) becomes 1.00<θ1/θ2≤1.35. Note that the values θ1 and θ2 may be the same and, in such a case, the value of conditional expression (1) becomes 1.00. In other words, in a case where θ1≥θ2, conditional expression (1) becomes 1.00≤θ1/θ2≤1.35.

Note that interchangeable lens assembly 100, more preferably, satisfies $$0.70 \leq \theta1/\theta2 \leq 1.30. \tag{1a}$$

Note that the lower limit of conditional expression (1a) may be 0.80 or 0.90. Moreover, conditional expression (1) may be 0.60 θ1/θ2≤1.40. In the exemplary embodiment in which θ1 is larger than θ2, this conditional expression (1a) becomes 1.00<θ1/θ2≤1.40.

As illustrated in FIG. 3A in which the accessory is positioned at the normal position, the angle θ2 on a gravity direction side with respect to the reference line L1 is smaller than angle θ1 on a side opposite to the gravity direction side with respect to the reference line L1. In other words, when the accessory is at the normal position, the second groove portion side bayonet claw portion is positioned on the gravity direction side with respect to the first groove portion side bayonet claw portion. With such a magnitude correlation of θ1 and θ2, a front end of the interchangeable lens assembly 100 at the normal position can be prevented from tilting in the gravity direction.

In other words, in the interchangeable lens assembly 100, the second lens-side claw portion 107b and the third lens-side claw portion 107c are disposed in a substantially uniform manner when viewed from the lock pin groove portion 102. In yet other words, the lock pin groove portion 102 is provided at or near a middle of a region between the second lens-side claw portion 107b and the third lens-side claw portion 107c in the interchangeable lens assembly 100. Providing of the interchangeable lens assembly 100 having such a configuration enables the interchangeable lens assembly 100 to be mounted onto the camera body 200 in a more stable manner.

The lock pin 203 and the lock pin groove portion 102, the second lens-side claw portion 107b, and the third lens-side claw portion 107c that fix the position of the interchangeable lens assembly 100 when the interchangeable lens assembly 100 is mounted on the camera body 200 are disposed in a well-balanced manner. Accordingly, the interchangeable lens assembly 100 can be mounted onto the camera body 200 in a more stable manner even when an external force from various directions is applied to the interchangeable lens assembly 100 or when the orientation of the interchangeable lens assembly 100 is changed.

More preferably, the interchangeable lens assembly 100 further satisfies the following condition. It is more preferable that, in addition to the first insertion-receiving portion-side engagement portion and the second insertion-receiving portion-side engagement portion described above, the plurality of lens-side claw portions includes an opposite-side engagement portion described next. The opposite-side engagement portion is a lens-side claw portion with the both lens-side ends thereof provided on the side opposite to the lock pin groove portion side with respect to line L2 that is a boundary line. In other words, the opposite-side engagement portion is a lens-side claw portion with the both lens-side ends thereof provided on the right side from line L2 in FIG. 3A. In the present exemplary embodiment, the first lens-side claw portion 107a is the opposite-side engagement portion. As illustrated in FIG. 3A, the both ends of the opposite-side engagement portion are positioned on the right side of line L2.

Furthermore, line L1 and the opposite-side engagement portion overlap. In addition to the configuration described above in which the lock pin groove portion 102 is provided at or near the middle of the region between the second lens-side claw portion 107b and the third lens-side claw portion 107c, the opposite-side engagement portion that is positioned at the position described above produces the following effect. Specifically, in the present exemplary embodiment, when the interchangeable lens assembly 100 is mounted onto the camera body 200, the lock pin 203 and the lock pin groove portion 102, and each lens-side claw portion that fix the position of the interchangeable lens assembly 100 are disposed uniformly at intervals of substantially 90°. Accordingly, the interchangeable lens assembly 100 can be mounted on the camera body 200 in a more stable manner.

Furthermore, an angle formed between line L1 and line L5 is represented as θ3. Line L5 passes the optical axis O and the first lens-side end 107a1, which is a lens-side end of the first lens-side claw portion 107a, which is the opposite-side engagement portion described above, on the third lens-side claw portion 107c side. Furthermore, an angle formed between line L1 and line L6 is represented by θ4. Line L6 passes the optical axis O and the second lens-side end 107a2, which is a lens-side end of the first lens-side claw portion 107a on the second lens-side claw portion 107b side. The interchangeable lens assembly 100 preferably satisfies $$0.60 \leq \theta3/\theta4 \leq 0.90, \tag{2}$$

or $$0.60 \leq \theta3/\theta4 \leq 0.80. \tag{2a}$$

In other words, when the first lens-side claw portion 107a is divided in the up-down direction in FIG. 3A with line L1, the portion on the lower side is preferably slightly longer than the portion on the upper side. Note that the upper limit of conditional expression (2a) may be 0.70. In the present exemplary embodiment, since θ3=21°, θ4=32°, θ3/θ4=0.66, conditional expression (2) is satisfied. In the present exemplary embodiment, θ4 is larger than θ3.

When θ3/θ4 exceeds the upper limit of conditional expression (2), the portion on the lower side of the first lens-side claw portion 107a that is divided by line L1 is, with respect to line L1, in other words, with respect to the lock pin groove portion 102, excessively longer than the portion on the upper side. In such a state, the length of the second lens-side cutaway portion 108b needs to be reduced, and a length of a second camera-side claw portion 208b described later needs to be reduced accordingly. As a result, the area of the region in which the lens-side claw portion and the camera-side claw portion engage with each other is reduced, and thus, it may not be possible to mount the interchangeable lens assembly 100 onto the camera body 200 in a stable manner.

When θ3/θ4 falls below the lower limit of conditional expression (2), an effect resulting from the portion on the lower side of the first lens-side claw portion 107a that is divided by line L1 being longer than the portion on the upper side thereof, which will be next described, may not be sufficiently obtained.

Generally, in many cases, imaging is performed using the camera system 300 while the lock pin groove portion 102 is at the normal position, that is, on the left side when viewed from an image pickup means 202 side. When the camera system 300 is at the normal position, the downward direction in the sheet surface of FIG. 3A is the gravity direction. Accordingly, in order to prevent the interchangeable lens assembly 100 at the normal position from tilting to the camera body 200 in a direction approaching the ground surface by its own weight, it is preferable that the portion on the lower side of the first lens-side claw portion 107a that is divided by line L1 is longer than the portion on the upper side.

Furthermore, as illustrated in FIG. 3A, both the third lens-side claw portion 107c, which is the first insertion-receiving portion-side engagement portion, and the second lens-side claw portion 107b, which is the second insertion-receiving portion-side engagement portion, overlap line L2, which is the boundary line described above. Such a configuration enables a change in the orientation in which the interchangeable lens assembly 100 tilts to be prevented or reduced.

Furthermore, more preferably, the interchangeable lens assembly 100 further satisfies the following condition. Specifically, the interchangeable lens assembly 100 satisfies $$90°<θ1+θ2<180°. \quad (3)$$

The configuration satisfying conditional expression (3) is significant of the angle between the second lens-side claw portion 107b and the third lens-side claw portion 107c being an obtuse angle. As described above, in the present exemplary embodiment, θ1 is equal to 54°, θ2 is equal to 42°, and θ1+θ2 is equal to 96°. The upper limit of conditional expression (3) may be 120° or 100°.

The angle between the second lens-side claw portion 107b and the third lens-side claw portion 107c being an obtuse angle is significant of the second lens-side claw portion 107b and the third lens-side claw portion 107c being apart from each other to some extent. As illustrated in FIG. 3A, the lock pin groove portion 102 is provided between the second lens-side claw portion 107b and the third lens-side claw portion 107c.

In the present exemplary embodiment, the lock pin groove portion 102 is provided in a region between the second lens-side claw portion 107b and the third lens-side claw portion 107c, which are apart from each other to some extent, in other words, the lock pin groove portion 102 is provided in a region having a backlash to some extent. Moreover, the lock pin groove portion 102 is provided at the third lens-side cutaway portion 108c (in a region where the third lens-side cutaway portion 108c provided) between the second lens-side claw portion (the second recess-side bayonet claw portion) 107b and the third lens-side claw portion (the first recess-side bayonet claw portion) 107c, as described above. Accordingly, in the present exemplary embodiment, when the interchangeable lens assembly 100 is mounted on the camera body 200, biasing force from the lock pin 203 is received in the region having the backlash to some extent. Thus, in the present exemplary embodiment, abrasion in the portion where the lock pin 203 slides in the lens mount 101 can be further reduced or prevented resulting from the biasing force from the lock pin 203. Furthermore, in the present exemplary embodiment, the portion between the second lens-side claw portion 107b and the third lens-side claw portion 107c, in other words, the third lens-side cutaway portion 108c is longer than the other lens-side cutaway portions; accordingly, the abrasion described above can be further reduced or prevented.

Furthermore, in the present exemplary embodiment, $$40°<θ1<70°, \text{ and } 40°<θ2<70° \quad (4)$$

are satisfied. In other words, in the present exemplary embodiment, the second lens-side claw portion 107b and the third lens-side claw portion 107c are disposed in a well-balanced manner with respect to the lock pin groove portion 102; accordingly, as described above, the interchangeable lens assembly 100 can be mounted on the camera body 200 in a further stable manner. The upper limit of conditional expression (4) may be 60°.

Furthermore, since the second lens-side claw portion 107b and the third lens-side claw portion 107c overlap line L2 which is a boundary line, the second lens-side claw portion 107b and the third lens-side claw portion 107c can be disposed in a well-balanced manner with respect to the lock pin groove portion 102.

(Disposition of Bayonet Claw Portions of Camera-Side Mount)

Figure 4A:
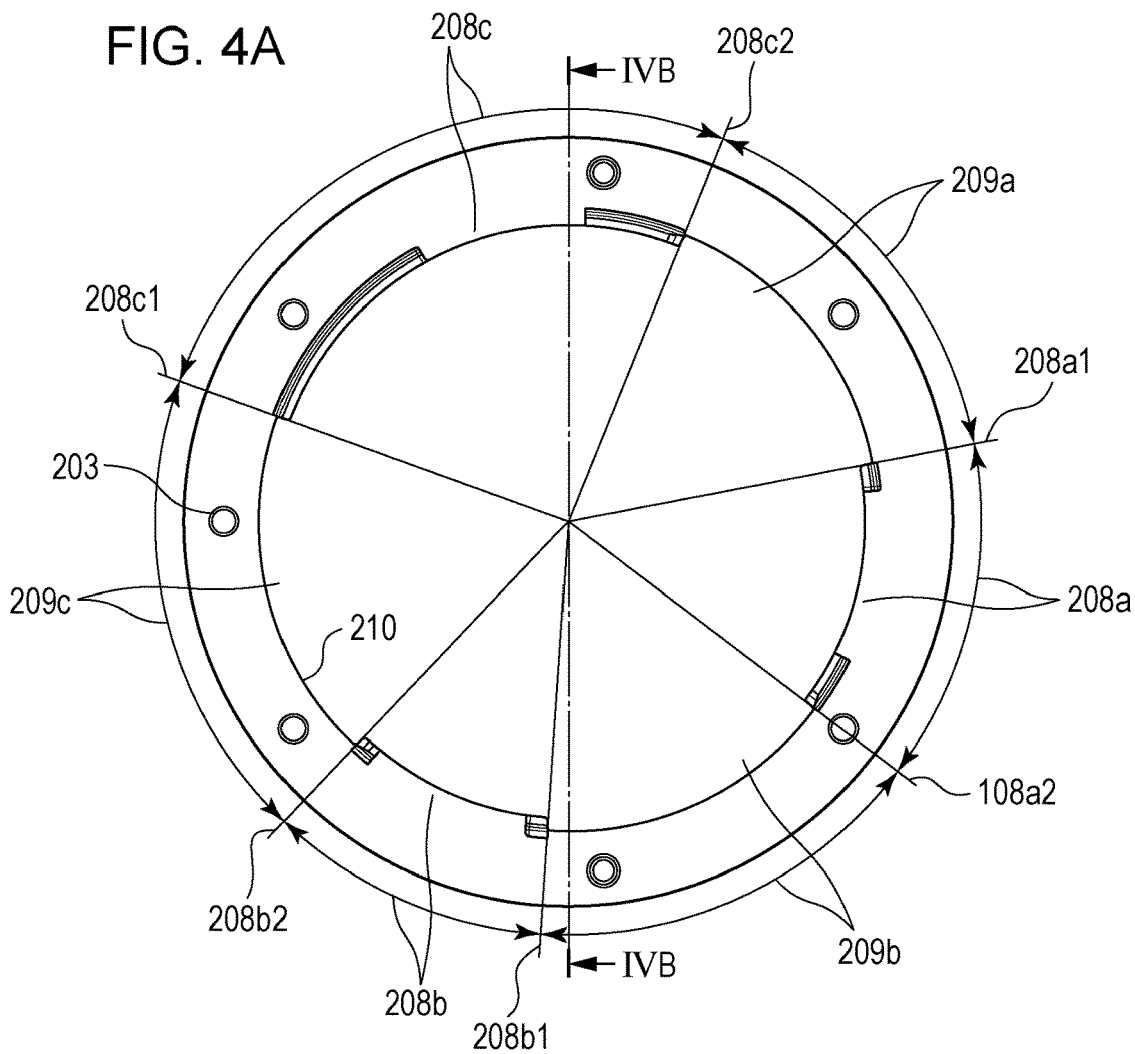
FIG. 4A is a diagram of a camera mount in a normal position viewed from an image pickup plane side.

Referring next to FIG. 4A, a phase of the camera-side claw portions of the camera mount 201 (disposition) will be described. FIG. 4A is a diagram of the camera mount 201 in a normal position state when viewed from the image pickup plane side of the camera body 200.

As illustrated in FIG. 4A, when viewed in the optical axis O direction, the camera mount 201 includes a first camera-side claw portion (a third bayonet claw portion) 208a, the second camera-side claw portion (a fourth bayonet claw portion) 208b, and a third camera-side claw portion (a fifth bayonet claw portion) 208c that have each a dimension in the radial direction and the circumferential direction of an opening included in the camera mount 201. The first camera-side claw portion 208a, the second camera-side claw portion 208b, and the third camera-side claw portion 208c are a plurality of first engagement portions included in the camera body 200. Furthermore, the camera mount 201 includes a camera-side diameter fitting portion 210 that becomes a restriction in a direction orthogonal to the optical axis when the lens mount 101 is attached to the camera mount 201. When the lens mount 101 is attached to the camera mount 201, this camera-side diameter fitting portion 210 and the foregoing lens-side diameter fitting portion 109 described above are diametrically fitted to each other.

In the description hereinafter, a portion between the third camera-side claw portion 208c and the first camera-side claw portion 208a is referred to as a first camera-side cutaway portion 209a, and a portion between the first camera-side claw portion 208a and the second camera-side claw portion 208b is referred to as a second camera-side cutaway portion 209b. Furthermore, a portion between the second camera-side claw portion 208b and the third camera-side claw portion 208c is referred to as a third camera-side cutaway portion 209c. Furthermore, one end of the first camera-side claw portion 208a is referred to as a first camera-side end 208a1 and the other end is referred to as a second camera-side end 208a2. Furthermore, camera-side ends of the camera-side claw portions in the clockwise direction in FIG. 4A from the second camera-side end 208a2 are referred to as a third camera-side end 208b1, a fourth camera-side end 208b2, a fifth camera-side end 208c1, and a sixth camera-side end 208c2.

In the present exemplary embodiment, among the camera-side claw portions, the first camera-side claw portion 208a is positioned on a substantially opposite side of the lock pin 203 with the optical axis O in between when the camera mount 201 at the normal position is viewed from the photographer side.

(Operation of Attaching Interchangeable Lens Assembly 100 to Camera Body 200)

Figure 5:
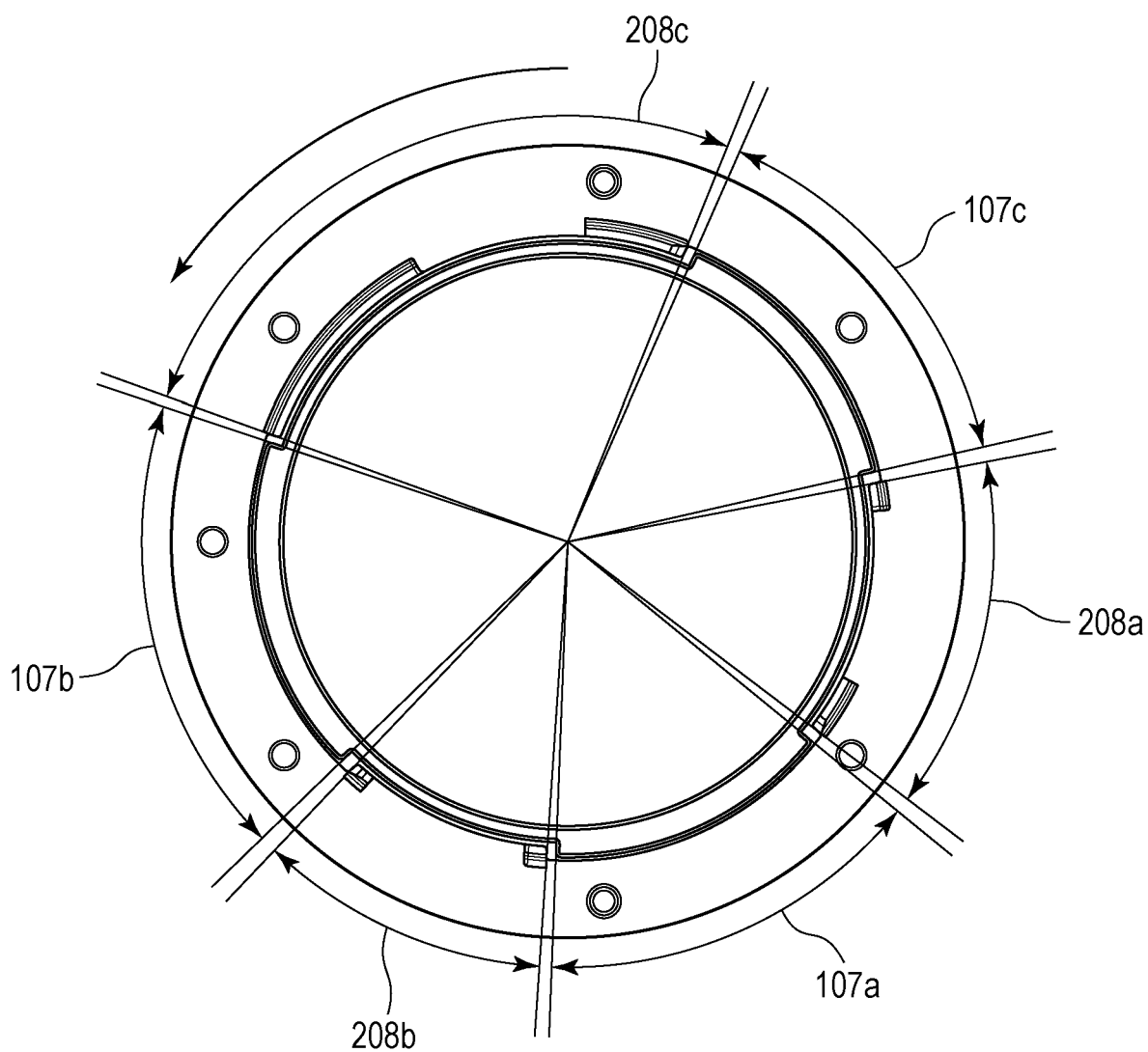
FIG. 5 is a diagram illustrating an insertion-removal state of the lens mount and the camera mount in a normal position viewed from an image pickup plane side.
Figure 6:
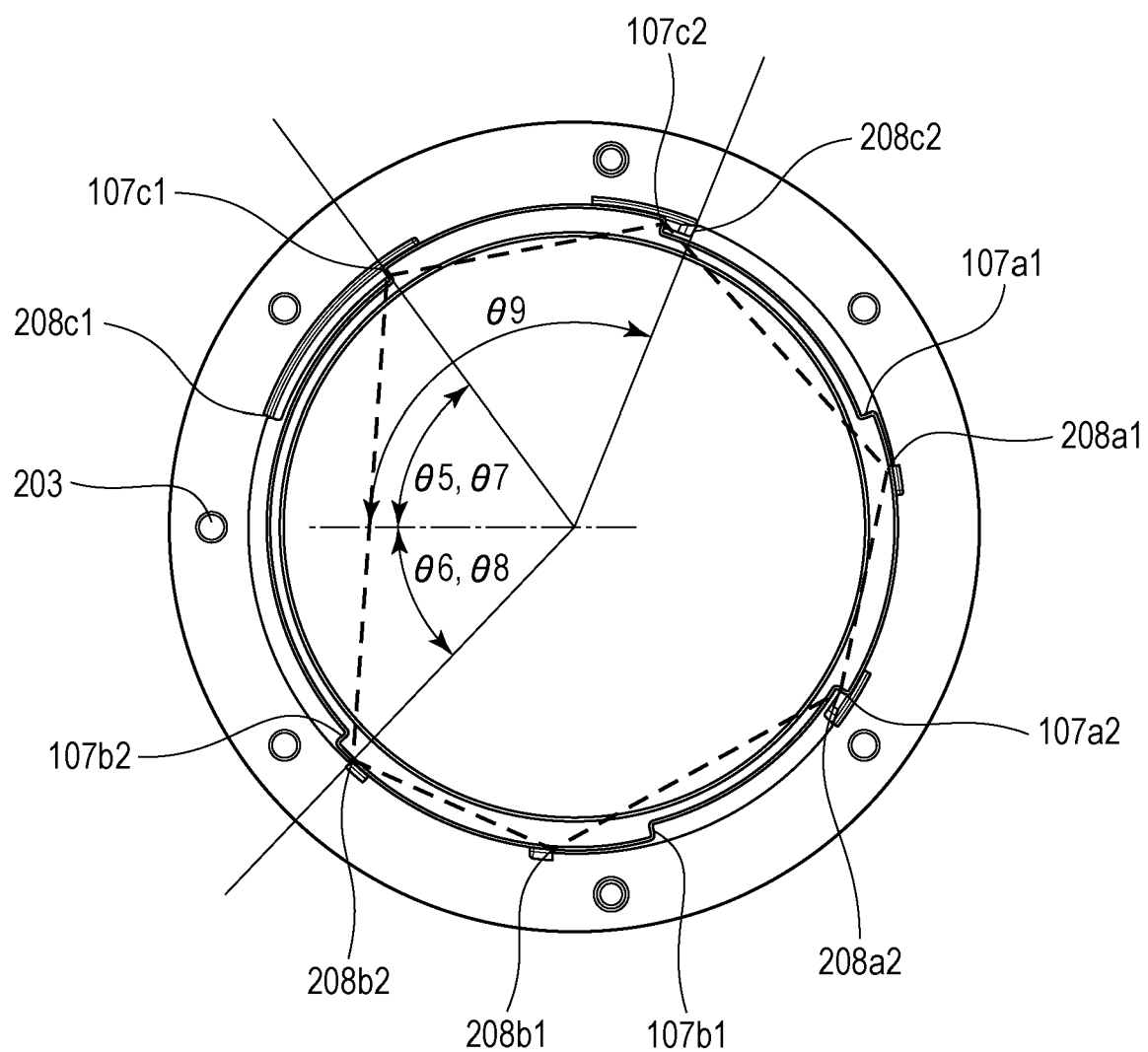
FIG. 6 is a diagram illustrating a mounted state of the lens mount and the camera mount in a normal position viewed from an image pickup plane side.

Referring next to FIGS. 5 and 6, an operation of attaching the interchangeable lens assembly 100 to the camera body 200 will be described. FIG. 5 is a diagram of the lens mount 101 and the camera mount 201 in the insertion-removal state and at the normal position when viewed from the image pickup means 202 side, and FIG. 6 is a diagram of the lens mount 101 and the camera mount 201 in the mounted state and at the normal position when viewed from the image pickup means 202 side.

The interchangeable lens assembly 100 is mounted on the camera body 200 by, initially, matching the phases of the camera-side claw portions and the lens-side cutaway portions as described above so that the interchangeable lens assembly 100 and the camera body 200 are in a state in which the phases of the camera-side cutaway portions and the lens-side claw portions matches each other (the insertion-removal state). Furthermore, in this insertion-removal state, the lens-side diameter fitting portion 109 and the camera-side diameter fitting portion 210 are diametrically fitted to each other, and the interchangeable lens assembly 100 is inserted into the camera body 200 to a position where a contact surface on a lens mount 101 side and a contact surface on the camera mount 201 side abut against each other.

When the interchangeable lens assembly 100 is fully inserted in the camera body 200, the interchangeable lens assembly 100 is rotated about 60° (in a direction illustrated by an arrow in FIG. 5) relative to the camera body 200 from the phase in the insertion-removal state towards the phase in the mounted state. As a result of the above operation, mounting of the interchangeable lens assembly 100 on the camera body 200 is completed. In the phase in the mounted state, when viewed in the optical axis direction, the camera-side claw portions and the lens-side claw portions overlap each other. In other words, since both the camera-side claw portions and the lens-side claw portions are bayonet coupled to each other, the interchangeable lens assembly 100 can be prevented from coming off from the camera body 200 in the optical axis direction.

More specifically, in the mounted state, the first lens-side claw portion 107a is positioned on the image pickup means 202 side of the first camera-side claw portion 208a, and the second lens-side claw portion 107b is positioned on the image pickup means 202 side of the second camera-side claw portion 208b. Furthermore, the third lens-side claw portion 107c is positioned on the image pickup means 202 side of the third camera-side claw portion 208c. Accordingly, separation in the optical axis direction does not occur as long as the lock pin 203 does not come off from the lock pin groove portion 102. Furthermore, in the above, since the lens-side claw portions are moved to one side by the lens mount biasing member 207 biasing (pulling-in) in an image pickup means 202 direction, the occurrence of a backlash between the camera body 200 and the interchangeable lens assembly 100 in the optical axis direction is prevented or reduced.

(Influence of Lock Pin 203 being Retreated in Insertion-Removal State and Transition State)

In the fitting operation described above, the lock pin 203 is pressed by the lens mount 101 and the lock pin 203 is pressed against the lens mount 101 at all times in the insertion-removal state and in a transition state between the insertion-removal state and the mounted state. When in the mounted state, the lock pin 203 is inserted into the lock pin groove portion 102, and the lock pin 203 is brought to an advanced state from a retreated state.

In other words, in the insertion-removal state and in the transition state, a force that separates the lens mount 101 and the camera mount 201 is applied therebetween. Accordingly, both the lens mount 101 and the camera mount 201 need to be pressed against each other with the force of the user during the transition from the insertion-removal state to the transition state. In other words, both the lens mount 101 and the camera mount 201 need to be pressed against each other with force that is equivalent to or larger than the biasing force of the lock pin 203 before engagement between the lens-side claw portions and the camera-side claw portions start. Furthermore, in the transition state, the biasing force of the lock pin 203 is continuously applied, without change, to a lock pin traveling surface 110 (a broken-line portion in FIG. 3A) of the lens mount 101.

Since the lock pin 203 needs to have strength, a material with high hardness is used in many cases, and stainless steel is used in the present exemplary embodiment as well. By contrast, a material that is inferior in strength is used for the lens mount 101 in many cases and, for example, an aluminum alloy, a copper alloy including brass, a resin member, or another metal material is typically used. Accordingly, when operations of attaching and detaching the interchangeable lens assembly 100 to and from the camera body 200 are repeated, degradations, such as the appearance being damaged due to abrasions and scratches occurring on the lens mount 101, an increase in the sliding friction, and a deterioration in flatness may occur.

Note that in the present exemplary embodiment, as a measure against the deterioration in flatness, a difference in level is provided between the lock pin traveling surface 110 and a contact surface 111 between the lens mount 101 and the camera mount 201. This configuration secures the accuracy in the abutment between the lens mount 101 and the camera mount 201, thus preventing or reducing the occurrence of deterioration in flatness.

Reducing the biasing force of the lock pin 203 can be conceived as a method to prevent or reduce abrasions and scratches. However, reducing the biasing force of the lock pin 203 increases a risk of the mounted state becoming released when, in the mounted state, the user inadvertently touches the release operation member 204 or when, in the mounted state, a vibration is applied to the mounts. Thus, the influence of the biasing force, which is applied to the lock pin 203, needs to be controlled with the biasing force itself against the lock pin 203 not being reduced.

(Configuration for Controlling Influence of Biasing Force of Lock Pin 203)

Referring now to FIG. 6, an angle formed by a point that is nearest to the lock pin 203 in the range (the region) where the third lens-side claw portion 107c and the third camera-side claw portion 208c overlap, the optical axis O, and the center of the lock pin 203 or the center of the lock pin groove portion 102 is represented by $\theta 5$. In the present exemplary embodiment, the point that is nearest to the lock pin 203 is a point on the fifth lens-side end 107c1. Furthermore, an angle formed by a point that is nearest to the lock pin 203 in the range where the second lens-side claw portion 107b and the second camera-side claw portion 208b overlap, the optical axis O, and the center of the lock pin 203 is represented by $\theta 6$. In the present exemplary embodiment, the point that is nearest to the lock pin 203 is a point on the fourth camera-side end 208b2.

Note that the point that is nearest to the lock pin 203 or the lock pin groove portion 102 in the range (region) in which the lens-side claw portions and the camera-side claw portions overlap each other is a point on an end of the lens-side claw portion or an end of the camera-side claw portion. The end of the lens-side claw portion and the end of the camera-side claw portion herein may be a middle point in the end of the claw portion. Alternatively, the point on the end of the lens-side claw portion or the end of the camera-side claw portion may be an intersection between the end of the lens-side claw portion and an outer peripheral surface or an inner peripheral surface of the camera-side claw portion. Alternatively, the point on the end of the lens-side claw portion or the end of the camera-side claw portion may be an intersection between the end of the camera-side claw portion and an outer peripheral surface or an inner peripheral surface of the lens-side claw portion.

Here, assuming that A is a difference in dimensions in the optical axis direction defined by the lens-side claw portions and the camera-side claw portions, when the mounts move parallel to each other, a backlash component in the optical axis direction between the mounts remains A. Furthermore, the direction in which the mounts tend to tilt is determined by the angle at which the claw portions overlap each other, in other words, by the size of the area in which the lens claw portions and the camera claw portions overlap each other. In other words, the intermediate point between the ranges (or the regions) where the lens-side claw portions and the camera-side claw portions overlap each other is the direction in which the mounts tilt most easily. Vertexes of a hexagon illustrated by a broken line in FIG. 6 are points that practically restrict the tilting of the mounts. As the tilting near the center of each side of the hexagon is larger and as the side becomes longer, the absolute value of the tilting in the direction towards the side becomes larger.

Note that two of the vertexes of the hexagon illustrated in FIG. 6 can be paraphrased as one end and the other end of the region where the first insertion-receiving portion-side engagement portion and a third image-pickup-apparatus-side engagement portion overlap. The other vertexes can be paraphrased in a similar manner.

In the present exemplary embodiment, among the ranges in which the lens-side claw portions and the camera claw portions overlap each other, the range between the fourth camera-side end 208b2 and the fifth lens-side end 107c1, in other words, the range including the angle $\theta 5+\theta 6$ is the largest. In other words, among the sides of the hexagon illustrated in FIG. 6, the side between the fourth camera-side end 208b2 and the fifth lens-side end 107c1 is the longest. In other words, in the present exemplary embodiment, the range in which tilting of the lens mount 101 relative to the camera mount 201 occurs most easily is the range between the fourth camera-side end 208b2 and the fifth lens-side end 107c1.

In this way, among the ranges in which the lens-side claw portions and the camera claw portions overlap each other and the range therebetween, the lock pin 203 is provided in the range having the widest angle and in which the lens mount 101 relatively tilts most easily (in which a backlash occurs most easily), in the present exemplary embodiment. Accordingly, even if the biasing force of the lock pin 203 is not reduced, abrasion of the surface of the lens mount 101 due to the biasing force of the lock pin 203 can be prevented or reduced.

While the description has been provided using angle $\theta 5$ and angle $\theta 6$ which are formed when the interchangeable lens assembly 100 and the camera body 200 are in the mounted state illustrated in FIG. 6, angle $\theta 5$ changes in the course of reaching the mounted state from the insertion-removal state through the transition state. Accordingly, in each state, the smallest $\theta 5$ is defined as $\theta 7$, and the smallest $\theta 6$ is defined as $\theta 8$. In the present exemplary embodiment, $\theta 7=54°$, and $\theta 8=46°$.

Note that $\theta 5$ is always determined by the fifth lens-side end 107c1, the optical axis O, and the lock pin 203, and changes in the course of reaching the mounted state from the insertion-removal state through the transition state. The state in which $\theta 5$ is at its minimum value is the mounted state. Meanwhile, $\theta 6$ is always determined by the fourth camera-side end 208b2, the optical axis O, and the lock pin 203, does not change in the course of reaching the mounted state from the insertion-removal state through the transition state, and is always constant, that is, $\theta 6=\theta 8$ at all times. In the present exemplary embodiment, the interchangeable lens assembly 100 is configured so as to satisfy $$0.75 \leq \theta 7/\theta 8 \leq 1.25, \tag{8 or}$$

$$0.80 \leq \theta 7/\theta 8 \leq 1.20. \tag{8a}$$

In the present exemplary embodiment, $\theta 7/\theta 8=1.17$, and conditional expression (8) described above are satisfied. By the interchangeable lens assembly 100 satisfying conditional expression (8), the state in which $\theta 5+\theta 6$ is smallest is achieved. In this mounted state, the lock pin 203 is positioned at substantially the middle in the range between the fifth lens-side end 107c1 and the fourth camera-side end 208b2.

In other words, in the mounted state, the lock pin 203 is positioned in the direction (the position) in which the lens mount 101 tilts easily. Accordingly, the influence of the biasing force of the lock pin 203 in the mounted state in which the biasing force becomes the strongest can be controlled. Furthermore, the interchangeable lens assembly 100 can be mounted on the camera body in a more stable manner. In the present exemplary embodiment, $\theta 7$ is larger than $\theta 8$.

Furthermore, in the present exemplary embodiment, the interchangeable lens assembly 100 satisfies $$90°<\theta 7+\theta 8<180°, \text{ and } 90°<\theta 9+\theta 8<180°, \tag{9 or}$$

$$90°<\theta 7+\theta 8<110°, \text{ and } 140°<\theta 9+\theta 8<170°. \tag{9a}$$

As illustrated in FIG. 6, θ9 is an angle formed by the sixth camera-side end 208c2, the optical axis O, and the center of the lock pin 203, and is the maximum value of θ5.

When the interchangeable lens assembly 100 satisfies conditional expression (9) from the time when the interchangeable lens assembly 100 is attached to the camera body 200 to the time when the mounting of the interchangeable lens assembly 100 on the camera body 200 is completed, the following effect can be obtained. The lock pin 203 is always positioned in the region where the interval between the points in which the lens-side claw portions and the camera-side claw portions are in contact with each other is wide. Accordingly, since, from the insertion-removal state to the transition state, the lock pin 203 is always in a state in which tilting easily occurs, even if the biasing force of the lock pin 203 is not weakened, the influence of the biasing force of the lock pin 203 can be controlled. In the present exemplary embodiment, θ7+θ8=100° and θ9+θ8=160° are satisfied.

Furthermore, θ7 and θ8 are both 45 degrees or larger, and the lock pin 203 is positioned away from the positions where the claw portions, which are tilting restricting members, overlap each other; accordingly, the lock pin 203 is more likely to become tilted.

The above configuration can increase the tilting of the lock pin 203 in the phase direction (circumferential direction), so that the mounts are separated by the biasing force of the lock pin 203, thus reducing the biasing force of the lock pin 203 in the transition state. This enables the prevention or reduction of the occurrence of abrasion and scratching. Furthermore, in the mounted state, biasing the lens-side claw portions with the lens mount biasing member 207 with a force larger than the biasing force of the lock pin 203 prevents or reduces the backlash during the mounted state.

(Dispositional Relationship Between Lock Pin Groove Portion and Lens Side Claw Portions)

While the dispositional relationship between the lock pin groove portion and the lens-side claw portions has been described with reference to FIG. 3A, the dispositional relationship between the lock pin groove portion and the lens-side claw portions according to the present exemplary embodiment can be described as follows with reference to FIGS. 7 and 8.

As described above, the lens-side claw portions are biased in the image pickup means 202 direction with the lens mount biasing member 207. This biasing force controls the occurrence of the backlash between the interchangeable lens assembly 100 and the camera body 200, in other words, the backlash between the lens mount 101 and the camera mount 201. Furthermore, this biasing force generates frictional force between the lens mount 101 and the camera mount 201, and prevents or reduces the occurrence of backlash in the radial direction orthogonal to the optical axis direction as well as a relative displacement of the lens mount 101 in the radial direction with respect to the camera mount 201. Furthermore, the backlash and the relative displacement in the radial direction are also prevented or reduced by, as described above, the lock pin 203 being inserted in the lock pin groove portion 102.

If such biasing force concentrates on a single lens claw portion, there will be a concern that the lens mount 101 and, consequently, the interchangeable lens assembly 100 will tilt in the direction where the lens claw portion is located. Accordingly, it is desirable that the biasing force of the lens mount biasing member 207 act on the lens mount 101, in other words, the interchangeable lens assembly 100 in a uniform manner. Thus, in the present exemplary embodiment, the lens claw portions, which receive the biasing force from the lens mount biasing member 207, are disposed in a substantially uniform manner. Hereinafter, the disposition thereof will be described in detail.

Figure 7:
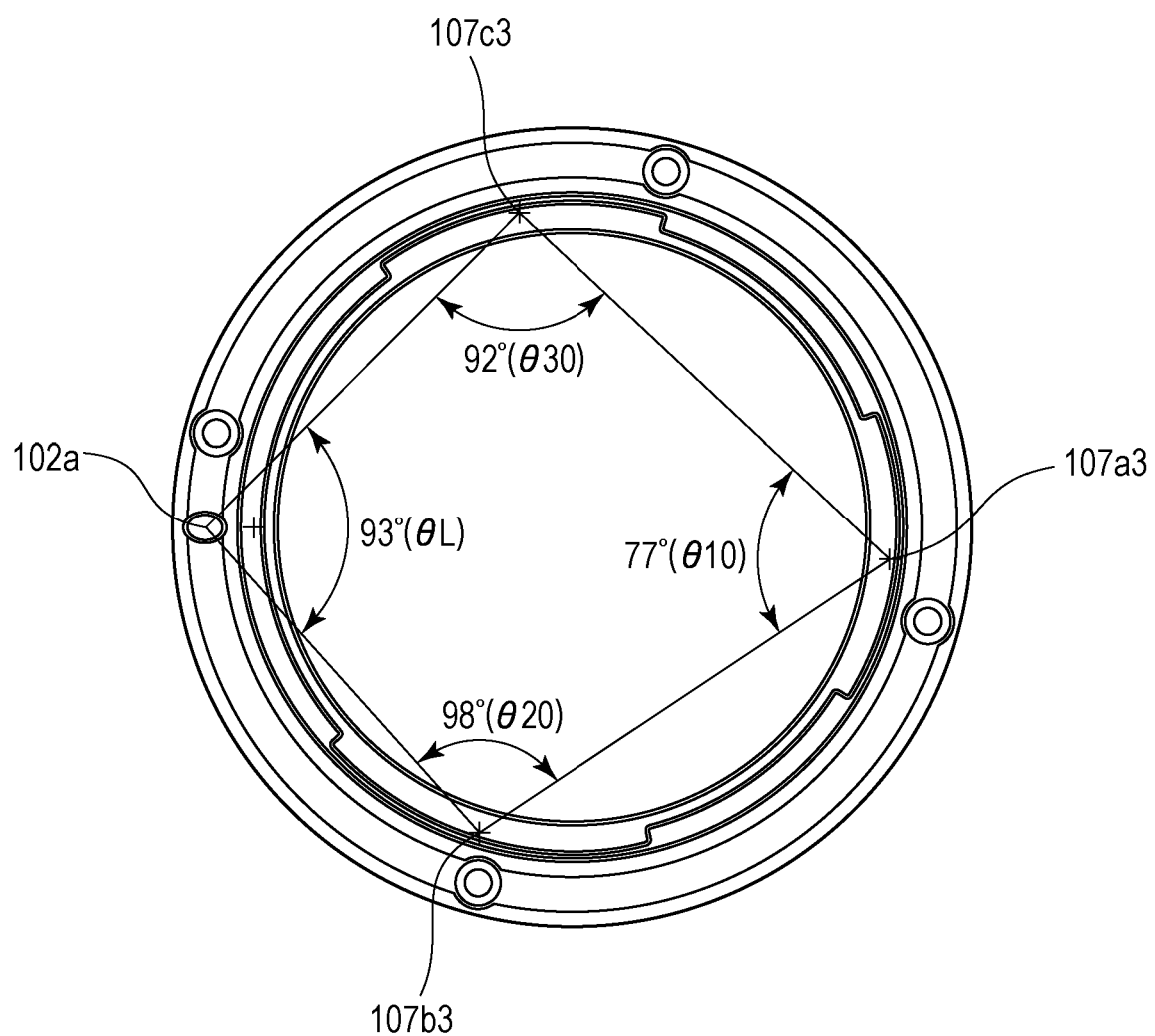
FIG. 7 is an explanatory drawing of a polygonal shape formed of a center of a lock pin groove, and centers of lens-side claw portions.

Referring to FIG. 7, the center of the first lens-side claw portion 107a is referred to as a first lens-side claw portion center 107a3, the center of the second lens-side claw portion 107b is referred to as a second lens-side claw portion center 107b3, and the center of the third lens-side claw portion 107c is referred to as a third lens-side claw portion center 107c3. In other words, the prevention or reduction of the space between the lens mount 101 and the camera mount 201 is achieved by frictional force and position restriction of, mainly, the lock pin groove portion center 102a, in addition to the three lens-side claw portion centers 107a3, 107b3, and 107c3. Accordingly, the disposition of these centers on the lens mount 101 in a substantially uniform manner, the frictional force occurring between the lens mount 101 and the camera mount 201 can be equalized. By adopting the above configuration in the present exemplary embodiment, the interchangeable lens assembly 100 can be mounted on the camera body 200 in a further stable manner.

Figure 8A:
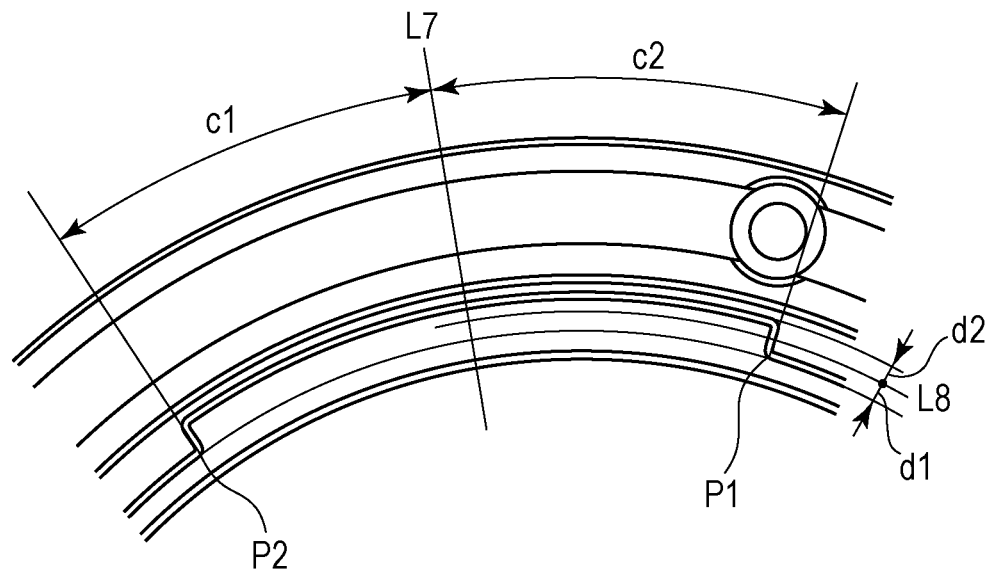
FIG. 8A is an explanatory drawing of the center of a lock pin groove and a center of a claw portion.

Note that the definitions of the lens-side claw portion centers and the lock pin groove portion center 102a will be described with reference to FIG. 8. Specifically, initially, as illustrated in FIG. 8A, assume that line L7 is a line that passes the optical axis O and the point that equally divides the dimension of the lens-side claw portion into two in the circumferential direction, in other words, a point at which dimensions c1 and c2 are the same in the circumferential direction. Furthermore, assume that line L8 is a curved line that passes a point that equally divides the dimension of the lens-side claw portion into two in the radial direction, in other words, a curved line in which dimensions d1 and d2 are the same in the radial direction. At this time, the intersection between line L7 and line L8 is the center of the lens-side claw portion. Herein, the dimension of the lens-side claw portion in the radial direction is a dimension from a point P1 or P2 at which the lens-side claw portion stands in a portion of the lens mount 101 to the outer peripheral surface of the lens-side claw portion. Alternatively, the center of the lens-side claw portion may be an intersection of two diagonal lines of a quadrangle connecting four points, that is, two points P1 and P2 at which the foregoing lens-side claw portion stands and two points at the ends of the outer peripheral surface of the lens-side claw portions.

Figure 8B:
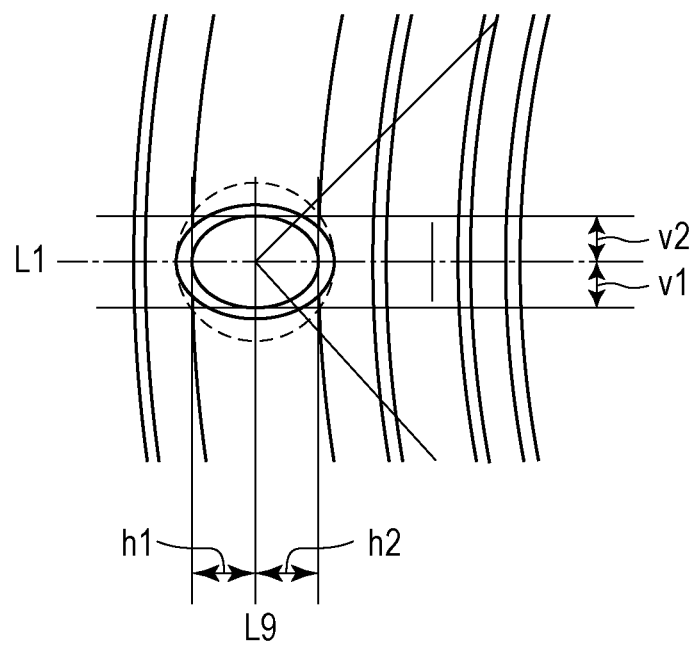
FIG. 8B is an explanatory drawing of the center of a lock pin groove and a center of a claw portion.

Furthermore, the lock pin groove portion center 102a is as illustrated in FIG. 8B. Specifically, initially, assume that line L9 is a line that passes a point that equally divides the dimension of the lock pin groove portion 102 into two in the line L1 direction, in other words, a line that passes a point where the dimensions h1 and h2 are the same in the line L1 direction, and is a line that is orthogonal to line L1. In the above, the intersection between line L9 and line L1 is represented by the lock pin groove portion center 102a. Note that line L1 is also a line that equally divides the dimension of the lock pin groove portion 102 into two in the line L9 direction, in other words, line L1 is a line that passes a point where dimensions v1 and v2 are the same in the line L9 direction.

Referring next to FIG. 7, the configuration of disposing the above-described centers of the lens mount 101 in a substantially uniform manner will be described in a more specific manner. FIG. 7 illustrates a quadrangle having the lens-side claw portion centers 107a3 to 107c3 and the lock pin groove portion center 102a as the vertexes, and internal angles of the quadrangle.

Among the internal angles, θ10 is an angle of a first internal angle with the first lens-side claw portion center 107a3 as its vertex, θ20 is an angle of a second internal angle with the 107b3 as its vertex, θ30 is an angle of a third internal angle with the 107c3 as its vertex, and θL is an angle of a fourth internal angle with 102a as its vertex. In the present exemplary embodiment, the angles of the internal angles are set so that the lens-side claw portion centers and the lock pin groove portion center are disposed in a substantially uniform manner. Since θ10, θ20, θ30, and θL are internal angles of the quadrangle, θ10+θ20+θ30+θL=360° is satisfied.

More specifically, the interchangeable lens assembly 100 according to the present exemplary embodiment satisfies $$75°≤θ10≤105°, 75°≤θ20≤105°, 75°≤θ30≤105°, \text{ and}$$

$$75°≤θL≤105°. \quad (10)$$

In other words, since each of θ10, θ20, θ30, and θL falls within a predetermined angle range, as described above, the lens-side claw portion centers and the lock pin groove portion center are disposed in a substantially uniform manner. Here, conditional expression (10) may be as follows:

$$60°≤θ10≤120°, 60°≤θ20≤120°, 60°≤θ30≤120°, \text{ and}$$
$$60°≤θL≤120°. \quad (10a)$$

Alternatively, conditional expression (10) may be any of the followings:

$$60°≤θ10≤100°, 60°≤θ20≤100°, 60°≤θ30≤100°, \text{ and}$$
$$60°≤θL≤100° \quad (10b);$$

$$65°≤θ10≤100°, 65°≤θ20≤100°, 65°≤θ30≤100°, \text{ and}$$
$$65° θL≤100° \quad (10c); \text{ and}$$

$$70°≤θ10≤100°, 70°≤θ20≤100°, 70°≤θ30≤100°, \text{ and}$$
$$70°≤θL≤100°. \quad (10d)$$

Here, the upper limits of conditional expressions (10b), (10c) and (10d) may be 99°.

Furthermore, it is preferable that at least any one of θ10, θ20, θ30, and θL falls within the range between 85 degrees and 95 degrees, inclusive, because the lens-side claw portion centers and the lock pin groove portion center are disposed in a further substantially uniform manner.

It is more preferable that the interchangeable lens assembly 100 satisfies $$85°≤θL≤95° \quad (11) \text{ or}$$

$$90°≤θL≤95° \quad (11a),$$

since the lens-side claw portion centers are disposed in a further uniform manner with respect to the lock pin groove portion center 102a.

It is more preferable that the interchangeable lens assembly 100 satisfies $$0.75≤θ30/θ20≤1.25 \quad (12),$$

$$0.85≤θ30/θ20≤1.15 \quad (12a), \text{ or}$$

$$0.95≤θ30/θ20≤1.05. \quad (12b)$$

This is because the second lens-side claw portion 107b and the third lens-side claw portion 107c are disposed in a uniform manner with respect to the lock pin groove portion 102. Furthermore, if θL is larger than 90°, in other words, if θL is an obtuse angle, the third lens-side cutaway portion 108c becomes longer than the other lens-side cutaway portions; accordingly, the influence of the biasing force of the lock pin 203 can be controlled. In the present exemplary embodiment, θ20 is larger than θ30.

Note that regarding the internal angles in the present exemplary embodiment, θ10=77°, θ20=98°, θ30=92°, and θL=93°, and the interchangeable lens assembly 100 satisfies each condition described above related to the internal angles. In this way, each of the center points is disposed on the lens mount 101 in a substantially uniform manner in the present exemplary embodiment. Thus, the frictional force occurring between the lens mount 101 and the camera mount 201 can be equalized, and the interchangeable lens assembly 100 can be mounted on the camera body 200 in a further stable manner while the occurrence of the backlash is controlled.

In many cases, in the state in which the interchangeable lens assembly 100 is mounted on the camera body 200, the interchangeable lens assembly 100 is operated while the camera body 200 is being held. Thus, there are cases in which a force in the radial direction, which is the direction perpendicular to the optical axis direction, is applied between the lens mount 101 and the camera mount 201. By contrast, since the present exemplary embodiment employs the configuration described above, the interchangeable lens assembly 100 can be mounted on the camera body 200 in a further stable manner. Thus, when high-speed consecutive photographing is carried out or when a moving image is taken, a positional displacement between each frame caused by the backlash between the lens mount 101 and the camera mount 201 is less likely to occur.

In recent years, improvement in high-resolution in image pickup means have been becoming noticeable, such as a development of a sensor having 250 million [250000000] pixels in APS-H size (about 29.2×20.2 mm) sensors. As the image becomes higher in resolution, a positional displacement becomes more conspicuous when the image of each frame is checked. To address such a situation, the present exemplary embodiment enables the control of the positional displacement even when the image pickup means has higher resolution.

It is conceivable that, in order to control the backlash between the lens mount 101 and the camera mount 201 in the radial direction, the fit between the lens-side diameter fitting portion 109 and the camera-side diameter fitting portion 210 is tightened. However, if the fit between the lens-side diameter fitting portion 109 and the camera-side diameter fitting portion 210 is tightened, the work efficiency of attaching the lens mount 101 and the camera mount 201 to each other decreases. By contrast, employing of the configuration of the present exemplary embodiment excludes need to tighten the fit between the lens-side diameter fitting portion 109 and the camera-side diameter fitting portion 210; accordingly, a decrease in the work efficiency described above can be controlled.

Furthermore, in order to control the backlash between the lens mount 101 and the camera mount 201 in the radial direction, it is conceivable that the biasing force generated by the lens mount biasing member 207 is increased. However, if the biasing force generated by the lens mount biasing member 207 is increased, operating force when the lens mount 101 and the camera mount 201 are in the insertion-removal state needs to be increased. By contrast, employing of the configuration of the present exemplary embodiment excludes need to increase the biasing force generated by the lens mount biasing member 207, thus excluding need of a large operating force described above.

(Variation)

While a preferable embodiment of the present invention has been described above, the present invention is not limited to the exemplary embodiment and may be varied and modified within the gist of the present invention.

For example, as long as the configuration of the present exemplary embodiment is used in optical equipment (accessory), the configuration can be used in camera accessories to be used via a mount, such as an adapter or an extender, in addition to interchangeable lens assemblies. Furthermore, the claw portions may each be provided with a cutaway portion or a step portion. Furthermore, the configuration described in the present exemplary embodiment can be used in lens barrels for various image pickup devices, such as a lens shutter camera, a digital camera, and a video camera, in addition to the interchangeable lens assembly for a single-lens reflex camera. In both the interchangeable lens assembly 100 and the adapters, a member in which the lens mount 101 is fixed with the lens mount fixing members 103 is the accessory main body.

In the present exemplary embodiment, while θ7 is practically determined by the fifth lens-side end 107c1, depending on the angle range of the third lens-side claw portion 107c or the third camera-side claw portion 208c, θ7 may be determined by the fifth camera-side end 208c1.

Furthermore, the three bayonet claw portions provided in the mounts in the exemplary embodiment described above may each be divided so as to be further divided into segments. In other words, a single bayonet claw portion may be formed as a set of a plurality of bayonet claw portions (a bayonet claw group). For example, the above corresponds to a case in which a groove portion is provided in a single bayonet claw portion. In such a case, the angle range of the group of bayonet claw portions arranged in the circumferential direction of each mount is as in the exemplary embodiment described above.

Figure 9A:
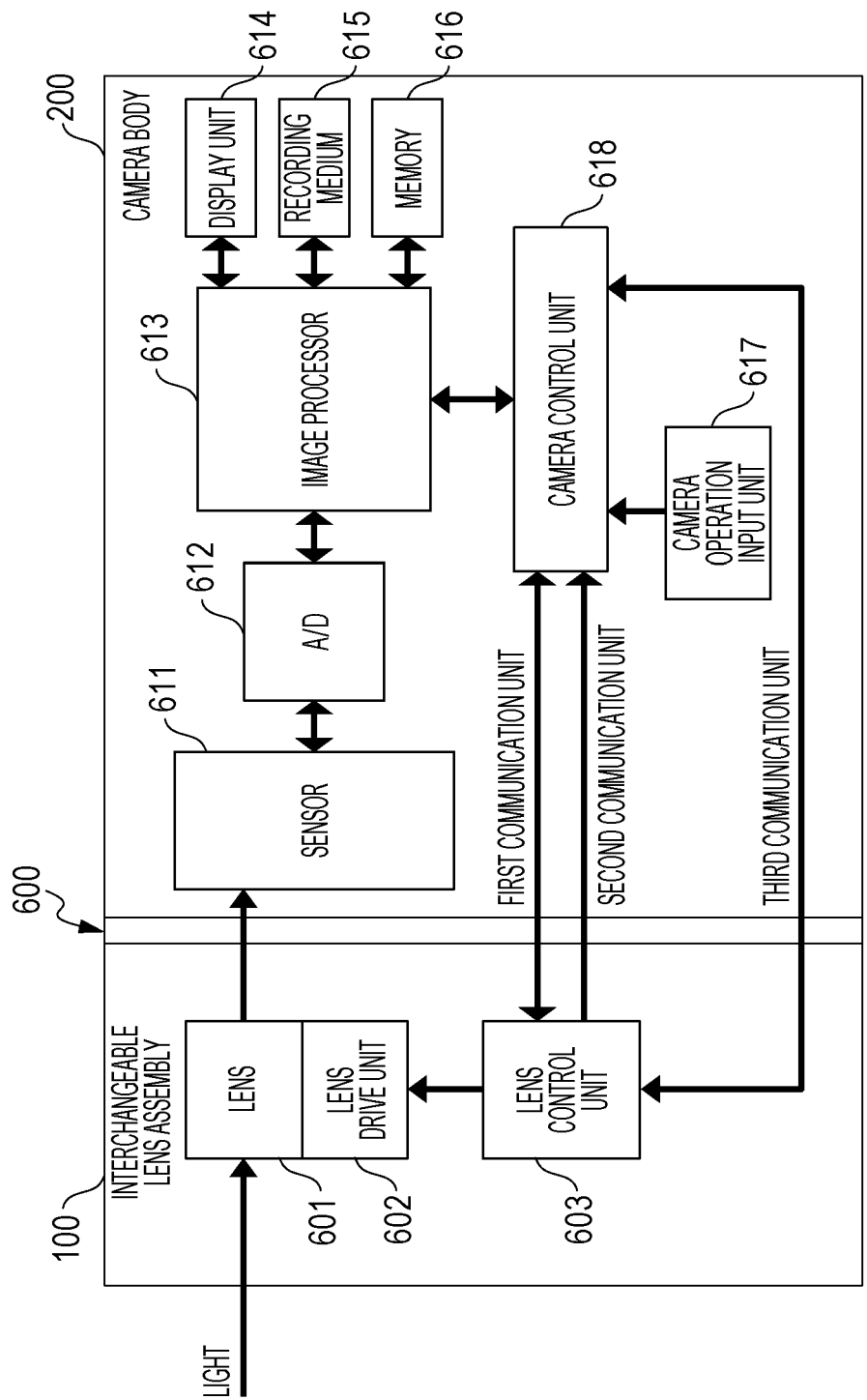
FIG. 9A is a block diagram of a camera and an interchangeable lens assembly according to the present exemplary embodiment.
Figure 9B:
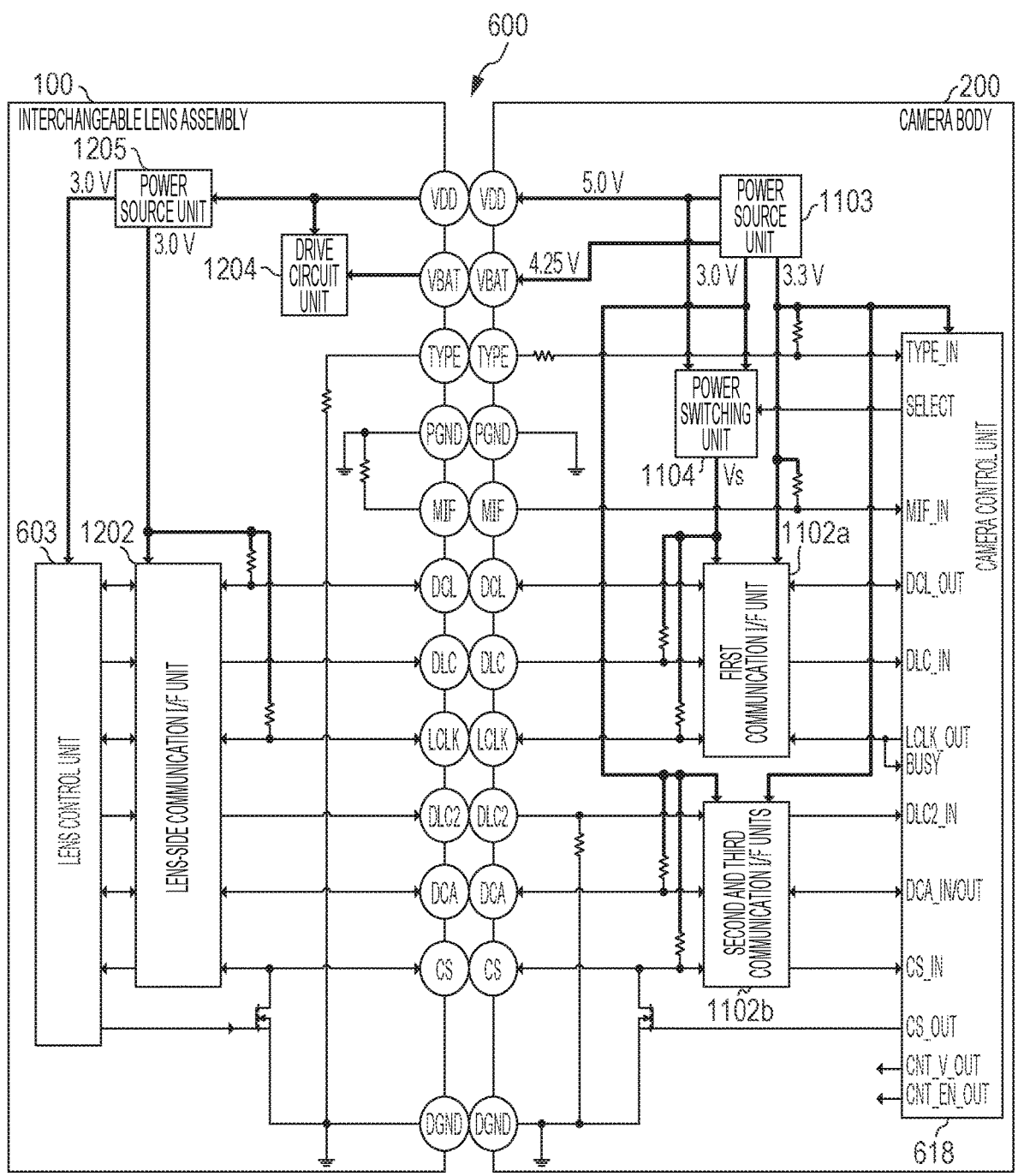
FIG. 9B is a block diagram of terminals of a camera and an interchangeable lens assembly according to the present exemplary embodiment.

Referring now to FIGS. 9A and 9B, a description will be given of a plurality of electrical contacts (terminal units or electrical contacts units) included in the lens contact portions (lens-side terminals) holding member 105. FIG. 9A is a block diagram of the camera system when viewed from an aspect different from that of FIG. 1 described above. A lens 601 in FIG. 9 is the optical elements in FIG. 1 such as the zoom lens unit ZLU and the focus lens unit FLU. A lens control unit 603 is the lens CPU in FIG. 1, and a mount 600 is a collective term for the lens mount 101 and the camera mount 201. A lens drive unit 602 is a collective term for the driving means in FIG. 1, and an image sensor 611 is the image pickup means 202 in FIG. 1. A lens control unit 603 is capable of performing first, second, and third communications between a camera control unit 618 via terminals described below.

The camera body 200 includes an A/D conversion unit 612 that converts an analog electrical signal output from the image sensor 611 into a digital signal, and an image processor 613 that generates an image signal by performing various types of image processing on the digital signal converted by the A/D conversion unit 612.

The image signal (a still image or a moving image) generated in the image processor 613 is displayed on a display unit 614 and is recorded in a recording medium 615. Furthermore, the camera body 200 includes a memory 616 that functions as a buffer when processing is performed on the image signal. The memory 616 stores an operation program which is used by the camera control unit 618 described below. The camera body 200 further includes a camera operation input unit 617 including a power switch for turning the power source on and off, a photographing switch that starts recording of an image signal, and a selecting and setting switch for performing setting of various menus.

The camera body 200 further includes the camera control unit 618 which includes a microcomputer. The camera control unit 618 makes various settings based on signals input from the camera operation input unit 617, and controls the communication between the lens control unit 603 included in the interchangeable lens assembly 100 via the mount 600.

Referring next to FIG. 9B, a configuration of the electrical connection between the camera body 200 and the interchangeable lens assembly 100 will be described. FIG. 9B illustrates an electric circuit configuration when the camera body 200 and the interchangeable lens assembly 100 are connected via the mount 600, terminals (electrical contacts) provided in the mount 1 to electrically connect the camera body 200 and the interchangeable lens assembly 100, and a state in which the terminals are connected.

The mount 600 in the camera system includes a mount portion (a first mount portion) A on the camera body 200 side and a mount portion (a second mount portion) B on the interchangeable lens assembly 100 side. The mount portion A and the mount portion B include a plurality of terminals (contact points or electrical contacts) that are capable of being electrically connected to the counterparts.

More specifically, the mount 600 includes VDD terminals and VBAT terminals that supply power to the interchangeable lens assembly 100 from the camera body 200, DGND terminals and PGND terminals which are ground terminals. The mount 600 further includes LCLK terminals, DCL terminals, DLC terminals, DLC2 terminals, CS terminals, and DCA terminals that are communication terminals for the camera control unit 618 and the lens control unit 603 to communicate with each other. As other terminals, the mount 600 further includes MIF terminals for detecting that the interchangeable lens assembly 100 has been mounted on the camera body 200, and TYPE terminals that distinguish the type of camera accessory that has been mounted on the camera body 20.

In FIG. 9B, a camera power source unit 1103 generates communication control power source (VDD) as power source to be supplied to a mounted accessory via a VDD terminal, or power source to be supplied to a first communication I/F unit 1102a via a power source switching unit 1104. The camera power source unit 1103 also generates driving power source (VBAT) as power source to be supplied to the mounted accessory via a VBAT terminal.

The camera power source unit 1103 further generates a 3.3 V power source as a power source to be supplied to the camera control unit 618, first communication I/F unit 1102a, and a second/third communication I/F unit 1102b. The camera power source unit 1103 also generates a 3.0 V power source as a power source to be supplied to the first communication I/F unit 1102a and the second/third communication I/F unit 1102b via the power source switching unit 1104.

The power source switching unit 1104 is connected to the camera power source unit 1103. The power source switching unit 1104 supplies only either the VDD or 3.0 V power source, generated at the camera power source unit 1103, to the first communication I/F unit 1102a as power source Vs for the communication interface. Switching of the power source voltage is executed in accordance with an instruction from the camera control unit 618.

Next, a lens power source 1205 generates a 3.0 V power source, as a power source voltage to be supplied to the lens control unit 603 and a lens-side I/F unit 1202, based on the VDD supplied from the camera body 200 side. In a state where the interchangeable lens assembly 100 is mounted on the camera body 200, driving power source (VBAT) is supplied to a drive circuit unit 1204 on the interchangeable lens assembly 100 side, via a VBAT terminal from the above-described camera power source unit 103.

While the power source voltage levels of the lens control unit 603 and the lens-side I/F unit 1202 are the same (3.0 V) in the present embodiment, the voltage level that the lens control unit 603 exhibits may be set to a 3.3 V. In such a case, there is the need to supply power source of a voltage level of 3.0 V and 3.3 V to the lens-side I/F unit 1202, so that the lens power source 1205 generates power sources of 3.0 V and 3.3 V.

Hereinafter, a more detailed description of the terminals will be given.

(Power Terminals)

The VDD terminals are used to supply communication control power (VDD), which is communication power used mainly to control communication, to the interchangeable lens assembly 100 from the camera body 200. In the present exemplary embodiment, the communication control power is 5.0 V. The VBAT terminals are used to supply driving power (VBAT), which is driving power used in operations other than the above communication control, such as operations of mechanical drive systems and the like mainly including a motor and the like, to the interchangeable lens assembly 100 from the camera body 200. In the present exemplary embodiment, the driving power is 4.25 V.

The DGND terminals are used to connect the communication control systems of the camera body 200 and the interchangeable lens assembly 100 to the ground. In other words, the DGND terminals are ground (GND) terminals corresponding to the VDD power source described above. Grounding herein is setting to a level that is the same as the level of the negative electrode-side of the power source, such as a battery. The PGND terminals are used to connect the camera body 200 and the mechanical drive system, such as a motor, provided in the interchangeable lens assembly 100 to the ground. In other words, the PGND terminals are ground terminals (GND) that correspond to the VBAT power source described above.

(Communication Terminals)

The communication terminals include a terminal unit (the LCLK, DCL, and DLC terminals) that is a first communication unit for performing the first communication, and terminals (the DLC2 terminals) that are a second communication unit for performing the second communication independent of the first communication. The communication terminals further include a terminal unit (the CS, and DCA terminals) that is a third communication unit that performs the third communication independent of the first and second communications. The camera control unit 618 and the lens control unit 603 are capable of performing the first, second, and third communications that are independent of each other through the above communication terminals.

The LCLK terminals are terminals for communication clock signals output from the camera body 200 to the interchangeable lens assembly 100, and are also terminals for which the camera body 200 monitors a busy state of the interchangeable lens assembly 100. The DCL terminals are terminals for bidirectional communication of data between the camera body 200 and the interchangeable lens assembly 100, and are CMOS interfaces. The DLC terminals are terminals for communication data that is output from the interchangeable lens assembly 100 to the camera body 200, and are CMOS interfaces.

The DLC2 terminals are terminals for communication data that is output from the interchangeable lens assembly 100 to the camera body 200, and are CMOS interfaces. The DCA terminals are terminals for bidirectional communication of data between the camera body 200 and the interchangeable lens assembly 100, and are CMOS interfaces. The CS terminals are communication request signal terminals between the camera body 200 and the interchangeable lens assembly 100, and are open interfaces.

Other Terminals (Other Terminals)

MIF terminals are used for detecting whether the interchangeable lens assembly 100 has been mounted on the camera body 200, and whether the interchangeable lens assembly 100 has been dismounted from the camera body 200. After detecting that the interchangeable lens assembly 100 has been mounted on the camera body 200 by detecting the change in the voltage level of the MIF terminals, the camera control unit 18 starts supplying power to the VDD terminals and the VBAT terminals, and starts communication. In other words, the MIF terminals are triggers for the start of the supply of power from the camera body 200 to the interchangeable lens assembly 100. As described above, the TYPE terminals are terminals that distinguish the type of camera accessory mounted on the camera body 200. The camera control unit 618 detects the voltages of the signals of the TYPE terminals, and based on the value of the voltages, distinguishes the type of camera accessory mounted on the camera body 200. The interchangeable lens assembly 100 is pull-down connected to the DGND terminals at a predetermined resistance value described later. In the present exemplary embodiment, in a case where the interchangeable lens assembly 100 is mounted on the camera body 200, communication is performed while the interface voltages of the first communication unit, the second communication unit, and the third communication unit are set to 3.0 V.

Furthermore, in the exemplary embodiment described above, the configuration has been described in which a device that includes either one of the camera mount and the accessory mount is actually rotated relative to a device that includes the other one of the camera mount and the accessory mount to bayonet couple the devices to each other; however, the configuration is not limited thereto. For example, a configuration may be employed in which the camera mount and the accessory mount are enabled to be bayonet coupled to each other by causing the camera mount and the accessory mount to be relatively rotated against each other. Hereinafter, the detail of this configuration will be described specifically.

Figure 10:
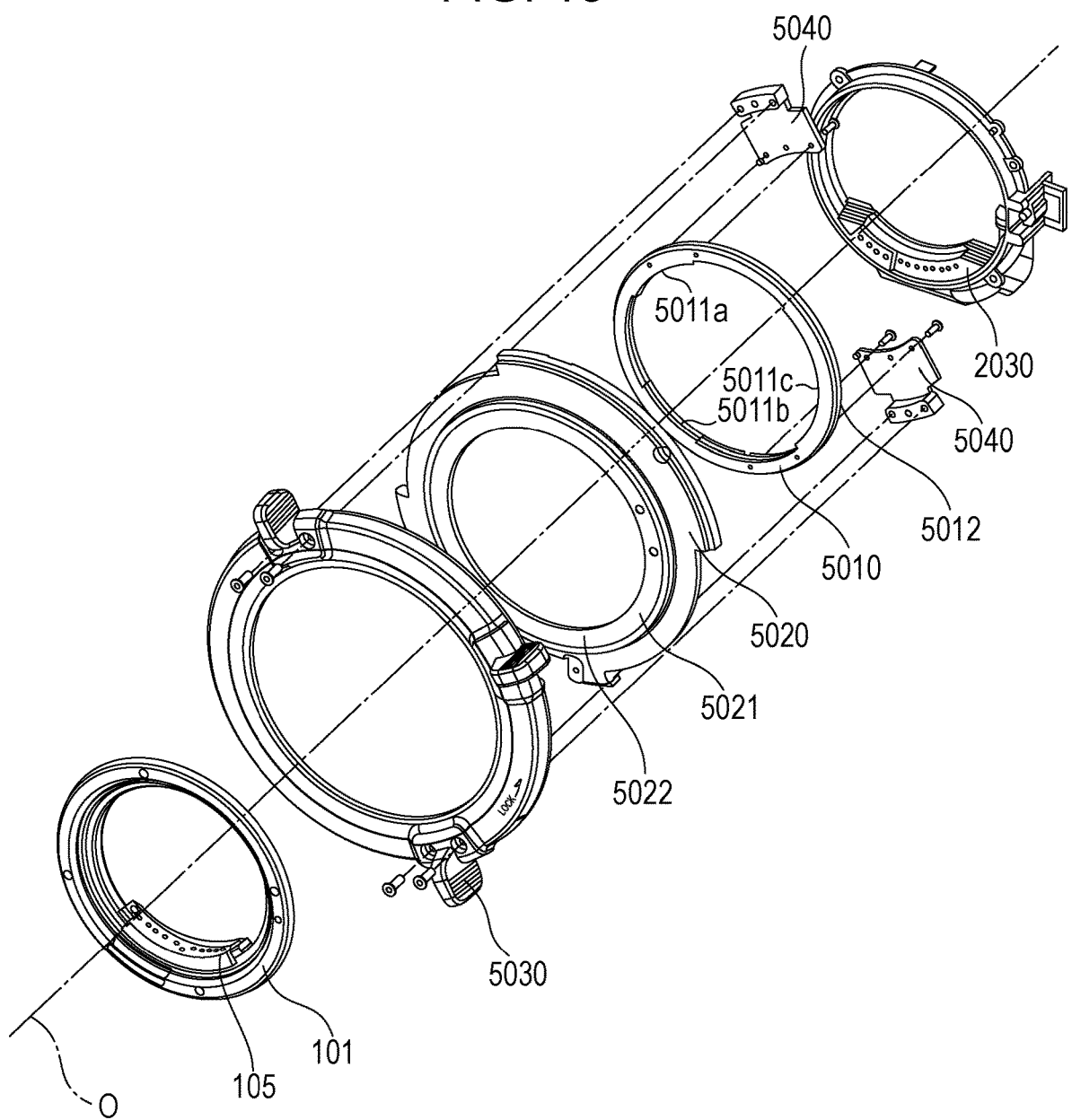
FIG. 10 is an exploded perspective view of a mount mechanism according to a modification.
Figure 11A:
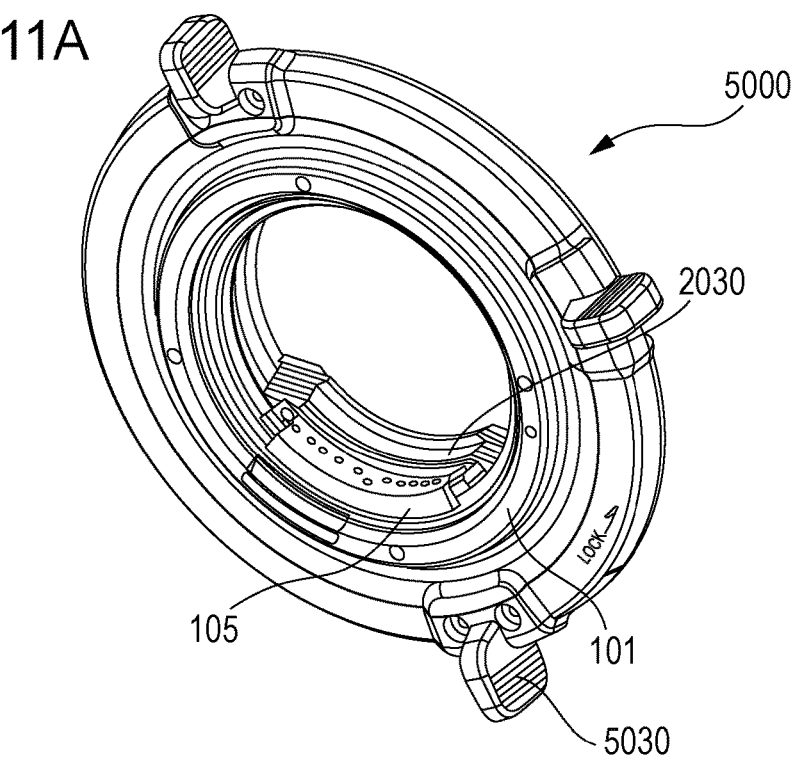
FIG. 11A is a drawing illustrating a mount mechanism according to the modification in a non-connected state.

FIG. 10 is an exploded perspective view of a mount mechanism 5000 according to a modification of the present invention. FIG. 11 is a diagram that exemplifies a non-connected state of the mount mechanism 5000 according to the modification of the present invention. FIG. 12 is a diagram that exemplifies a connected state of the mount mechanism 5000 according to the modification of the present invention. Note that in FIGS. 10 to 12, for the sake of description, a movable mount portion 5010 of the mount mechanism 5000, and a lens mount 101 that is capable of being bayonet coupled to the movable mount portion 5010 of the mount mechanism 5000 are illustrated at the same time. Furthermore, descriptions of members that are the same as those of the foregoing exemplary embodiment are omitted and the same reference numerals are attached to those members.

As illustrated in FIG. 10, in the mount mechanism 5000 of the present modification, an operation member 5030, a fixed mount portion 5020, the movable mount portion 5010, a contact point holding member 2030 that have an optical axis O as the central axis are disposed in that order from the side on which the lens mount 101 is attached. The operation member 5030 is a ring-shaped operation means rotatable about the central axis, and is connected to the movable mount portion 5010 with arm portions 5040 and screws. Note that in the present modification, the operation member 5030 and the movable mount portion 5010 are fixed to each other at two portions using two arm portions 5040 disposed in a direction orthogonal to the central axis. With this configuration, the movable mount portion 5010 is also rotated about the central axis in accordance with the rotating operation of the operation member 5030 in an integrated manner.

Movable mount claw portions 5011a, 5011b, and 5011c capable of being bayonet coupled to bayonet claw portions provided in the lens mount 101 are provided in the movable mount portion 5010. Furthermore, a screw portion 5012 threaded about the central axis is provided in the movable mount portion 5010. The state in which the screw portion 5012 and a screw portion 5022 of the fixed mount portion 5020 described later are screwed to each other changes in accordance with the rotation of the movable mount portion 5010 about the central axis.

The fixed mount portion 5020 includes a camera mount surface 5021 that abuts against a mount surface of the lens mount 101, and the screw portion 5022 that is screwed to the screw portion 5012 of the movable mount portion 5010 described above. Unlike the movable mount portion 5010 described above, the fixed mount portion 5020 does not rotate about the central axis in accordance with the rotating operation of the operation member 5030.

Figure 11B:
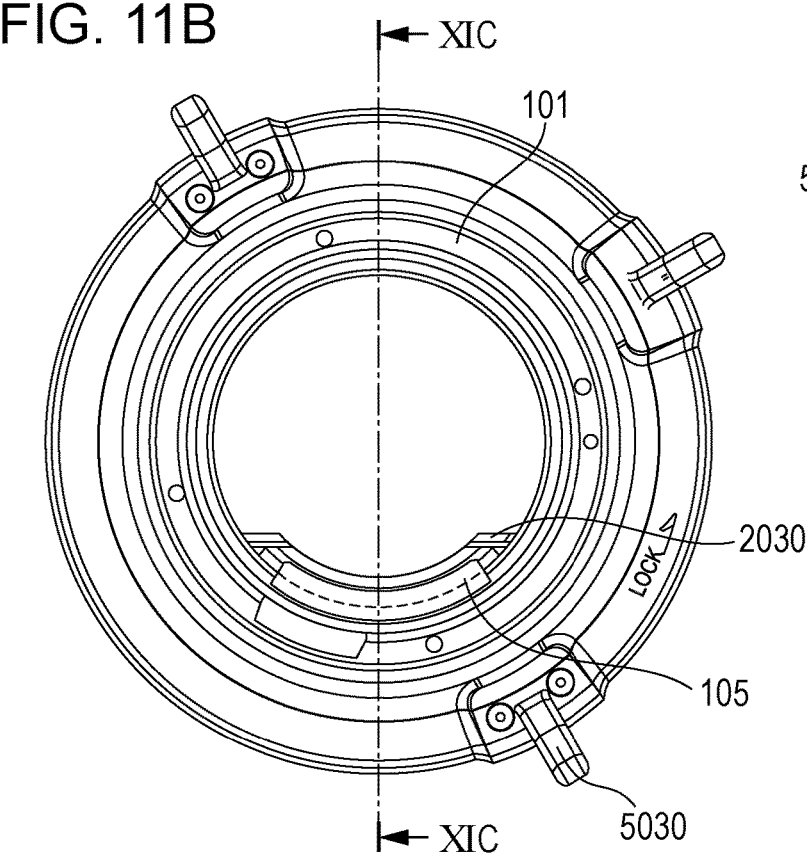
FIG. 11B is a drawing illustrating a mount mechanism according to the modification in a non-connected state.
Figure 11C:
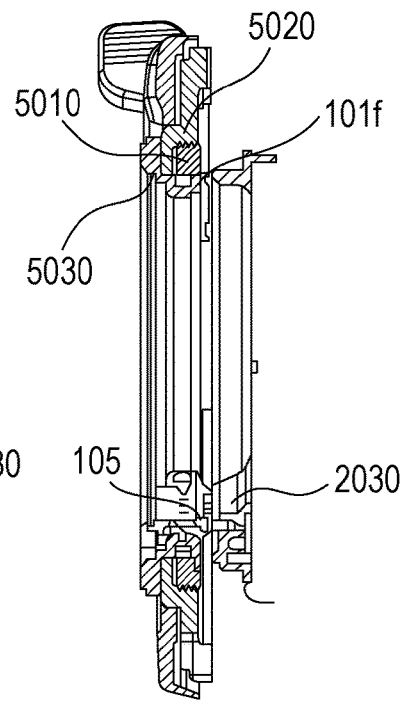
FIG. 11C is a drawing illustrating a mount mechanism according to the modification in a non-connected state.
Figure 12A:
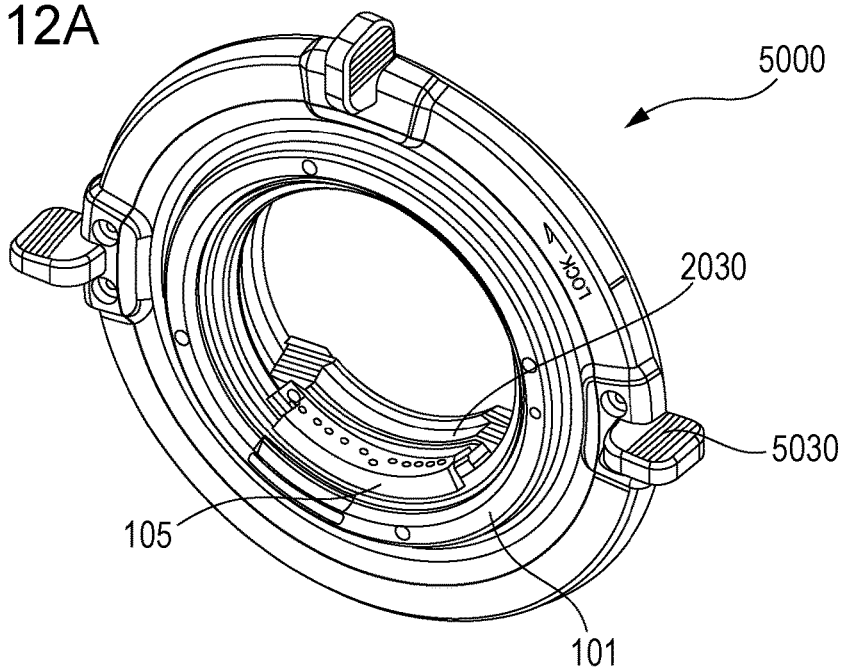
FIG. 12A is a drawing illustrating a mount mechanism according to the modification in a connected state.

Referring next to FIGS. 11 to 12, a bayonet coupling method of the mount mechanism according to the present modification will be described. Note that while in a state in which each of the bayonet claws provided on the lens mount 101 is inserted in an opening portion of the operation member 5030 and an opening portion of the fixed mount portion 5020, the bayonet claws are engageable with the movable mount claw portions 5011a to 5011c of the movable mount portion 5010. In the state illustrated in FIG. 11, the operation member 5030 is positioned in the unlocking position. In this state, while a lens mount surface of the lens mount 101 and the camera mount surface 5021 of the fixed mount portion 5020 abut against each other, the claw portions of the lens mount 101 and the claw portions of the movable mount portion 5010 do not engage or overlap each other when viewed in the central axis direction. FIG. 11C is a cross-sectional diagram taken along a cross-section XIC-XIC in FIG. 11B. FIG. 12 illustrates an exemplification of the mount mechanism 5000 in a state in which the rotation operation has been performed on the operation member 5030 from that state.

Figure 12B:
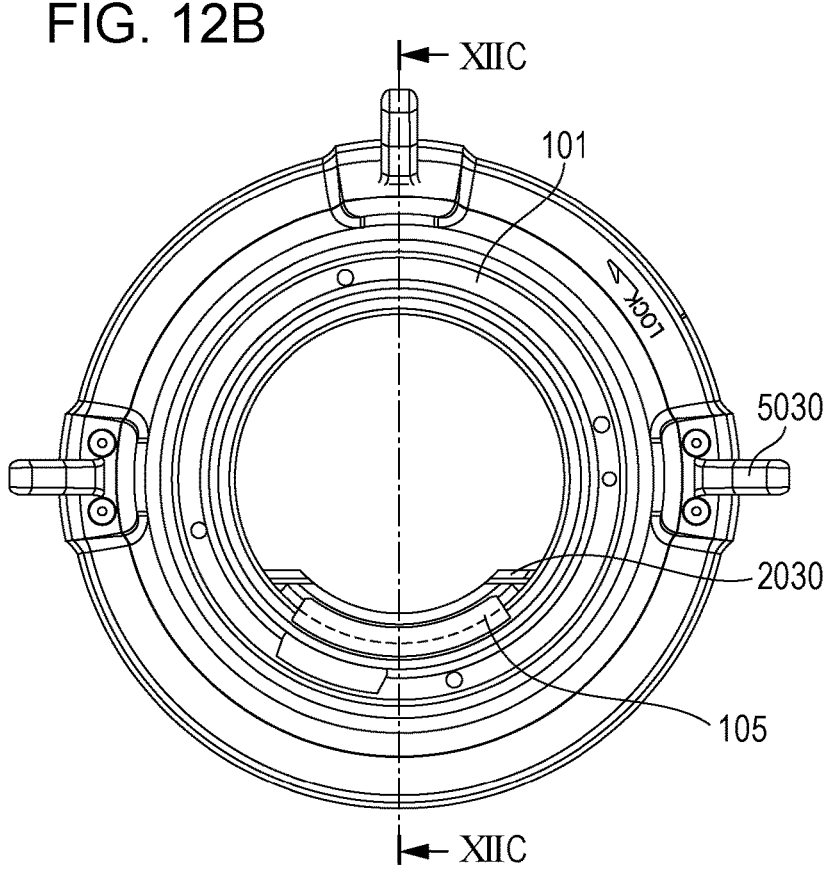
FIG. 12B is a drawing illustrating a mount mechanism according to the modification in the connected state.
Figure 12C:
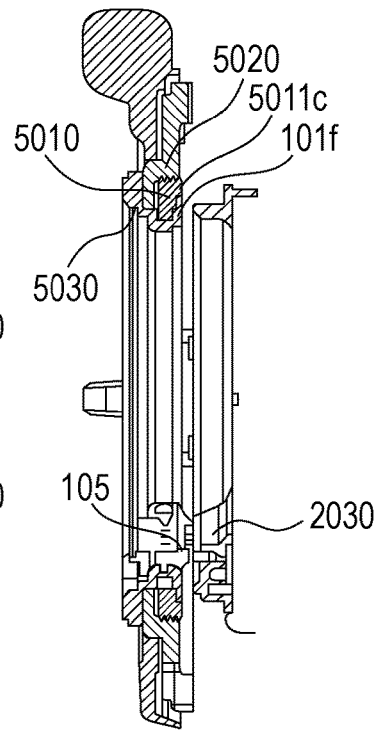
FIG. 12C is a drawing illustrating a mount mechanism according to the modification in the connected state.

In the state illustrated in FIG. 12, the operation member 5030 is positioned in the locking position. In this state, when viewed in the central axis direction, the claw portions of the lens mount 101 and the claw portions of the movable mount portion 5010 overlap each other to engage with each other in the central axis direction. Furthermore, in this state, in accordance with the rotating operation of the operation member 5030, the state in which the screw portion 5022 of the fixed mount portion 5020 and the screw portion of the movable mount portion 5010 are screwed to each other changes and the movable mount portion 5010 moves in the central axis direction towards the image pickup apparatus side. FIG. 12C is a cross-sectional diagram taken along cross-section XIIC-XIIC in FIG. 12B. As illustrated in FIGS. 11C and 12C, the movable mount portion 5010 moves away from the fixed mount portion 5020 in a center axis direction of the mount based on a non-locking state of the mount mechanism 5000 changing to a lock state of the mount mechanism 5000. With this configuration, the movable mount claw portions 5011a to 5011c engaged with the bayonet claw portions on the lens mount 101 side each move towards the image pickup apparatus side.

As described above, in the mount mechanism 5000 of the present modification, rotating of the movable mount portion including the claw portions capable of being engaged with the claw portions on the lens mount side about the central axis enables the movable mount portion to be moved in the central axis direction relative to the fixed mount portion. With this configuration, in a state in which the lens mount and the camera-side mount are connected to each other, the mount mechanism 5000 of the present modification can reduce the occurrence of the gap (the backlash) created between the lens mount and the camera-side mount.

In the modification described above, while a configuration in which the mount mechanism 5000 is provided on the image pickup apparatus side has been described, the present invention can be applied to, for example, a configuration in which the mount mechanism 5000 is provided on the camera accessory side, such as the interchangeable lens assembly side.

Hereinafter, a more detailed description of the dispositional relationship between the terminals and the mount portions will be given.

Figure 13A:
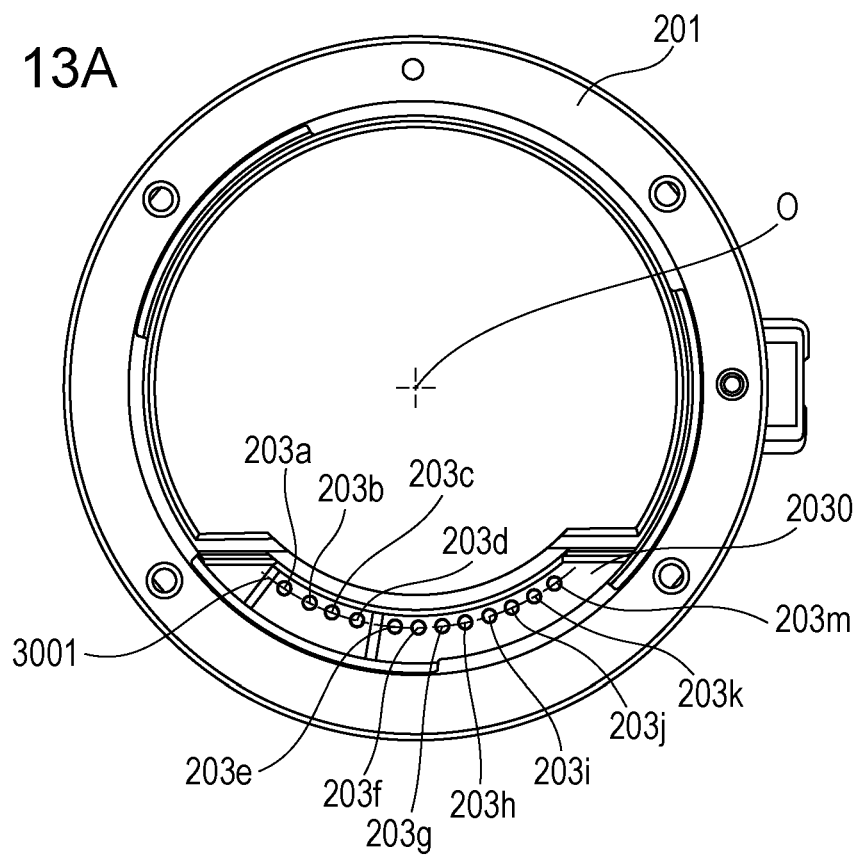
FIG. 13A is a detailed diagram illustrating a dispositional relationship of camera contact pins according to the present exemplary embodiment.
Figure 13B:
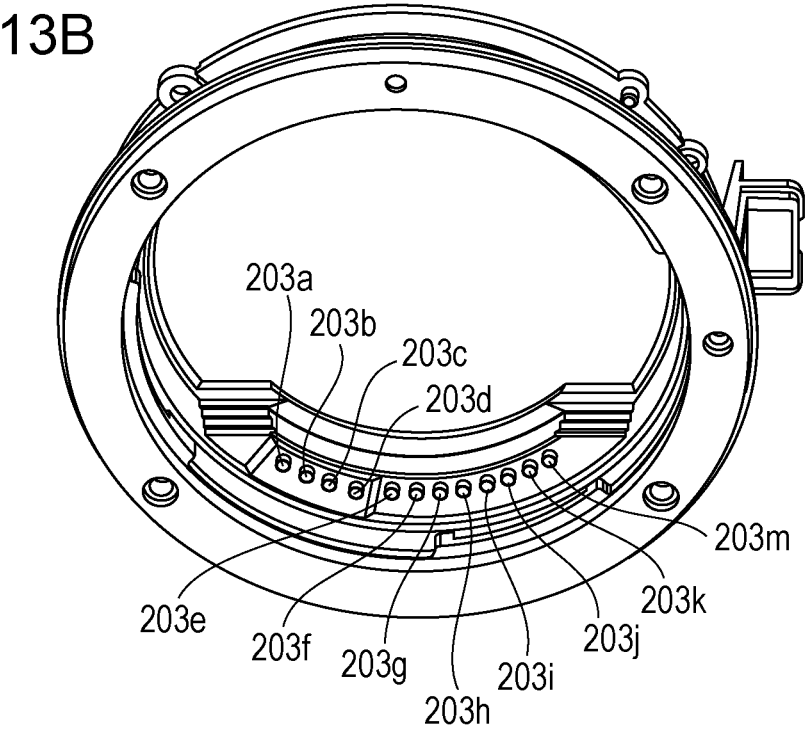
FIG. 13B is a perspective view illustrating a dispositional relationship of camera contact pins according to the present exemplary embodiment.

Referring to FIGS. 13A and 13B, the dispositional relationship between the camera mount 201 and camera-side terminals described above will be described.

FIG. 13A is a diagram of the dispositional relationship between the camera mount 201, the plurality of terminal pins 203a to 203k, and 203m that are the plurality of camera-side terminals (first terminals), and a camera-side-terminal holding member 2030 when viewed from the subject side (a front side of the camera body 200). FIG. 13B is a diagram of the camera mount 201, the terminal pins 203a to 203k, and 203m, and the holding member 203 when viewed from obliquely above and from the subject side (the front side of the camera body 200).

As illustrated in FIG. 13A, in the holding member 2030, the terminal pins 203a to 203k, and 203m are arranged on a camera terminal pin arrangement line 3001. The terminal pins 203a to 203k, and 203m are each a movable terminal that can be advanced and retreated in a direction parallel to the optical axis O, and are biased towards the interchangeable lens assembly 100 side with springs (not illustrated).

The relationship between the terminals illustrated in FIG. 9B described above and the terminal pins is as follows. The terminal pin 203a is the camera-side VDD terminal, the terminal pin 203b is the camera-side VBAT terminal, the terminal pin 203c is the camera-side TYPE terminal, the terminal pin 203d is the camera-side PGND terminal, and the terminal pin 203e is the camera-side MIF terminal. Furthermore, the terminal pin 203f is the camera-side DCL terminal, the terminal pin 203g is the camera-side DLC terminal, the terminal pin 203h is the camera-side LCLK terminal, the terminal pin 203i is the camera-side DLC2 terminal, and the terminal pin 203j is the camera-side DCA terminal. Furthermore, the terminal pin 203k is the camera-side CS terminal, the terminal pin 203m is the camera-side DGND terminal.

As illustrated in FIG. 13B, the heights of the terminal pins 203a, 203b, 203c, and 203d in an optical axis O direction are higher than the heights of the terminal pins 203e, 203f, 203g, 203h, 203i, 203j, 203k, and 203m in the optical axis O direction. This is because the holding member 2030 includes two surfaces that have different heights in the optical axis O direction in which the terminal pins 203a, 203b, 203c, and 203d are provided in the higher surface and the rest of the terminal pins are provided in the lower surface.

In other words, all of the terminal pins of the present exemplary embodiment are not provided in surfaces at the same height. In the present exemplary embodiment, such a configuration enables prevention or reduction of abrasion of the terminals caused by the camera-side terminals sliding against the lens-side terminals when the interchangeable lens assembly 100 is mounted on the camera body 200. More specifically, when the interchangeable lens assembly 100 is rotated from the locking position to the unlocking position to mount the interchangeable lens assembly 100 on the camera body 200, there is a period in which the terminal pins 203e to 203k, and 203m are not in contact with the lens-side terminals. Thus, the abrasion of the terminals described above can be prevented or reduced.

Figure 14A:
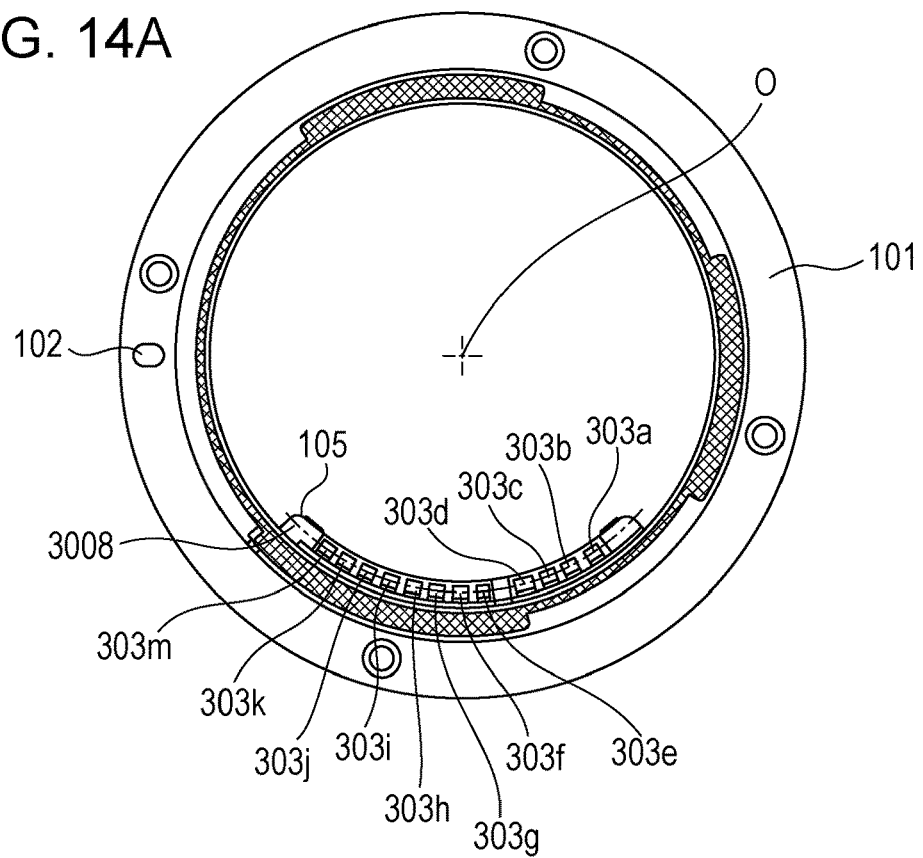
FIG. 14A is a detailed diagram illustrating a dispositional relationship of lens contact portions according to the present exemplary embodiment.
Figure 14B:
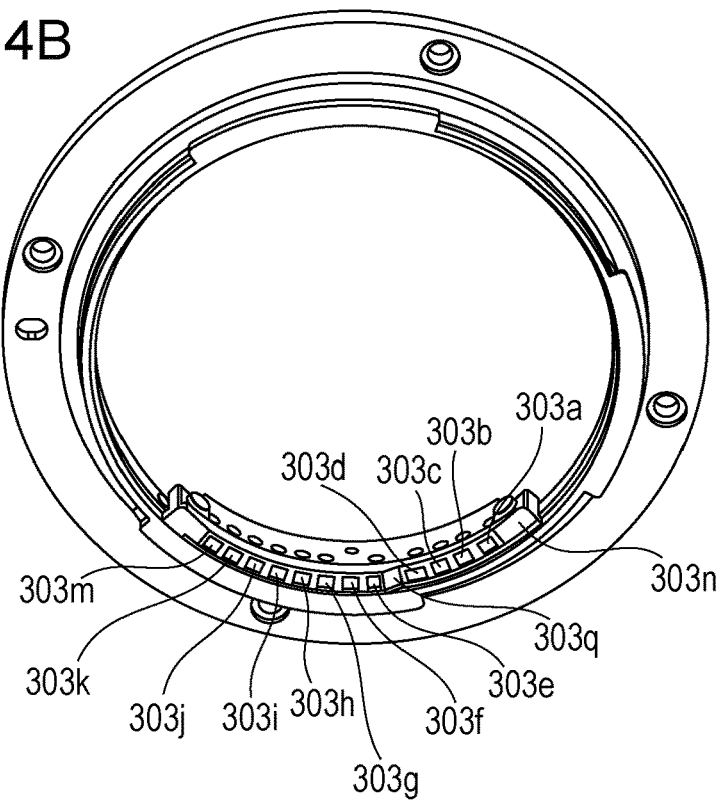
FIG. 14B is a perspective view illustrating a dispositional relationship of the lens contact portions according to the present exemplary embodiment.

Referring next to FIGS. 14A and 14B, the dispositional relationship between the lens mount 101 and lens-side terminals described above will be described. FIG. 14A is a diagram of the dispositional relationship between the lens mount 101 in a state where the interchangeable lens assembly 100 is in the lock phase state, the terminal surfaces 303a to 303k, and 303m that are the plurality of lens-side terminals (second terminals), and the holding member 105 when viewed from the photographer side. FIG. 14B is a diagram of the lens mount 101, the terminal surfaces 303a to 303k and 303m, and the holding member 105 viewed from obliquely above from the photographer side in a case in which the interchangeable lens assembly 100 is in the lock phase state and in which the interchangeable lens assembly 100 is mounted on the camera body 200.

As illustrated in FIG. 14A, in the holding member 105, the terminal surfaces 303a to 303k, and 303m are arranged on a lens contact point arrangement line 3008. The relationship between the terminals illustrated in FIG. 9B described above and the terminal surfaces is as follows. The terminal surface 303a is the lens-side VDD terminal, the terminal surface 303b is the lens-side VBAT terminal, the terminal surface 303c is the lens-side TYPE terminal, the terminal surface 303d is the lens-side PGND terminal, and the terminal surface 303e is the lens-side MIF terminal.

Furthermore, the terminal surface 303f is the lens-side DCL terminal, the terminal surface 303g is the lens-side DLC terminal, the terminal surface 303h is the lens-side LCLK terminal, the terminal surface 303i is the lens-side DLC2 terminal, and the terminal surface 303j is the lens-side DCA terminal. Furthermore, the terminal surface 303k is the lens-side CS terminal, and the terminal surface 303m is the lens-side DGND terminal.

As illustrated in FIG. 14B, the heights of the terminal surfaces 303a, 303b, 303c, and 303d in the optical axis O direction are lower than the heights of the terminal surfaces 303e, 303f, 303g, 303h, 303i, 303j, 303k, and 303m in the optical axis O direction. This is because the holding member 105 includes two surfaces that have different heights in the optical axis O direction in which the terminal surfaces 303a, 303b, 303c, and 303d are provided on the lower surface and the rest of the terminal surfaces are provided on the higher surface. The lens-side terminals that have this configuration with respect to the configuration of the camera-side terminals described above enables prevention or reduction of the abrasion of the terminals described above.

Guiding inclined faces 303n and 303q (inducing oblique surfaces) are used for mounting the interchangeable lens assembly 100 on the camera body 200 by pushing the terminal pins into the image pickup means 202 side when the interchangeable lens assembly 100 is rotated. By providing the guiding inclined faces, the contact pressure against the lens mount 101 of the terminal pins provided on the camera body 200 side changes in a gentle and stepwise manner; accordingly, deformation of the terminal pins provided on the camera body 200 side can be reduced.

Figure 15A:
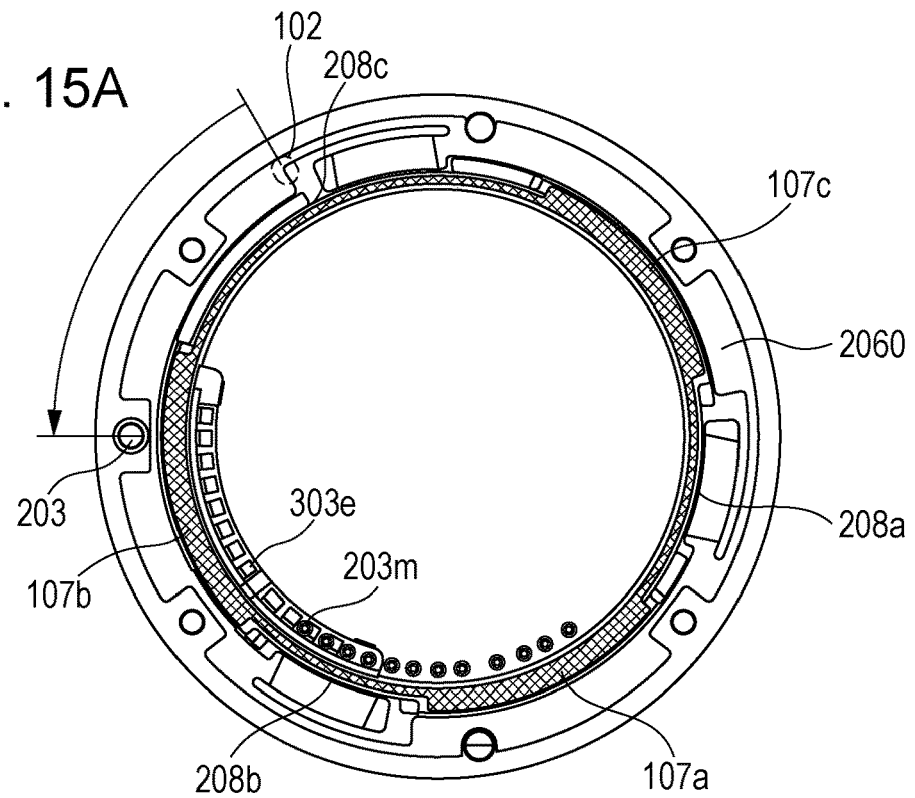
FIG. 15A is a diagram illustrating an insertion phase state when the interchangeable lens assembly is attached to the camera according to the present exemplary embodiment viewed from a camera photographer side.
Figure 15B:
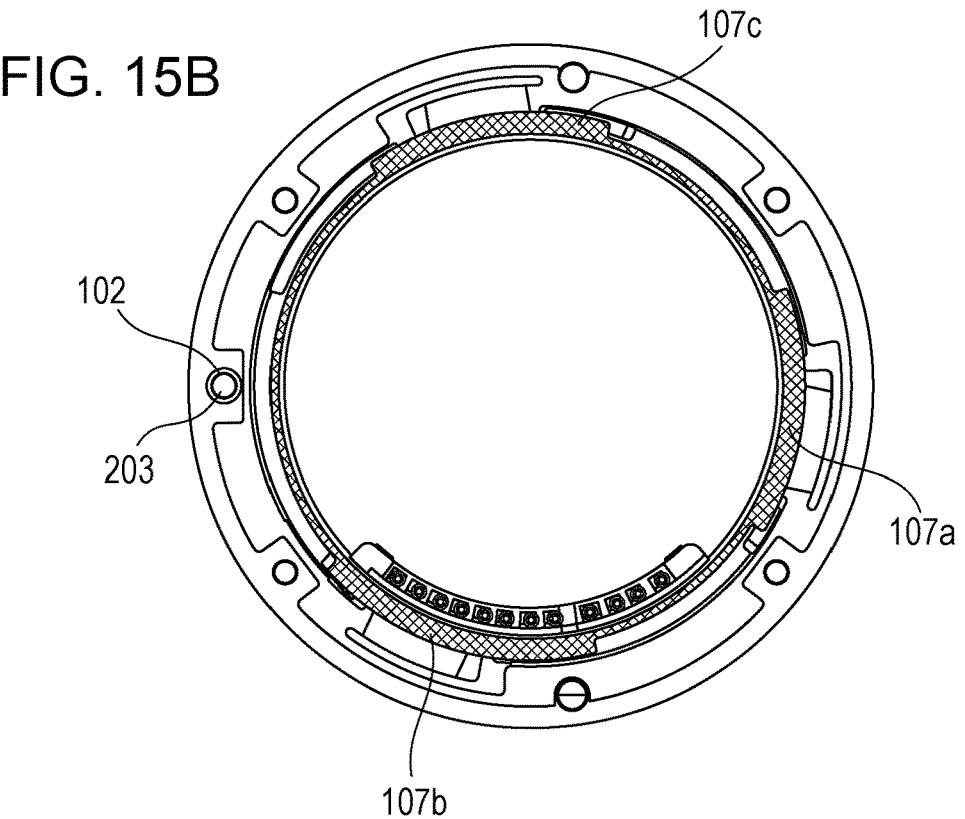
FIG. 15B is a diagram illustrating a lock phase state when the interchangeable lens assembly is attached to the camera according to the present exemplary embodiment viewed from the camera photographer side.

Referring next to FIGS. 15A and 15B, an operation of fitting the interchangeable lens assembly 100 on the camera body 200 will be described.

The operation of mounting a camera accessory, such as the interchangeable lens assembly 100, on the camera body 200 can be broadly separated into a first operation and a second operation described next.

Figure 4B:
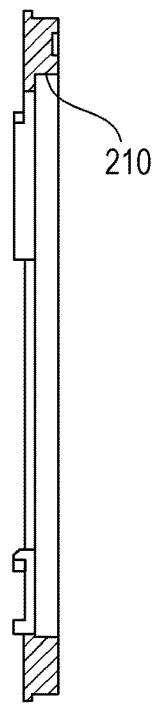
FIG. 4B is a cross sectional view of a camera mount, taken along line IVB-IVB.

In the first operation, the interchangeable lens assembly 100 is inserted into the camera body 200 with the positions between the camera body 200 and the interchangeable lens assembly 100 set to predetermined positions in the rotation direction so as to allow the lens claw portions enter the camera cutaway portions. The lens-side diameter fitting portion 109 in FIG. 3B and the camera-side diameter fitting portion 210 in FIG. 4B are then diametrically fitted to each other. In the second operation, while the lens-side diameter fitting portion 109 and the camera-side diameter fitting portion 210 are diametrically fitted to each other, relatively rotating the camera body 200 and the interchangeable lens assembly 100 towards the locking position, and then, the camera body 200 and the interchangeable lens assembly 100 are brought into a bayonet coupled state.

FIG. 15A is a diagram illustrating an insertion phase state (a first state) when the camera body 200 is attached to the interchangeable lens assembly 100 of the present exemplary embodiment when viewed from the camera mount 201 side (the photographer side). The insertion phase state herein refers to a state in which the first lens-side claw portion 107a is inserted into the second camera-side cutaway portion 209b, the second lens-side claw portion 107b is inserted into the third camera-side cutaway portion 209c, and the third lens-side claw portion 107c is inserted into the first camera-side cutaway portion 209a. The lens-side diameter fitting portion 109 and the camera-side diameter fitting portion 210 are diametrically fitted to each other in this state.

FIG. 15B is a diagram illustrating a lock phase state (a second state) when the camera body 200 is attached to the interchangeable lens assembly 100 of the present exemplary embodiment when viewed from the camera mount 201 side (the photographer side). The lock phase state herein refers to a state in which the interchangeable lens assembly 100 is rotated 60°, from the insertion phase state illustrated in FIG. 15A described above, in the clockwise direction when viewed from the subject side of the interchangeable lens assembly 100 to engage the lens claw portions and the camera claw portions to each other.

More specifically, in the lock phase state, the first lens-side claw portion 107a is positioned on the image pickup means 202 side of the first camera-side claw portion 208a, and the second lens-side claw portion 107b is positioned on the image pickup means 202 side of the second camera-side claw portion 208b. Furthermore, the third lens-side claw portion 107c is positioned on the image pickup means 202 side of the third camera-side claw portion 208c. The lens claw portions and the camera claw portions are engaged with each other in this state, and the lock pin 203 is inserted in the lock pin groove 102; accordingly, rotation of the interchangeable lens assembly 100 is locked. Furthermore, in the lock phase state, the lens claw portions are biased towards the image pickup means 202 with the lens mount biasing member 207. Here, in place of the lens mount biasing member 207, a leaf spring portion may be provided in each camera claw portion.

Furthermore, when the interchangeable lens assembly 100 transitions from the insertion phase state to the lock phase state, the terminal pins on the camera body 200 side are pressed towards the image pickup means 202 side by the guiding inclined faces 303n and 303q described above.

Furthermore, while being continuously pressed, each of the terminal pins on the camera body 200 side come in contact with the corresponding terminal surfaces 303a to 303k, and 303m. Here, the terminal pin 203m and the terminal surface 303e come in contact with each other first.

As described above, while the configuration of the interchangeable lens assembly 100 has been described by exemplifying an interchangeable lens assembly 100 serving as the optical apparatus, for example, in the present exemplary embodiment, the optical apparatus of the present invention is not limited to the interchangeable lens assembly 100. For example, an adapter that can be interposed between the interchangeable lens assembly 100 and the camera body 200 may serve as the optical apparatus (the accessory) of the present invention. Hereinafter, a further detailed description of this adapter will be given. In the following description, a second conversion adapter 70 to be described below has a camera mount 1201 having the same configuration as the camera mount 201 of the camera body 200. In the following description, a first conversion adapter 40 has a lens mount 1101 having the same configuration as that of the lens mount 101 of the first lens 100 (interchangeable lens assembly 100).

The camera mount 201 and the lens mount 101 have a ring-shape, but the following shape may be employed. Specifically, the shape of the opening or the portion to be contact to the other of each of the camera mount 201 and lens mount 101 may have an arc-shape. In other words, the shape of each of the camera mount 201 and the lens mount 101, in particular, the shape of the opening or the shape of the portion to be contact to the other may have a ring-shape with a part thereof lacking.

Figure 16A:
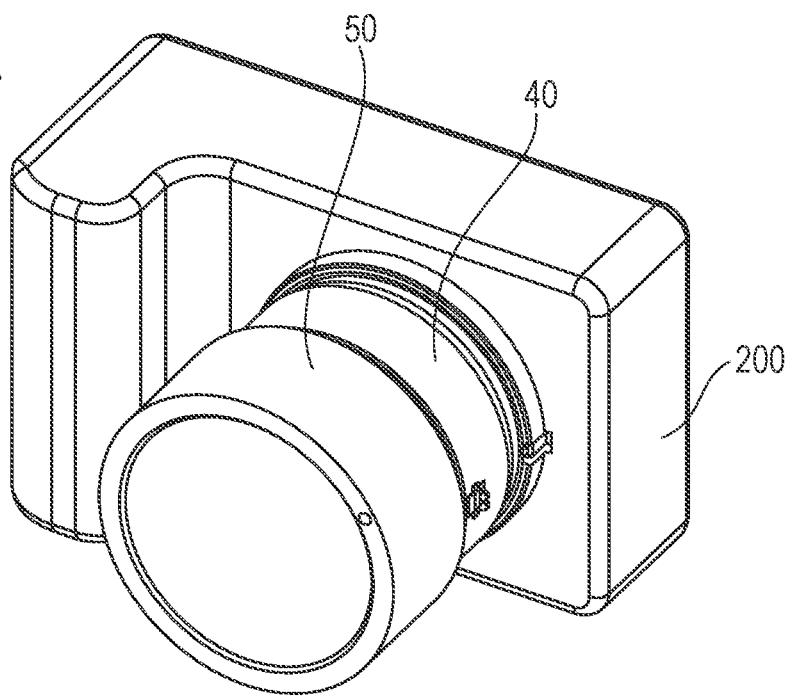
FIG. 16A is a diagram illustrating a first conversion adapter 40 that is mountable to a camera body 200, and a second interchangeable lens assembly 50.
Figure 16B:
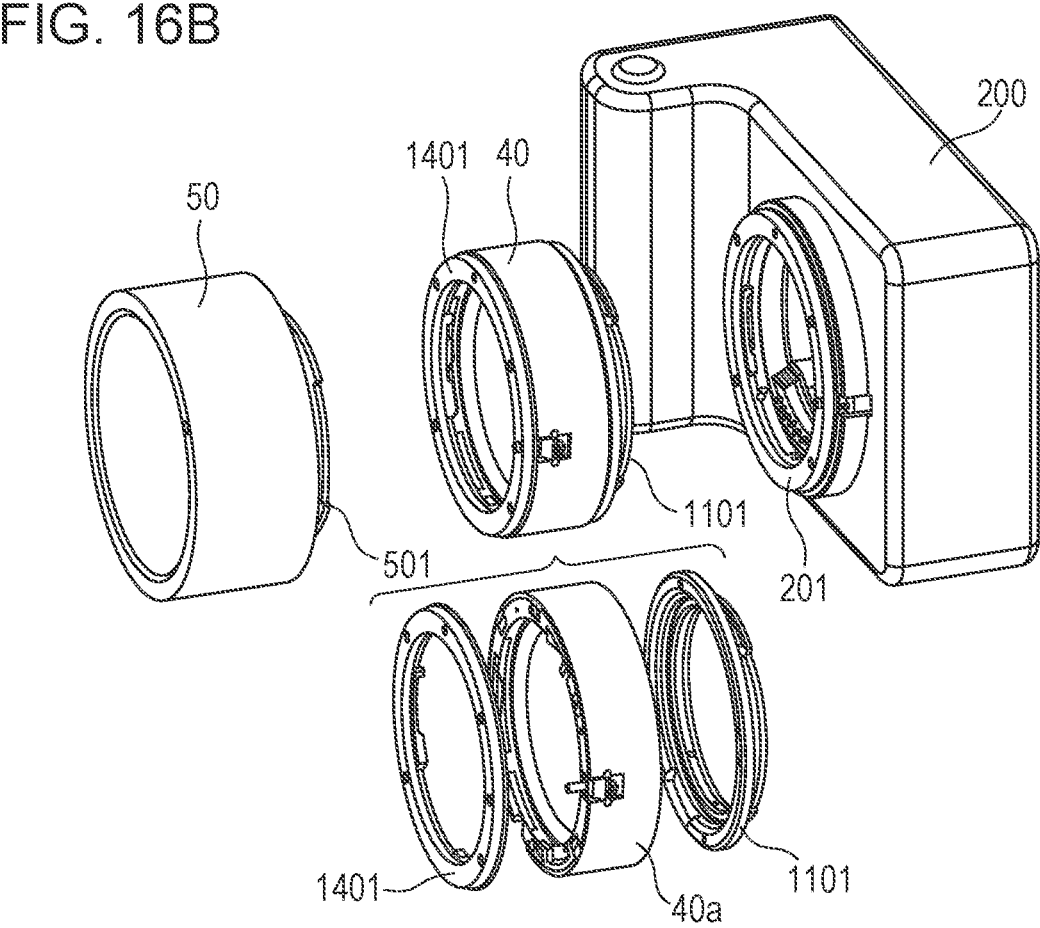
FIG. 16B is a diagram illustrating the first conversion adapter 40 that is mountable to the camera body 200, and the second interchangeable lens assembly 50.

Initially, the basic configuration of a conversion adapter (adapter device) that is a camera accessory mountable to the camera mount 201 of the above-described camera body 200 will be described with reference to FIGS. 16 to 17. FIG. 16 is a diagram illustrating a first conversion adapter 40 which is mountable to the camera body 200, and a second interchangeable lens assembly 50. FIG. 16A illustrates an external perspective view of the second interchangeable lens assembly 50 which is mounted to the camera body 200 via the first conversion adapter 40. FIG. 16B illustrates an external perspective view of a state where the camera body 200, the first conversion adapter 40, and the second interchangeable lens assembly 50 have each been detached. The second interchangeable lens assembly (hereinafter referred to as a second lens) 50 has a lens mount 501 that is short in flange focal length, but has the same mount diameter as the camera mount 201, as to the camera body 200. That is to say, while the second lens 50 has the same mount diameter as the above-described first lens 100, the second lens 50 is a camera accessory that is not compatible with direct mounting to the camera body 200, unlike the first lens 100.

Figure 17A:
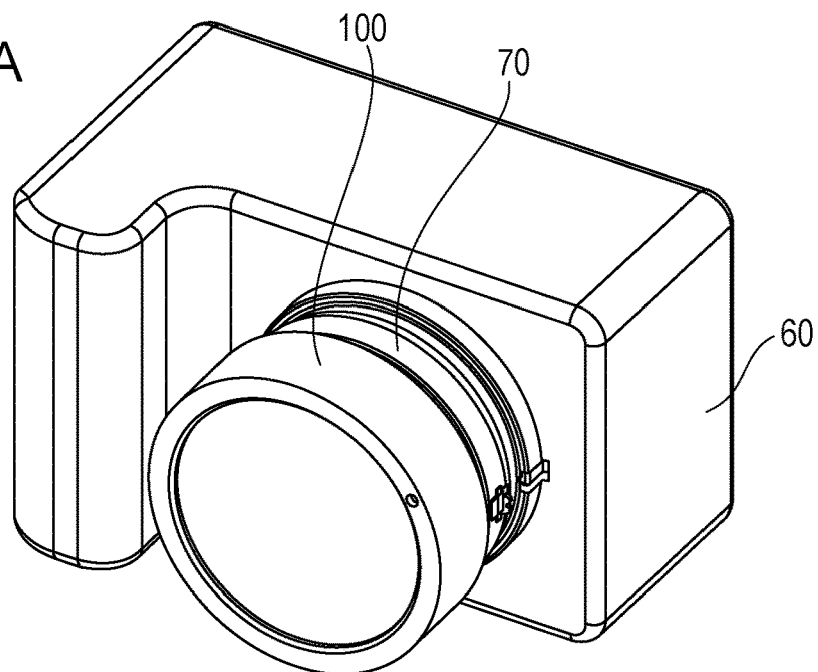
FIG. 17A is a diagram illustrating a second conversion adapter 70 that is mountable to a camera body 60, and a first interchangeable lens assembly 100.
Figure 17B:
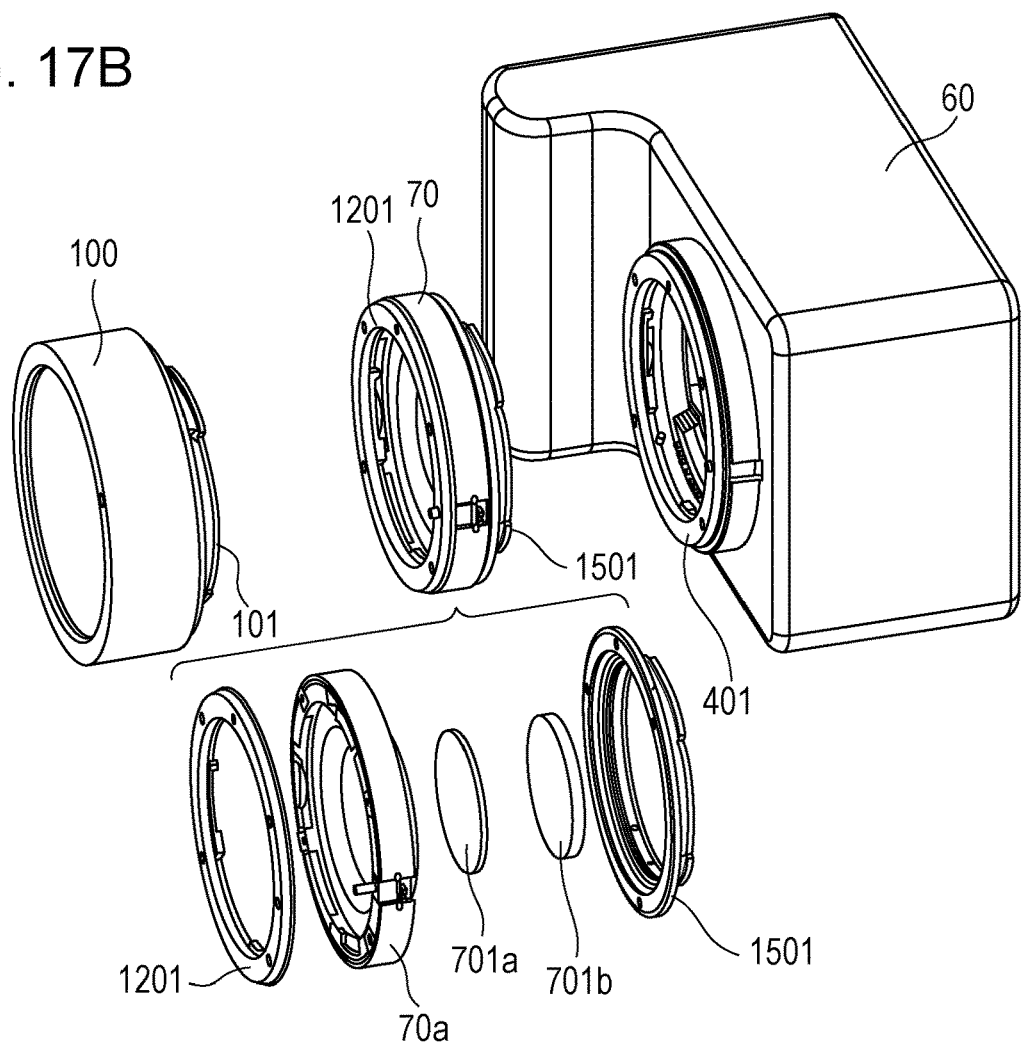
FIG. 17B is a diagram illustrating a second conversion adapter 70 that is mountable to a camera body 60, and a first interchangeable lens assembly 100.

FIG. 17 is a diagram illustrating a second conversion adapter 70 which is mountable to a camera body 60 and the first lens 100. FIG. 17A illustrates an external perspective view of a state where the first lens 100 is mounted to the camera body 60 via the second conversion adapter 70, and FIG. 17B illustrates an external perspective view where the camera body 60, the second conversion adapter 70, and the first lens 100 have each been detached.

Here, in a case where an interchangeable lens assembly with a long flange focal length is directly mounted to an image pickup apparatus with a short flange focal length, a failure may occur, such as the focal point not being formed at an accurate position, and imaging a subject in such a case may result in an unnatural image being obtained. For example, such a failure occurs in a case where the second lens 50 that has a long flange focal length is mounted to the above-described camera body 200.

Similarly, in a case where an interchangeable lens assembly with a short flange focal length is directly mounted to an image pickup apparatus with a long flange focal length, a failure will occur, such as the focal point not being formed at an accurate position, and imaging a subject in such a case may result in an unnatural image being obtained. For example, such a failure will occur if the first lens 100 that has a short flange focal length is mounted to the camera body 60 serving as a second image pickup apparatus that has a longer flange focal length than the above-described camera body 200.

Particularly, the camera body 200 and the camera body 60, and the first lens 100 and the second lens 50, have the same mount diameter, it is difficult for a user to judge which image pickup apparatuses and which interchangeable lens assemblies have flange focal lengths that are compatible for direct mounting based on their outer appearances.

Accordingly, it is desirable that only interchangeable lens assemblies that are compatible be directly mountable to a predetermined image pickup apparatus, so that image pickup apparatuses and interchangeable lens assemblies that have mutually incompatible flange focal lengths are not erroneously directly mounted.

Moreover, in a case of mounting an incompatible interchangeable lens assembly to an image pickup apparatus, a conversion adapter needs to be interposed between the two to adjust the flange focal length. However, in a case where an interchangeable lens assembly compatible with an image pickup apparatus in terms of direct mounting is mounted to one side of the conversion adapter with the other side thereof being mounted on the image pickup apparatus, the focal point may not be accurately formed, as described above. Accordingly, the one side and other side of the conversion adapter preferably have configurations to restrict image pickup apparatuses and camera accessories that are directly mountable.

Specifically, in a case where an interchangeable lens assembly having a long flange focal length is mounted to an image pickup apparatus having a short flange focal length, a conversion adapter one end side of which is mountable only to this image pickup apparatus and the other end side of which is mountable only to this interchangeable lens assembly is preferable. Moreover, in a case where an interchangeable lens assembly having a short flange focal length is mounted to an image pickup apparatus having a long flange focal length, a conversion adapter one end side of which is mountable only to this image pickup apparatus and the other end side of which is mountable only to this interchangeable lens assembly is preferable.

The first conversion adapter 40 has the lens mount 1101 attached to an adapter barrel 40a with fastening screws (omitted from illustration), on one end side in the optical axis direction. This lens mount 1101 is an accessory mount that is detachable from the camera mount 201 provided to the camera body 200 described above.

A camera mount 1401 is attached to the adapter barrel 40a with fastening screws (omitted from illustration), at the other end side of the first conversion adapter 40 in the optical axis direction. This camera mount 1401 is a camera mount that is detachable from the lens mount 501 of the second lens 50. The camera mount 401 of the first conversion adapter 40 is attached so that the imaging plane of the imaging sensor 11 of the camera body 200 will be situated at a position corresponding to the flange focal length of the second lens 50.

The second conversion adapter 70 has the lens mount 1501 attached to an adapter barrel 70a with fastening screws (omitted from illustration), on one end side in the optical axis direction. This lens mount 1501 is an accessory mount that is detachable from the camera mount 401 provided to the camera body 60.

The camera mount 1201 is attached to the adapter barrel 70a with fastening screws (omitted from illustration), at the other end side of the second conversion adapter 70 in the optical axis direction. This camera mount 1201 is a camera mount that is detachable from the lens mount 101 of the first lens 100, as described above.

A first optical member 701a and a second optical member 701b are provided to the second conversion adapter 70, between the adapter barrel 70a and the lens mount 1501 in the optical axis direction. The first optical member 701a and the second optical member 701b enable the second conversion adapter 70 to extend the flange focal length of the first lens 100 in accordance with the imaging plane of the imaging sensor disposed in the camera body 60. While the optical member has been illustrated as two lenses for the sake of convenience, this is not restrictive.

Figure 18A:
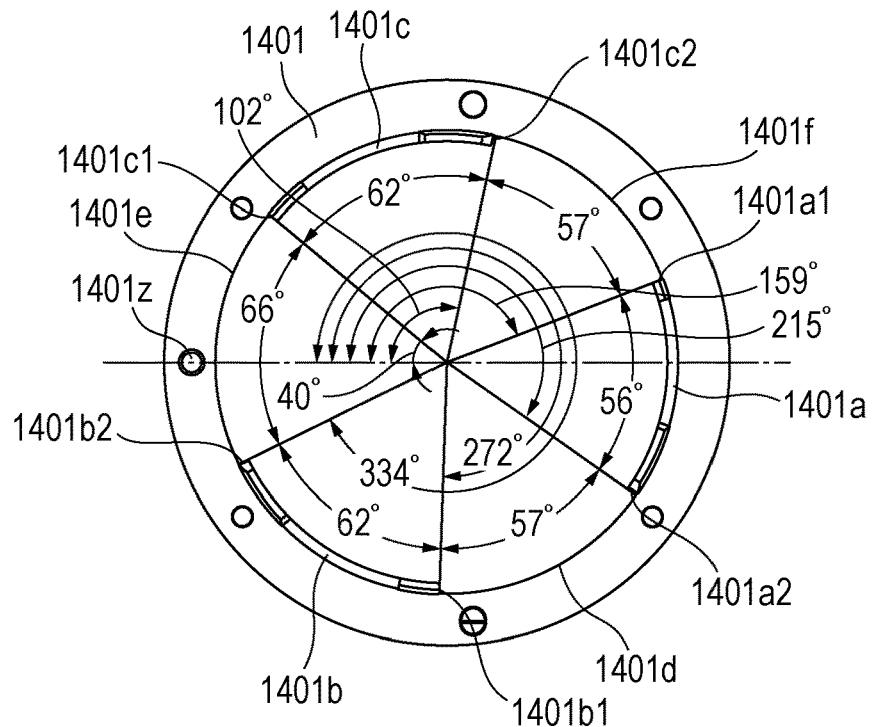
FIG. 18A is a diagram exemplarily illustrating a displacement angle of bayonet claw portions in a camera mount 1401 provided on one end of the first conversion adapter 40.
Figure 18B:
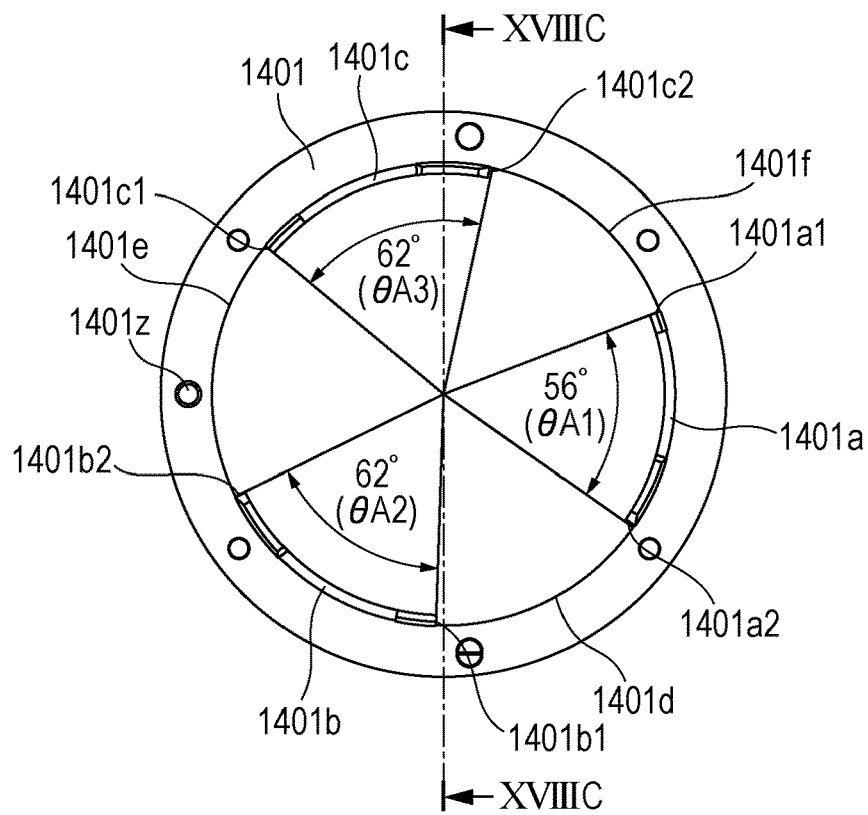
FIG. 18B is a diagram exemplarily illustrating a displacement angle of bayonet claw portions in a camera mount 1401 provided on one end of the first conversion adapter 40.
Figure 18C:
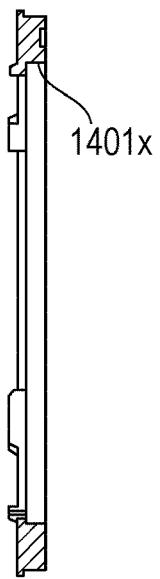
FIG. 18C is a diagram exemplarily illustrating a displacement angle of bayonet claw portions in a camera mount 1401 provided on one end of the first conversion adapter 40.

Next, the angles (phases) at which bayonet claws are disposed on the circumferential direction of the camera mount and the lens mount of the first conversion adapter 40 will be described with reference to FIG. 18 to FIG. 22. FIG. 18 is a diagram for exemplarily illustrating displacement angles of the bayonet claws in the camera mount 1401 provided on one end of the first conversion adapter 40. FIG. 18A is a diagram illustrating angle ranges that the camera claw portions and the camera cutaway portions occupy in the circumferential direction of the camera mount 1401 with the lock pin 1401z as a reference, when viewed from the rear face side (camera body 200 side). FIG. 18B is a diagram illustrating angle ranges that multiple camera claw portions 1401a to 1401c occupy in the circumferential direction of the camera mount 1401, when viewed from the rear face side (camera body 200 side). FIG. 18C is a cross-sectional diagram taken along cross-section XVIIIB-XVIIIB in FIG. 18B.

The first conversion adapter 40 is a mount adapter used for mounting the second lens 50 having a long flange focal length to the camera body 200 having a short flange focal length. Thus, it is preferable for the first conversion adapter 40 to be configured such that the lens mount 1101 cannot be directly mounted to the camera body 60 having a long flange focal length and the first lens 100 having a short flange focal length cannot be directly mounted to the camera mount 1401. This configuration satisfies such a positional relation of the claw portions and the cutaway portions that the lens mount 1101 provided on one end (first end) of the first conversion adapter 40 and the camera mount 1401 provided on the other end (second end) cannot each be directly mounted.

A first camera claw portion 1401a, a second camera claw portion 1401b, and a third camera claw portion 1401c, are provided in this order, on the camera mount 1401 in the circumferential direction (inner radial direction). When the camera mount 1401 is viewed from the rear face side as illustrated in FIG. 17A, the camera claw portion that is provided at a position farthest from the lock pin 1401z is the first camera claw portion 1401a. The second camera claw portion 1401b and the third camera claw portion 1401c are provided in this order from the first camera claw portion 1401a in a clockwise direction.

Moreover, a first camera cutaway portion 1401d, a second camera cutaway portion 1401e, and a third camera cutaway portion 1401f are provided in this order, on the camera mount 1401 in the circumferential direction (inner radial direction). When the camera mount 1401 is viewed from the rear face side as illustrated in FIG. 18A, the cutaway portion that is provided on a position nearest to the lock pin 1401z is the second camera cutaway portion 1401e. The third camera cutaway portion 1401f and the first camera cutaway portion 1401d are provided in this order from the second camera cutaway portion 1401e in a clockwise direction.

As illustrated in FIG. 18C, a fitting portion 1401x that restricts the movement of the camera accessory in a direction parallel to the optical axis of the camera accessory when the camera accessory is mounted, is provided on the camera mount 1401 side. In the present embodiment, the diameter of the fitting portion 1401x in a direction orthogonal to the optical axis on the camera mount 1401 side is regarded as the mount diameter.

The way of bayonet coupling of the first conversion adapter 40 and second lens 50 is the generally the same as the way of bayonet coupling of the camera body 200 and the first lens 100 described above, and thus a description will be omitted.

The end portions of the camera claw portions 1401a, 1401b, and 1401c, in the circumferential direction, will be referred to as first end portion 1401a1, second end portion 1401a2, third end portion 1401b1, fourth end portion 1401b2, fifth end portion 1401c1, and sixth end portion 1401c2, for the sake of description. The end portions are denoted with part numerals in order from the first camera claw portion 1401a in the clockwise direction, when the camera mount 1401 is viewed from the rear face side, as described above.

As illustrated in FIG. 18A, the angles that the camera claw portions and the camera cutaway portions occupy in the circumferential direction of the camera mount 1401 (angle ranges) in the first conversion adapter 40 according to the present embodiment are stipulated as follows. For the first camera claw portion 1401a, the angle θA1=56°, for the second camera claw portion 1401b, the angle θA2=62°, and for the third camera claw portion 1401c, the angle θA3=62°. Further, for the first camera cutaway portion 1401d, the angle is 57°, for the second camera cutaway portion 1401e, the angle is 66°, and for the third camera cutaway portion 1401f, the angle is 57°. In other words, the camera claw portions of the camera mount 1401 have different angles with respect to the above-described camera mount 201 of the camera body 200, but the angles of the camera cutaway portions are the same.

When the camera claw portions are viewed from the rear face side of the first conversion adapter 40, the angles at which the camera claw portions are disposed on the camera mount 1401 in the circumferential direction, with the position of the lock pin 1401z (referred to as reference position) as a reference are stipulated as follows. The first camera claw portion 1401a is disposed between 159° to 215° with the reference position as a start point. The second camera claw portion 1401b is disposed between 272° to 334° with the reference position as a start point. The third camera claw portion 1401c is disposed between 40° to 102° with the reference position as a start point.

Figure 19A:
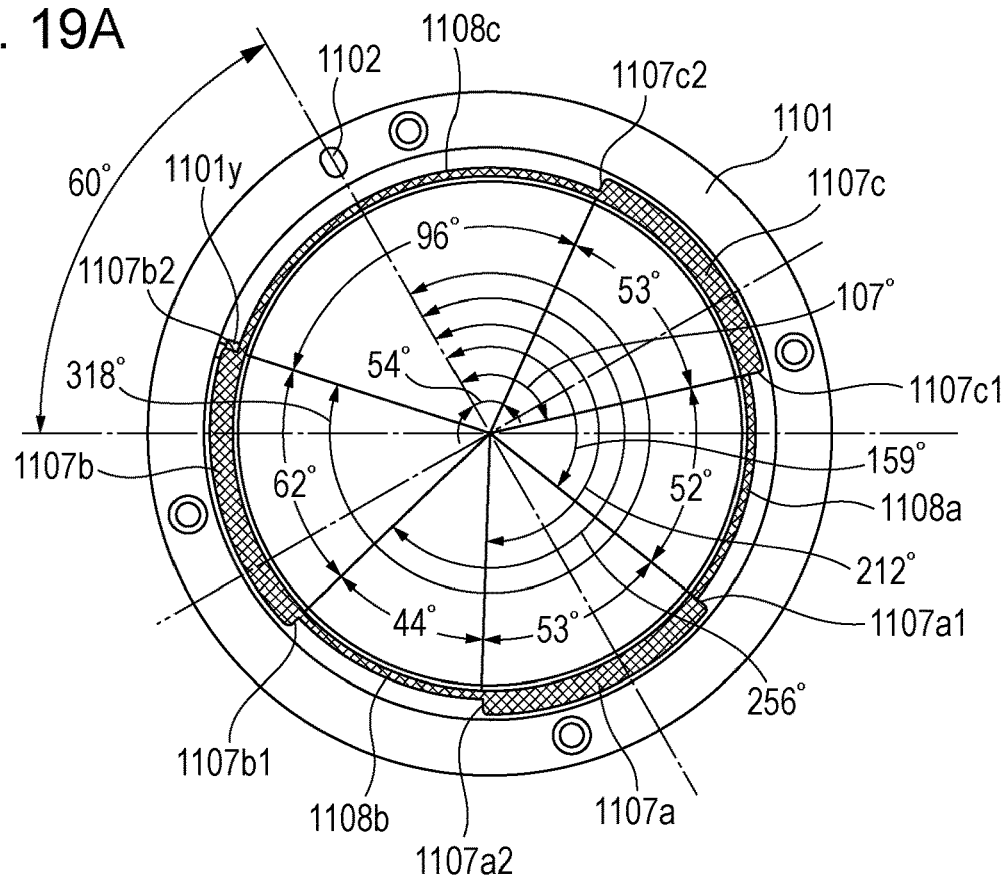
FIG. 19A is a diagram exemplarily illustrating a displacement angle of bayonet claw portions in the lens mount 1101 provided on the other end of the first conversion adapter 40.
Figure 19B:
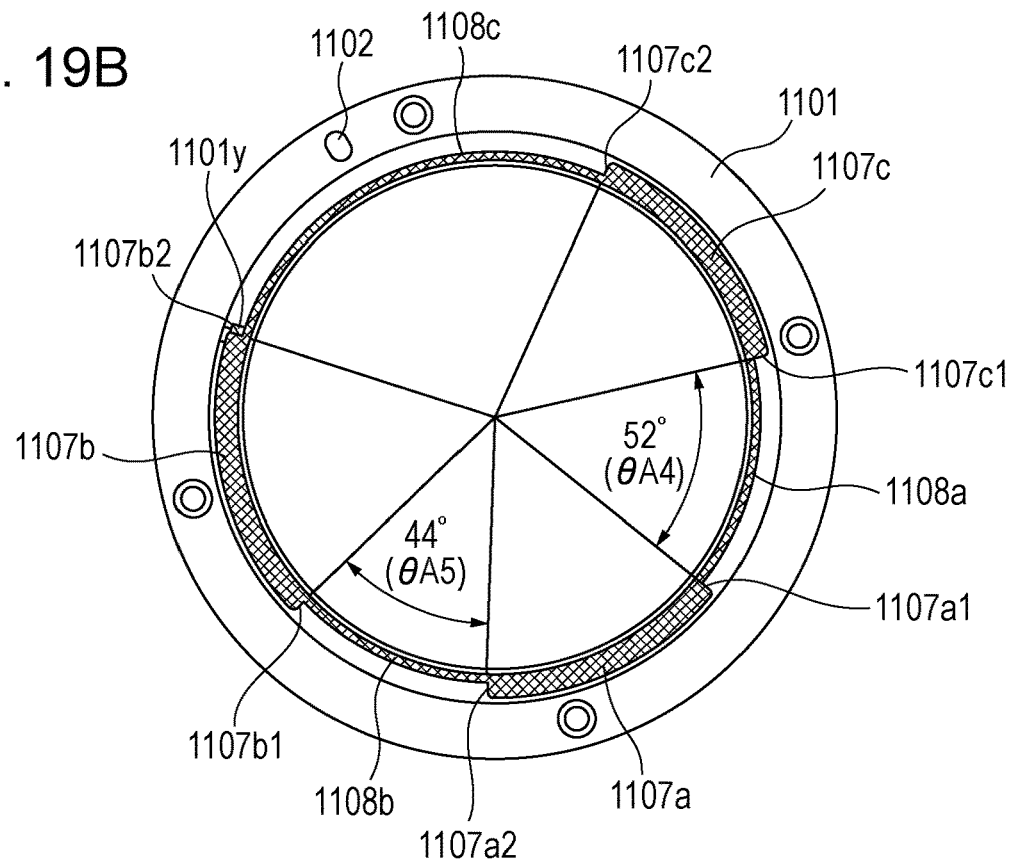
FIG. 19B is a diagram exemplarily illustrating a displacement angle of bayonet claw portions in the lens mount 1101 provided on the other end of the first conversion adapter 40.

Next, FIG. 19 is a diagram exemplarily illustrating displacement angles of the bayonet claws on the lens mount 1101 provided on the other end of the first conversion adapter 40. FIG. 19A is a diagram illustrating angle ranges that the lens claws and the lens cutaway portions occupy in the circumferential direction of the lens mount 1101 with the lock pin groove portion 1102 as a reference, when viewed from the rear face side. FIG. 19B is a diagram illustrating angle ranges that multiple lens cutaway portions 1108a to 1108c occupy in the circumferential direction of the lens mount 1101, when viewed from the rear face side.

In FIG. 19A, a circumferential-direction positioning pin 1101y prevents the first conversion adapter 40 from rotating excessively from a desired position when the first conversion adapter 40 is mounted on the camera body 200. Bringing the positioning pin 1101y into contact with the foregoing fourth end 1208b2 stops the rotation of the first conversion adapter 40 beyond the desired position described above. The first lens (the interchangeable lens assembly described in FIG. 2) 100 has a circumferential-direction positioning pin which is the same as the circumferential-direction positioning pin 1101y.

The angles (angle ranges) that the lens cutaway portions occupy in the circumferential direction of the lens mount 1101 are, represented by θA4 as the angle of the first lens-side cutaway portion 1108a and θA5 as the angle of the second lens-side cutaway portion 1108b, as illustrated in FIG. 19B. Note that the displacement angle of the claw portions and cutaway portions on the lens mount 1101 of the first conversion adapter 40 is similar to those of the lens mount 101 of the first lens 100 described above, and thus, descriptions thereof will be omitted.

The angles of the claw portions and the cutaway portions in the circumferential direction, on the lens mount 1101 and the camera mount 1401 provided to the first conversion adapter 40, will be compared. For example, on the lens mount 1101 side, the angle θA5 of the second lens-side cutaway portion 1108b having the smallest angle is 44°, whereas, on the camera mount 1401 side, the angle θA1 of the first camera claw portion 1401a having the smallest angle is 56°. In other words, the claw having the smallest angle on the camera mount 1401 side is larger than the cutaway portion having the smallest angle on the lens mount 1101 side (θA5<θA1). In this case, of the cutaway portions on the lens mount 1101 side and the claw portions on the camera mount 1401 side, at least one or more lens cutaway portions and camera claw portions will interfere with each other. Accordingly, even if an attempt is made to mount the interchangeable lens assembly to the camera body so that the optical axes of the camera mount 1401 and the lens mount 1101 are generally parallel, the claw portions and the cutaway portions interfere, and thus, the interchangeable lens assembly cannot be mounted to the camera body.

Figure 20A:
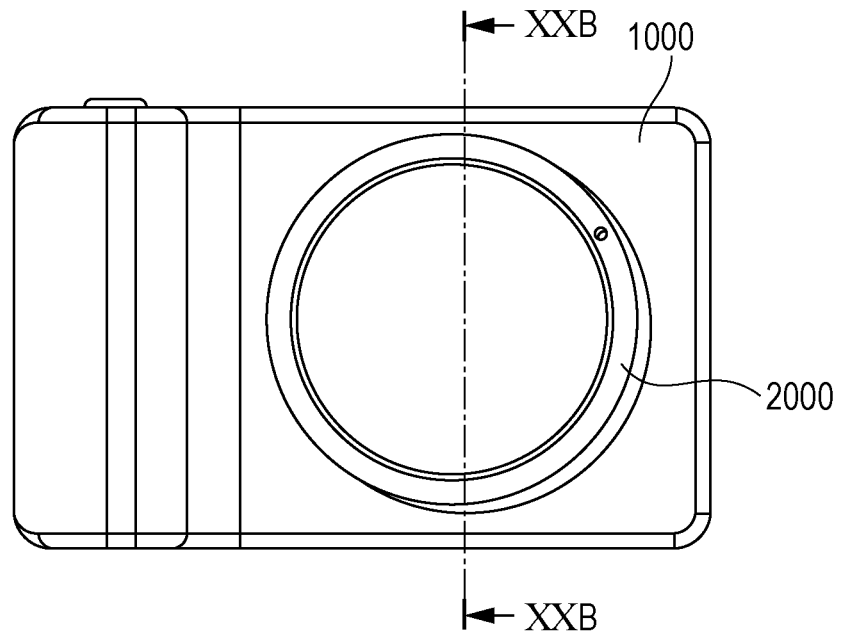
FIG. 20A is a diagram exemplarily illustrating a method of mounting a predetermined image pickup apparatus 1000 and a predetermined interchangeable lens assembly 2000 having claw portions and cutaway portions that interfere with each other.
Figure 20B:
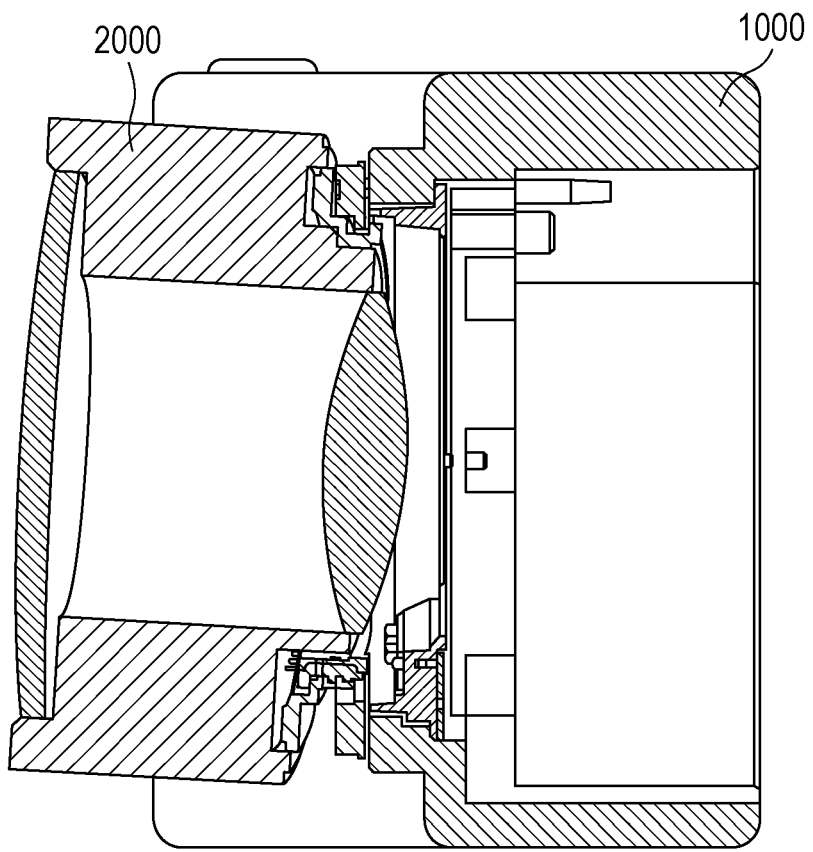
FIG. 20B is a diagram exemplarily illustrating a method of mounting a predetermined image pickup apparatus 1000 and a predetermined interchangeable lens assembly 2000 having claw portions and cutaway portions that interfere with each other.

However, if only one claw portion and a cutaway portion are interfering, a claw portion of the camera mount side can be inserted into a cutaway portion of the lens mount side in some cases. FIG. 20 is a diagram exemplarily illustrating a method of mounting a predetermined interchangeable lens assembly 2000 to a predetermined image pickup apparatus 1000 having claw portions and cutaway portions that interfere with each other. FIG. 20A is a diagram exemplarily illustrating a frontal view of a predetermined interchangeable lens assembly and a predetermined image pickup apparatus that have claw portions and cutaway portions that interfere with each other in a process of being mounted to each other. FIG. 20B is a cross-sectional view taken along cross-section XXB-XXB in FIG. 20A.

For example, in a state where the optical axis of the lens mount side is obliquely inclined to the optical axis of the camera mount side, one end of a camera claw portion is inserted into a lens cutaway portion, and from this state, the lens mount and the camera mount are rotated relatively to each other, as illustrated in FIGS. 20A and 20B. In this case, even if the camera claw portions and the lens cutaway portions originally interfere with each other, this mutual interference is resolved during the relative rotation of the lens mount and the camera mount, and transition can be made to a state where the camera claw portion is inserted into this lens cutaway portion. In this case, if there are no other camera claw portions and lens cutaway portions interfering, the interchangeable lens assembly can be mounted to the camera body.

Thus, the claw portions and the cutaway portions on the lens mount 1101 side and the camera mount 1401 side are disposed such that the angle of a predetermined lens cutaway portion adjacent to a reference lens claw is smaller than the angle of two camera claw portions adjacent to a reference camera cutaway portion.

Specifically, in the present embodiment, the angles θA4 and θA5 of the first lens-side cutaway portion 1108a and the second lens-side cutaway portion 1108b which are adjacent to the first lens-side claw portion 1107a are smaller than the angles θA1 and θA2 of the first camera claw portion 1401a and the second camera claw portion 1401b which are adjacent to the first camera cutaway portion 1401d. In other words, θA4 (52°) is smaller than θA1 (56°), and θA5 (44°) is smaller than θA2 (62°), (θA4<θA1, θA5<θA2).

Accordingly, even if an attempt is made to insert the first lens-side claw portion 1107a into the first camera cutaway portion 1401d, the second lens-side claw portion 1107b certainly interferes with the second camera claw portion 1401b and the third lens-side claw portion 1107c certainly interferes with the first camera claw portion 1401a, as illustrated in FIG. 21.

Figure 21A:
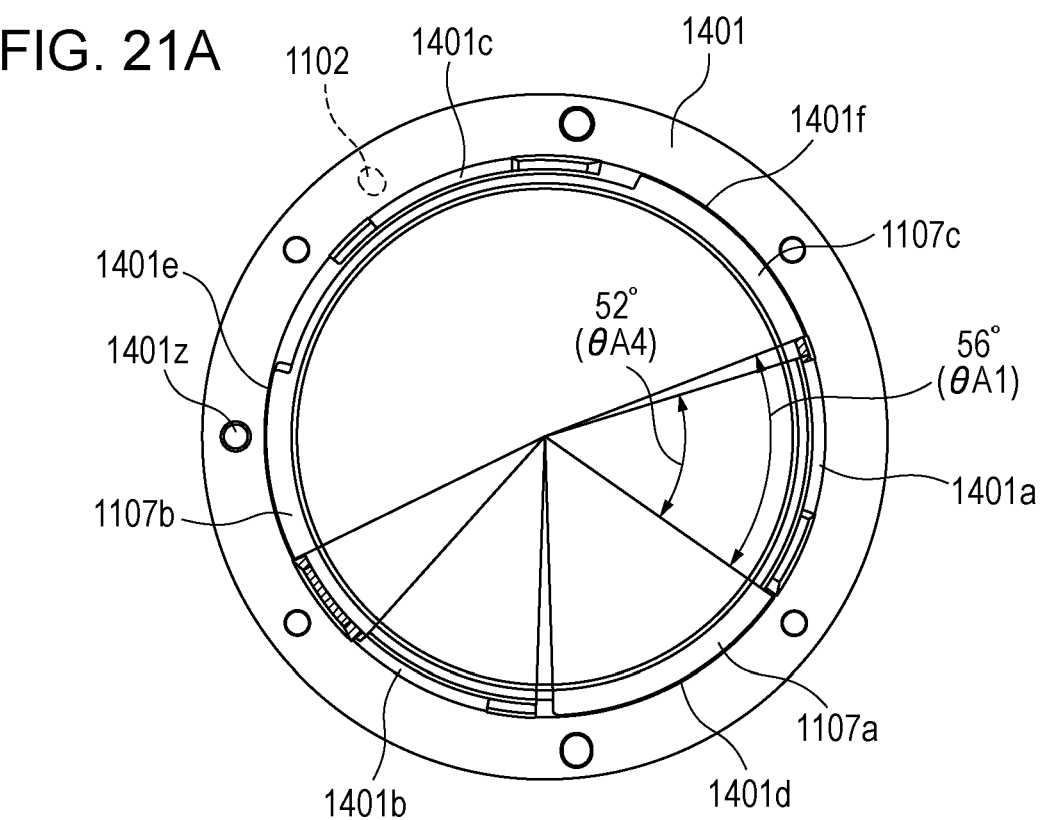
FIG. 21A is a diagram exemplarily illustrating a state in which claw portions interfere with each other in attempting to mount the lens mount 1101 side to the camera mount side 1401 according to an exemplary embodiment of the present invention.
Figure 21B:
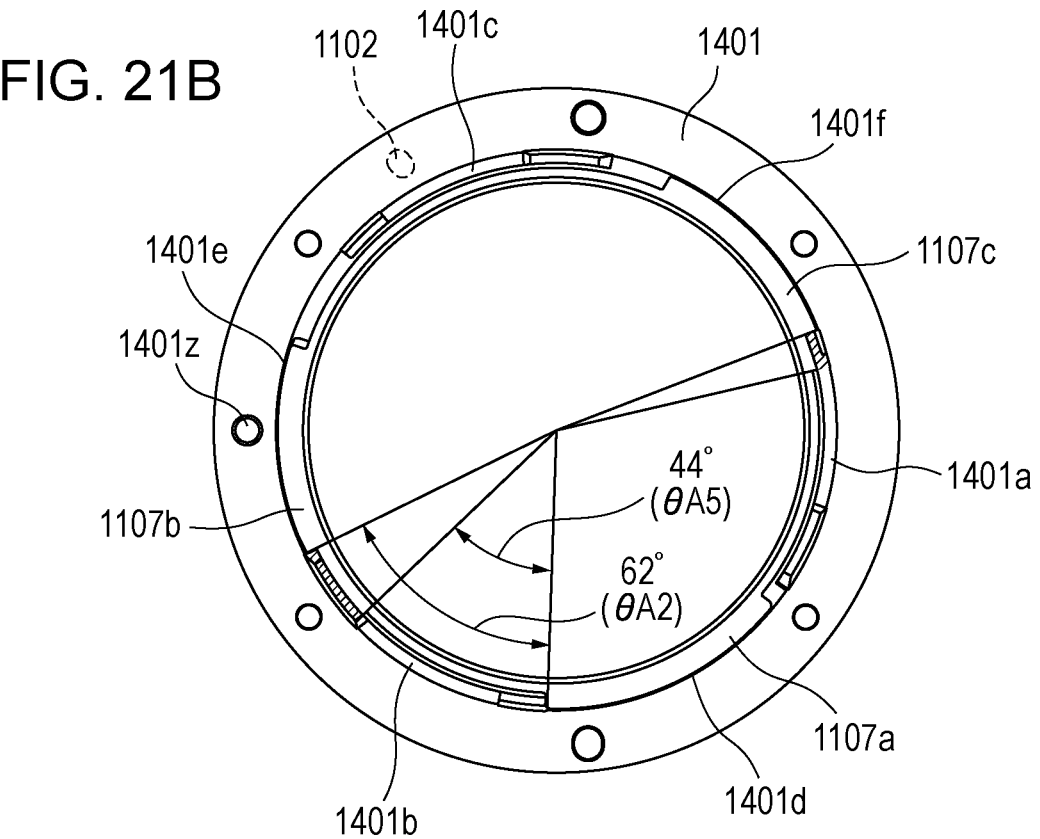
FIG. 21B is a diagram exemplarily illustrating a state in which claw portions interfere with each other in attempting to mount the lens mount 1101 side to the camera mount 1401 side according to an exemplary embodiment of the present invention.
Figure 22A:
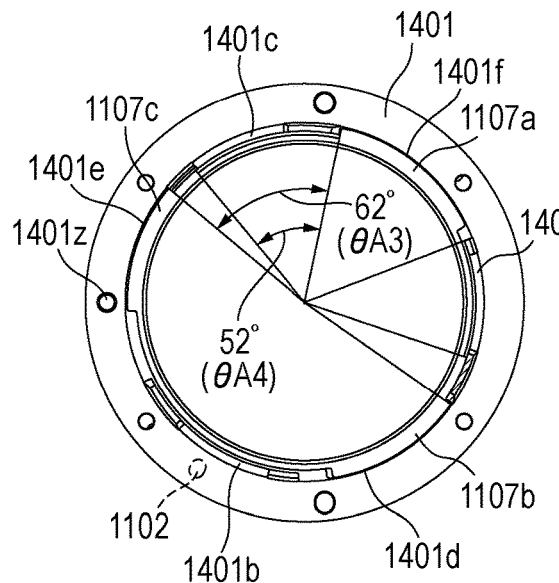
FIG. 22A is a diagram exemplarily illustrating a case of an attempt to insert incompatible claw portions into cutaway portions on the lens mount 1101 side and the camera mount 1401 side according to an exemplary embodiment of the present invention.
Figure 22C:
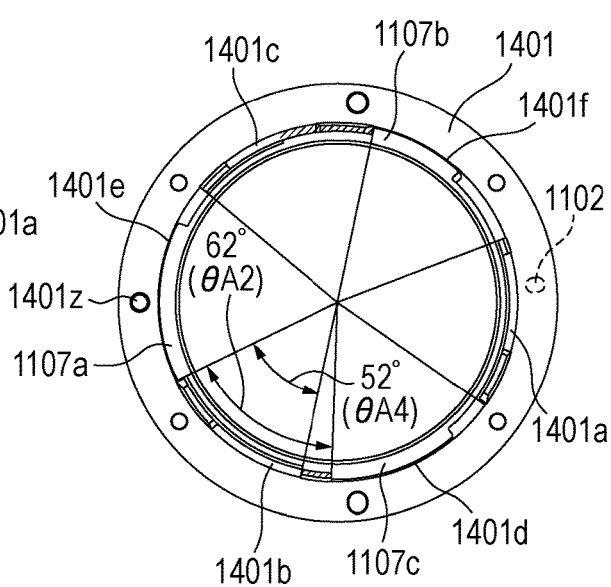
FIG. 22C is a diagram exemplarily illustrating a case of an attempt to insert incompatible claw portions into cutaway portions on the lens mount 1101 side and the camera mount 1401 side according to an exemplary embodiment of the present invention.
Figure 22B:
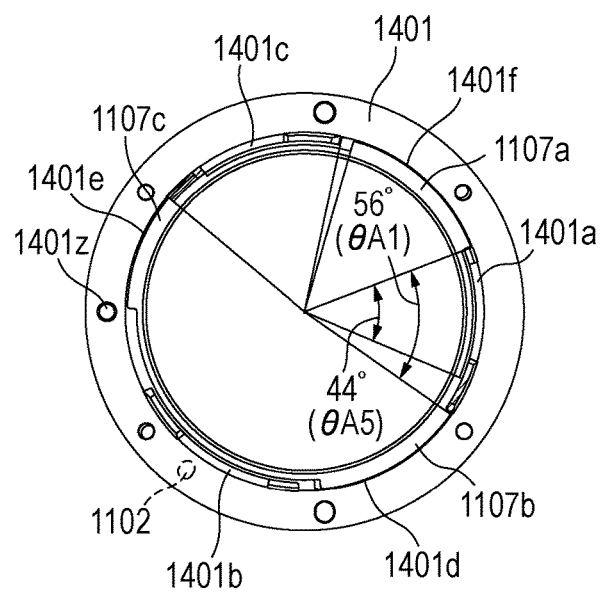
FIG. 22B is a diagram exemplarily illustrating a case of an attempt to insert incompatible claw portions into cutaway portions on the lens mount 1101 side and the camera mount 1401 side according to an exemplary embodiment of the present invention.
Figure 22D:
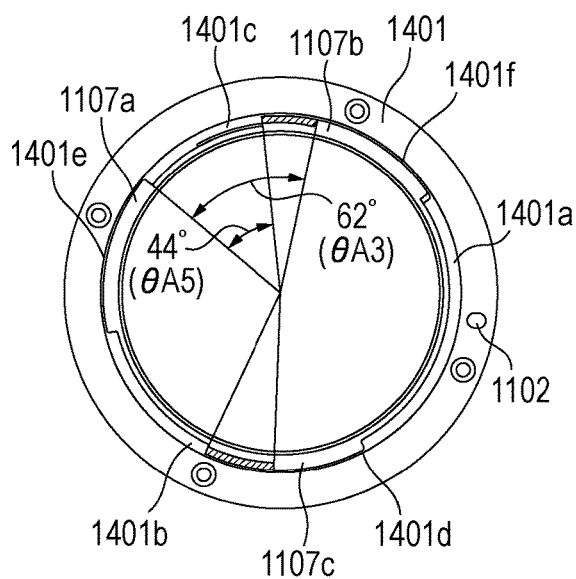
FIG. 22D is a diagram exemplarily illustrating a case of an attempt to insert incompatible claw portions into cutaway portions on the lens mount 1101 side and the camera mount 1401 side according to an exemplary embodiment of the present invention.

FIG. 21 is a diagram exemplarily illustrating a state in which claws interfere with each other in mounting the lens mount 1101 side to the camera mount 1401 side according to the exemplary embodiment of the present invention. FIG. 21A illustrates a state in which the third lens-side claw portion 1107c and the first camera claw portion 1401a interfere, and FIG. 21B illustrates a state in which the second lens-side claw portion 1107b and the second camera claw portion 1401b interfere.

As described above, the incompatible interchangeable lens assembly and the image pickup apparatus, and the mount portions of the conversion adapter are configured so that two claws out of the claws of the respective mount portion of the incompatible interchangeable lens assembly and the image pickup apparatus interfere with each other in the present embodiment. This configuration reduces the risk of an incompatible interchangeable lens assembly being erroneously mounted to an image pickup apparatus, or an interchangeable lens assembly and an image pickup apparatus being erroneously mounted to mount units that are not compatible thereto and are provided to both ends of a conversion adapter.

However, even in a case where the above conditions are satisfied, there may be cases where, when attempting to insert three claws into incompatible cutaway portions, for example, two claws are inserted into cutaway portions depending on the angles of the claw portions and cutaway portions.

Accordingly, the present embodiment further takes a configuration where the angles of at least two adjacent lens cutaway portions are smaller than the angles of all camera claw portions. Specifically, in the present embodiment, the angles θA4 and θA5 of the first lens-side cutaway portion 1108a and second lens-side cutaway portion 1108b in the circumferential direction are smaller than the angles θA1 to θA3 of the first to third camera claw portions 1401a to 1401c in the circumferential direction. That is to say, the relation between the claw portions and cutaway portions at the lens mount 1101 side and the camera mount 1401 side according to the present embodiment satisfy θA4<θA1, θA4<θA2, θA4<θA3, θA5<θA1, θA5<θA2, and θA5<θA3.

FIG. 22 is a diagram exemplarily illustrating a case of attempting to insert incompatible claw portions into cutaway portions on the lens mount 1101 side and the camera mount 1401 side according to the exemplary embodiment of the present invention. FIG. 22A illustrates a state in which the third lens-side claw portion 1107c and the third camera claw portion 1401c interfere in a case of attempting to insert the first lens-side claw portion 1107a into the third camera cutaway portion 1401f. FIG. 22B illustrates a state in which the second lens-side claw portion 1107b and the first camera claw portion 1401a interfere in a case of attempting to insert the first lens-side claw portion 1107a into the third camera cutaway portion 1401f. FIG. 22C illustrates a state in which the third lens-side claw portion 1107c and the second camera claw portion 1401b interfere in a case of attempting to insert the first lens-side claw portion 1107a into the second camera cutaway portion 1401e. FIG. 22D illustrates a state in which the second lens-side claw portion 1107b and the third camera claw portion 1401c interfere in a case of attempting to insert the first lens-side claw portion 1107a into the second camera cutaway portion 1401e.

As illustrated in FIGS. 22A to 22D, the lens claw portions and the camera claw portions interfere in at least two points in the present embodiment, regardless of the relative rotational angle of the lens mount 1101 and the camera mount 1401. This configuration further effectively prevents erroneous mounting of a conversion adapter and an interchangeable lens assembly having the lens mount 101(1101) to a conversion adapter and an image pickup apparatus having the camera mount 401(1401).

Next, the angles (phases) at which bayonet claws are disposed in the circumferential direction on the camera mount and the lens mount of the second conversion adapter 70 will be described with reference to FIGS. 23 to 27.

The second conversion adapter 70 is a mount adapter to be used for mounting the first lens 100 having a short flange focal length to the camera body 60 having a long flange focal length. The lens mount 1501 is provided at one end (third end) side of the second conversion adapter 70, and the camera mount 1201 is provided at the other end (fourth end). The camera mount 1201 of the second conversion adapter 70 has the same configuration as that of the camera mount 201 of the camera body 200 which is the first image pickup apparatus described above. Moreover, the lens mount 1501 of the second conversion adapter 70 has the same configuration as that of the lens mount 501 of the second lens 50 described above.

Accordingly, it is preferable that the second conversion adapter 70 be configured such that the camera body 200 having a short flange focal length cannot be directly mounted to the lens mount 1501, and that the second lens 50 having a long flange focal length cannot be directly mounted to the camera mount 1201. This configuration can be realized by satisfying the positional relation of the claw portions and the cutaway portions so that the lens mount 1501 provided on one end (third end) of the second conversion adapter 70 and the camera mount 1201 provided on the other end (fourth end) cannot be directly mounted thereto.

Figure 23A:
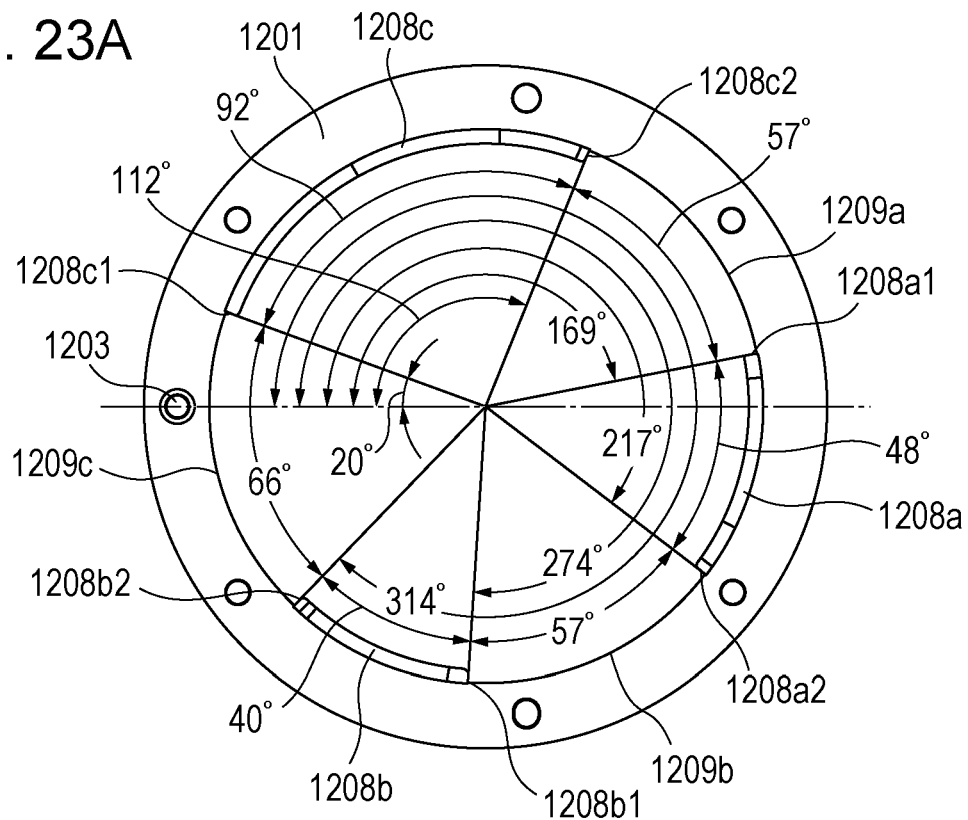
FIG. 23A is a diagram exemplarily illustrating a displacement angle of bayonet claw portions in the camera mount 1201 provided on one end of the second conversion adapter 70.
Figure 23B:
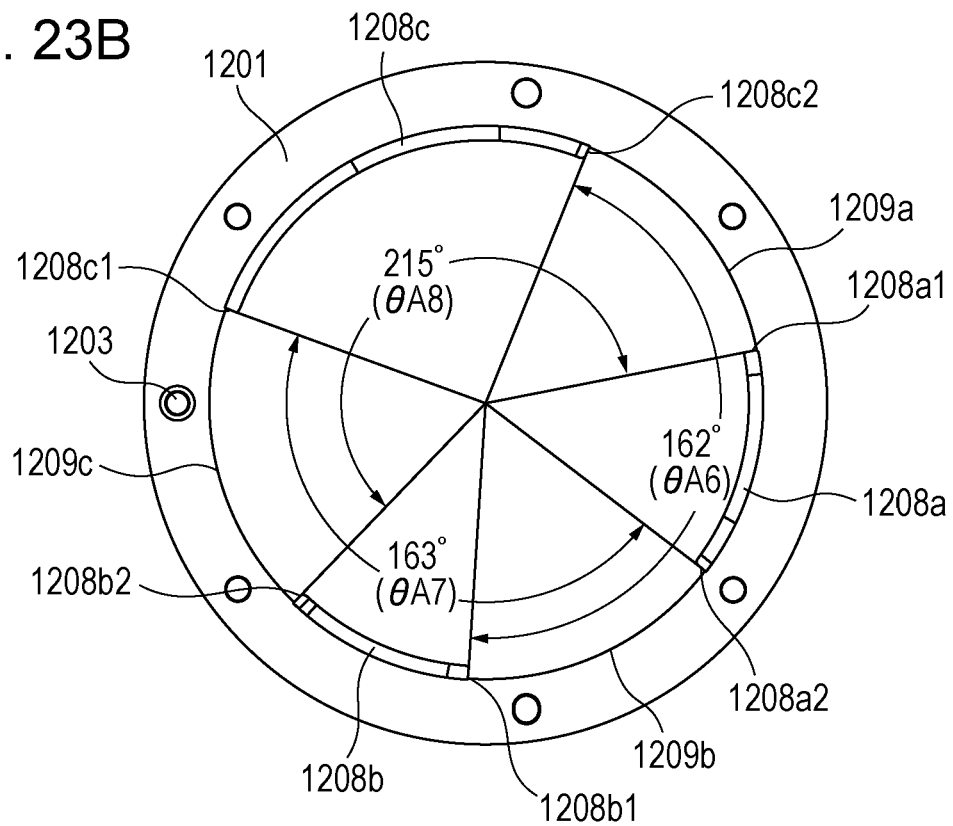
FIG. 23B is a diagram exemplarily illustrating a displacement angle of bayonet claw portions in the camera mount 1201 provided on one end of the second conversion adapter 70.

FIG. 23 is a diagram exemplarily illustrating displacement angles of the bayonet claws in the camera mount 1201 provided on one end of the second conversion adapter 70. FIG. 23A is a diagram illustrating angle ranges that the camera claw portions and the camera cutaway portions occupy in the circumferential direction on the camera mount 1201 with the lock pin 1203 as a reference, when viewed from the rear face side. FIG. 23B is a diagram illustrating angle ranges that, with respect to multiple camera claw portions 1201a through 1201c, the claw portions occupy in the circumferential direction of the camera mount 1201, when viewed from the rear face side. The displacement angles of the claw portions and the cutaway portions on the camera mount 1201 of the second conversion adapter 70 are similar to those of the camera mount 201 of the camera body 200 described above, and thus descriptions thereof will be omitted.

As illustrated in FIG. 23B, the angle from the sixth end 1208c2 of the third camera-side claw portion 1208c to the third end 1208b1 of the second camera-side claw portion 1208b, in the circumferential direction of the camera mount 1201, including the first camera-side claw portion 1208a, is θA6 (162°). The angle from the second end 1208a2 of the first camera-side claw portion 1208a to the fifth end 1208c1 of the third camera-side claw portion 1208c, in the circumferential direction of the camera mount 1201, including the second camera-side claw portion 1208b, is θA7 (163°). The angle from the fourth end 1208b2 of the second camera-side claw portion 1208b to the first end 1208a1 of the first camera-side claw portion 1208a, in the circumferential direction of the camera mount 1201, including the third camera-side claw portion 1208c, is θA8 (215°).

Figure 24A:
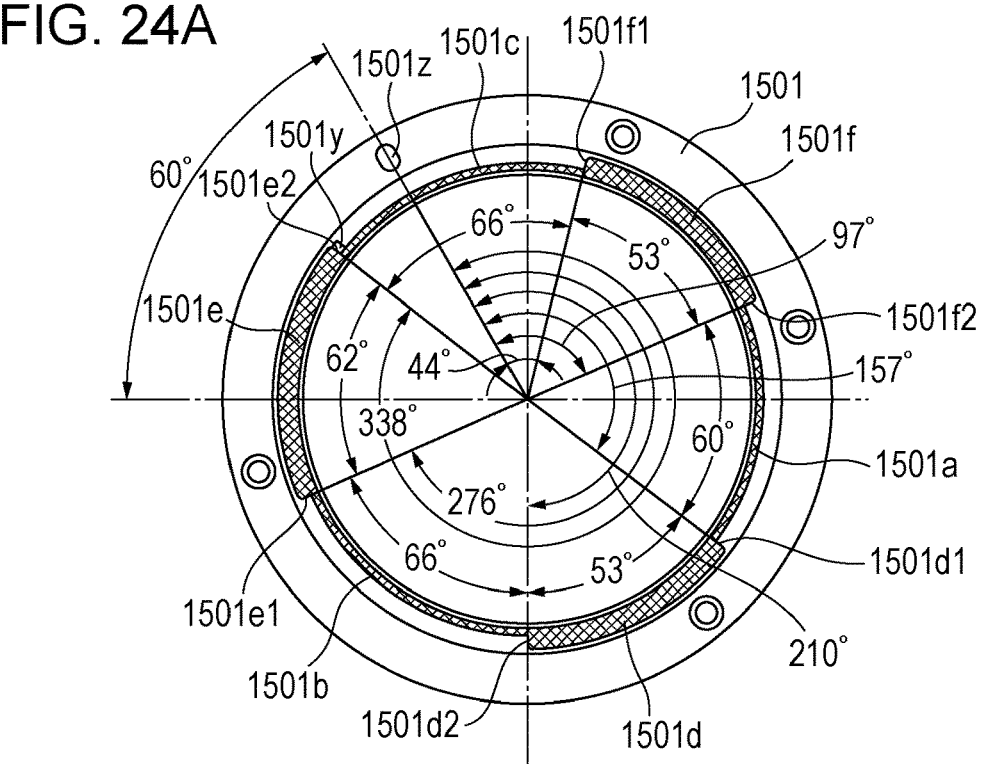
FIG. 24A is a diagram exemplarily illustrating a displacement angle of bayonet claw portions in a lens mount 1501 provided on the other end of the second conversion adapter 70.
Figure 24B:
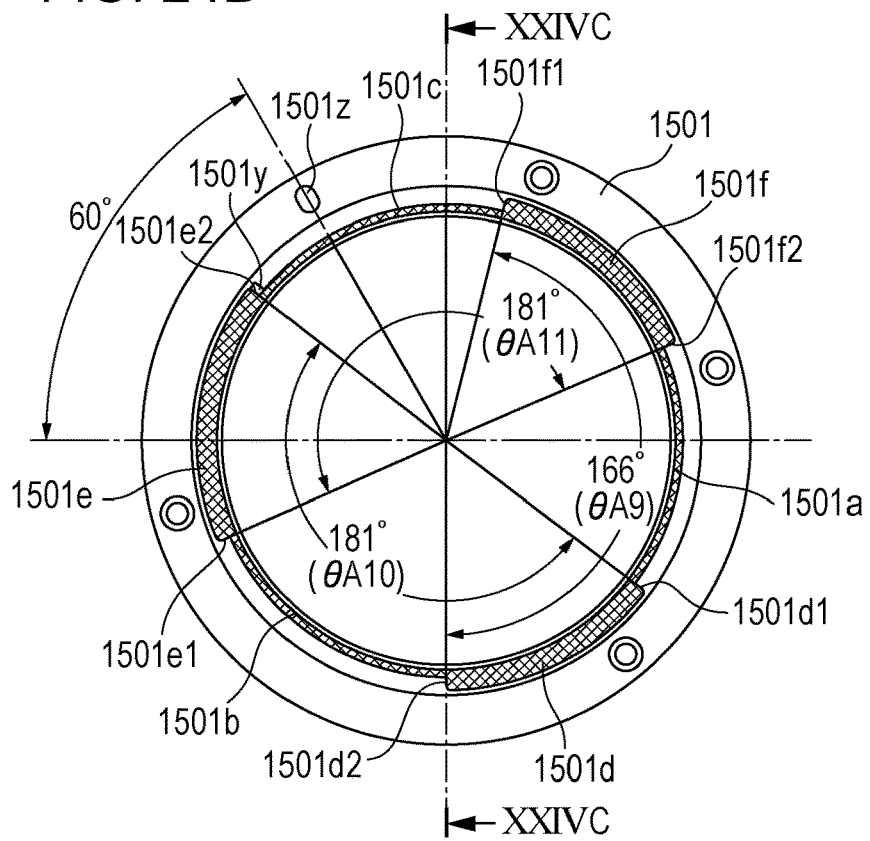
FIG. 24B is a diagram exemplarily illustrating a displacement angle of bayonet claw portions in a lens mount 1501 provided on the other end of the second conversion adapter 70.
Figure 24C:
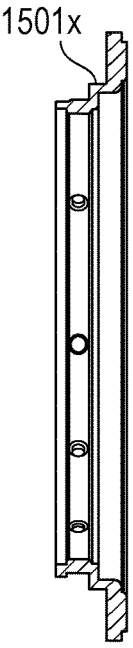
FIG. 24C is a diagram exemplarily illustrating a displacement angle of bayonet claw portions in a lens mount 1501 provided on the other end of the second conversion adapter 70.

Next, FIG. 24 is a diagram exemplarily illustrating displacement angles of the bayonet claws in a lens mount 1501 provided on the other end of the second conversion adapter 70. FIG. 24A is a diagram illustrating angle ranges that lens claw portions and the lens cutaway portions occupy in the circumferential direction of the lens mount 1501 with a recess 1501z into which the lock pin is inserted as a reference, when viewed from the rear face side. FIG. 24B is a diagram illustrating angle ranges where the cutaway portions are provided with respect to the multiple lens cutaway portions 1501a to 1501c in the circumferential direction of the lens mount 1501, when viewed from the rear face side. FIG. 24C is a cross-sectional diagram taken along a cross-section XXIVC-XXIVC in FIG. 24B.

A first lens claw portion 1501d, a second lens claw portion 1501e, and a third lens claw portion 1501f, are provided in this order, to the lens mount 1501 in the circumferential direction (inner radial direction). When the lens mount 1501 is viewed from the rear face side as illustrated in FIG. 24A, the lens claw portion that is provided at the position farthest from the recess 1501z is the first lens claw portion 1501d. The second lens claw portion 1501e and the third lens claw portion 1501f are then provided in this order from the first lens claw portion 1501d in a clockwise direction.

Moreover, the first lens cutaway portion 1501a, the second lens cutaway portion 1501b, and the third lens cutaway portion 1501c are provided in this order, to the lens mount 1501 in the circumferential direction (inner radial direction).

When the lens mount 1501 is viewed from the rear face side as illustrated in FIG. 24A, the cutaway portion that is provided at the position nearest to the recess 1501z is the third lens cutaway portion 1501c. The first lens cutaway portion 1501a and the second lens cutaway portion 1501b are then provided in this order from the third lens cutaway portion 1501c in a clockwise direction.

The end portions of the lens claw portions 1501d, 1501e, and 1501f, in the circumferential direction, will be referred to as first end portion 1501d1, second end portion 1501d2, third end portion 1501e1, fourth end portion 1501e2, fifth end portion 1501f1, and sixth end portion 1501f2, for the sake of description. The end portions are denoted with part numerals in order from the first lens claw portion 1501d in the clockwise direction, when the lens mount 1501 is viewed from the rear face side, as described above.

As illustrated in FIG. 24A, the angles that the lens claw portions and the lens cutaway portions occupy in the circumferential direction of the lens mount 1501 (angle ranges) are stipulated as follows. The angle of the first lens claw portion 1501d is 53°, the angle of the second lens claw portion 1501e is 62°, and the angle of the third lens claw portion 1501f is 53°. That is to say, the angles of the lens claw portions on the lens mount 1501 side are the same as the angles of the lens claw portions on the lens mount 1101 side described above.

By contrast, the angles of the lens cutaway portions on the lens mount 1501 side differ from the angles of the lens cutaway portions on the lens mount 1101 side described above. More specifically, the angle of the first lens cutaway portion 1501a is 60°, the angle of the second lens cutaway portion 1501b is 66°, and the angle of the third lens cutaway portion 1501c is 66°.

Moreover, when the lens claw portions are viewed from the rear face side, the angles at which the lens claw portions are disposed in the clockwise direction on the circumferential direction of the lens mount 1501 with the position of the recess 1501z (referred to as reference position) as a reference are stipulated as follows. The first lens claw portion 1501d is disposed between 157° to 210° with the reference position as a start point. The second lens claw portion 1501e is disposed between 276° to 338° with the reference position as a start point. The third lens claw portion 1501f is disposed between 44° to 97° with the reference position as a start point.

As illustrated in FIG. 24C, a fitting means 1501x that restricts the movement of the image pickup apparatus in a direction parallel to the optical axis when the lens mount 1501 is mounted to the image pickup apparatus is provided on the lens mount 1501 side in the circumferential direction. In the present embodiment, the diameter of the fitting means 1501x in a direction orthogonal to the optical axis on the camera mount 1201 side is regarded as the mount diameter. The mount diameters of the camera mount and the lens mount described above are substantially the same length.

Figure 25A:
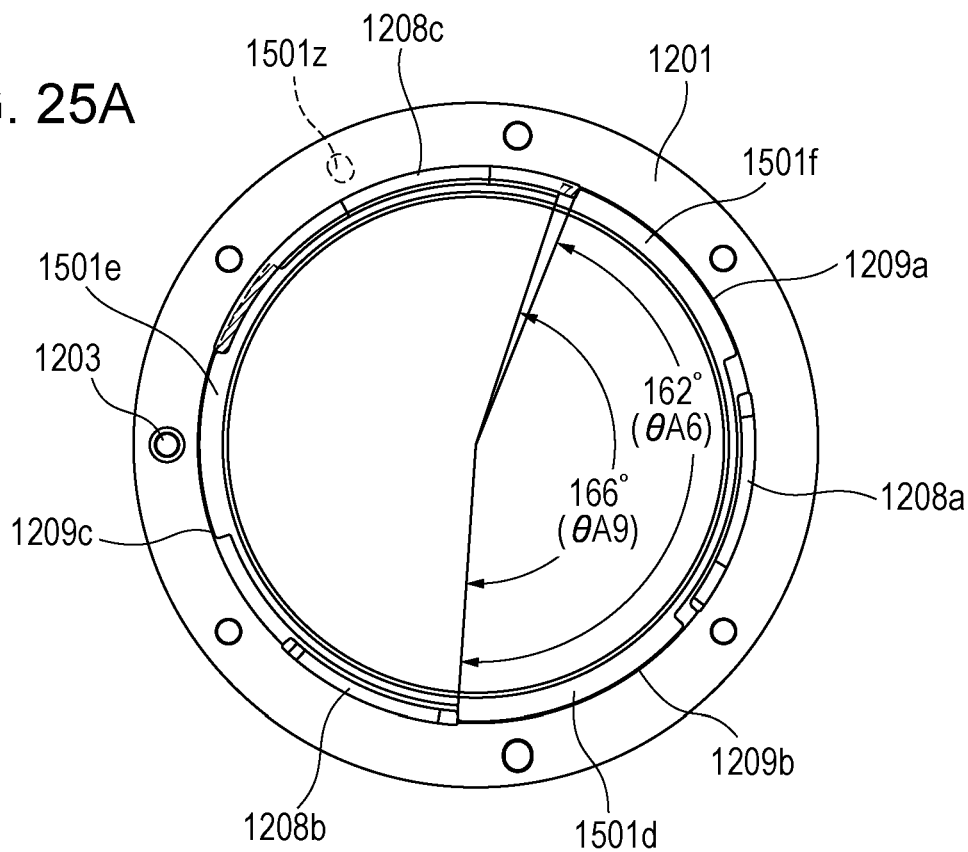
FIG. 25A is a diagram exemplarily illustrating a state in which claw portions interfere with each other, in attempting to mount a reference claw portion on the lens mount 1501 side to a reference recess on the camera mount 1201 side according to an exemplary embodiment of the present invention.
Figure 25B:
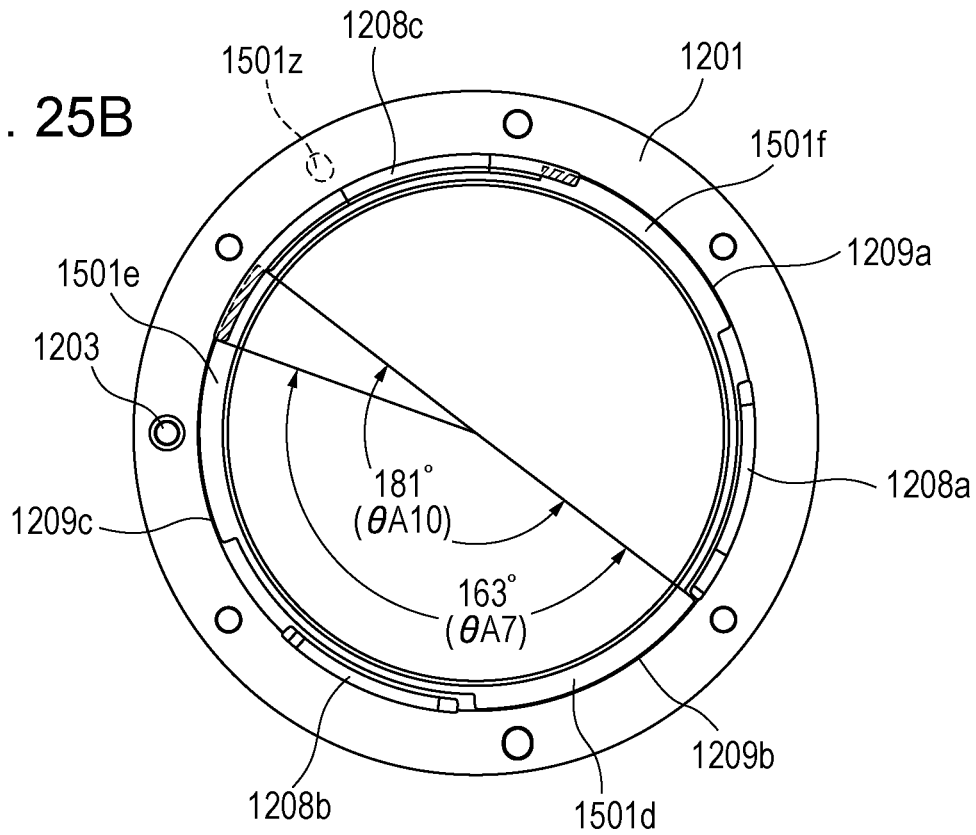
FIG. 25B is a diagram exemplarily illustrating a state in which claw portions interfere with each other, in attempting to mount a reference claw portion on the lens mount 1501 side to a reference recess on the camera mount 1201 side according to an exemplary embodiment of the present invention.
Figure 26A:
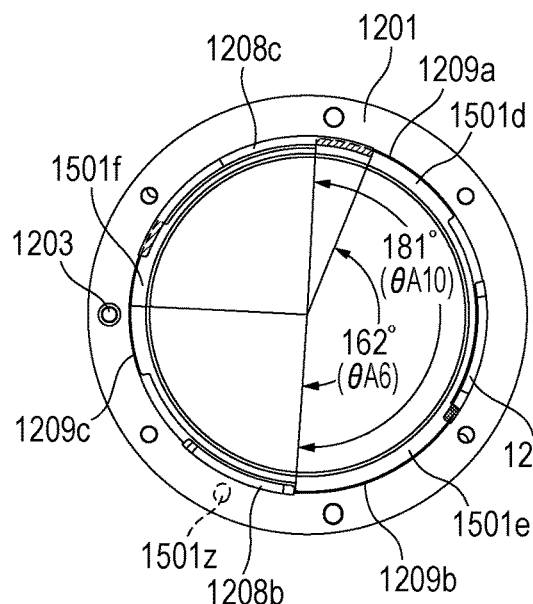
FIG. 26A is a diagram exemplarily illustrating a state in which claw portions interfere with each other, in attempting to mount a claw portion other than the reference claw portion on the lens mount 1501 side to a reference recess on the camera mount 1201 side according to an exemplary embodiment of the present invention.
Figure 26C:
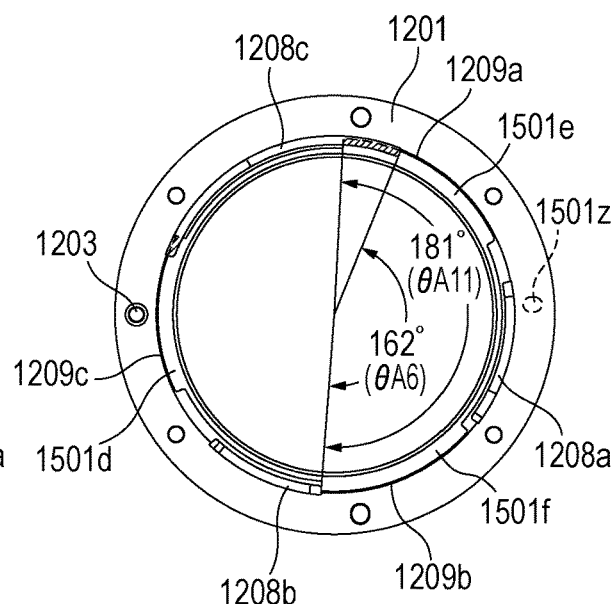
FIG. 26C is a diagram exemplarily illustrating a state in which claw portions interfere with each other, in attempting to mount a claw portion other than the reference claw portion on the lens mount 1501 side to a reference recess on the camera mount 1201 side according to an exemplary embodiment of the present invention.
Figure 26B:
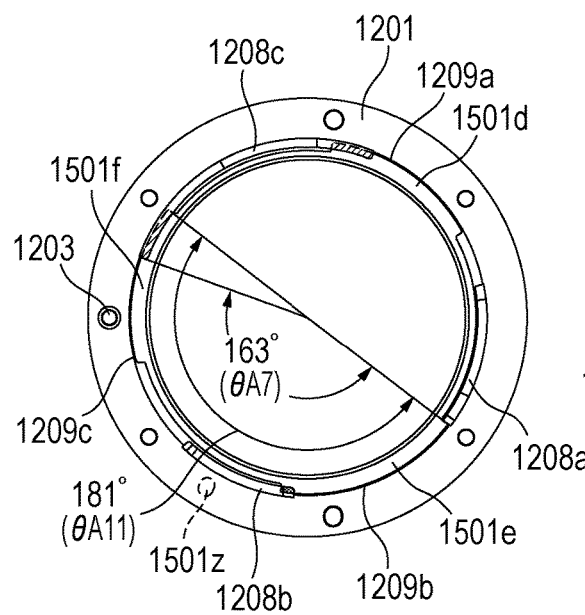
FIG. 26B is a diagram exemplarily illustrating a state in which claw portions interfere with each other, in attempting to mount a claw portion other than the reference claw portion on the lens mount 1501 side to a reference recess on the camera mount 1201 side according to an exemplary embodiment of the present invention.
Figure 26D:
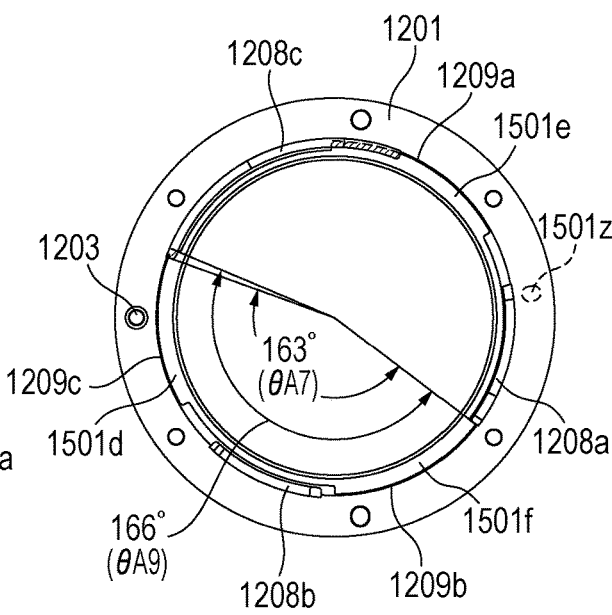
FIG. 26D is a diagram exemplarily illustrating a state in which claw portions interfere with each other, in attempting to mount a claw portion other than the reference claw portion on the lens mount 1501 side to a reference recess on the camera mount 1201 side according to an exemplary embodiment of the present invention.

As illustrated in FIGS. 25A and 25B, the angle from the fifth end 1501f1 of the third lens claw portion 1501f to the second end 1501d2 of the first lens claw portion 1501d, in the circumferential direction of the lens mount 1501, including the first lens cutaway portion 1501a, is θA9 (166°). The angle from the first end 1501d1 of the first lens claw portion 1501d to the fourth end 1501e2 of the second lens claw portion 1501e, in the circumferential direction of the lens mount 1501, including the second lens cutaway portion 1501b, is θA10 (181°). The angle from the third end 1501e1 of the second lens claw portion 1501e to the sixth end 1501f2 of the third lens claw portion 1501f, in the circumferential direction of the lens mount 1501 including the third lens cutaway portion 1501c, is θA11 (181°).

The angles of the claw portions and the cutaway portions in the circumferential direction will be compared between the camera mount 1201 and the lens mount 1501 provided to the second conversion adapter 70. For example, the angle (92°) of the third camera claw portion 1208c on the camera mount 1201 side is larger than the angles (66°) of the second and third lens cutaway portions 1501b and 1501c that are the largest angle of the lens cutaway portions on the lens mount 1501 side. In other words, the angle of at least one camera claw portion on the camera mount 1201 side is larger than the angle of the lens cutaway portion having the largest angle on the lens mount 1501 side.

In this case, of the claw portions on the camera mount 1201 side and the cutaway portions on the lens mount 1501 side, at least one or more camera claw portion and lens cutaway portion interfere with each other. Accordingly, even if an attempt is made to mount the interchangeable lens assembly to the camera body so that the optical axes on the camera mount 1201 side and the lens mount 1501 side are substantially parallel to each other, the claw portions and the cutaway portions interfere, so that the interchangeable lens assembly cannot be mounted to the camera body.

However, if only one claw portion and one cutaway portion interfere with each other, there may be a case where each claw portion on the camera mount side can be inserted into the corresponding cutaway portion on the lens mount side, in a similar way as the above description of the first conversion adapter 40. For example, in some cases, in a state where the optical axis of the lens mount side is obliquely inclined to the optical axis of the camera mount side, one end of a camera claw portion is inserted into a lens cutaway portion, and the lens mount and the camera mount are rotated relative to each other, which allows the interchangeable lens assembly to be mounted to the camera body.

Accordingly, in the present embodiment, the claw portions and the cutaway portions on the camera mount 1201 side and the lens mount 1501 side are disposed in the circumferential direction so as to satisfy θA6<θA9 and θA7<θA10. FIG. 25 is a diagram exemplarily illustrating a state in which the claw portions interfere with each other, in attempting to mount a reference claw portion on the lens mount 1501 side to a reference cutaway portion on the camera mount 1201 side according to the exemplary embodiment of the present invention. FIG. 25A illustrates a state in which the third lens claw portion 1501f and the third camera-side claw portion 1208c interfere, and FIG. 25B illustrates a state in which the second lens claw portion 1501e and the third camera-side claw portion 1208c interfere.

As illustrated in FIGS. 25A and 25B, in a case where the reference first lens claw portion 1501d is attempted to be inserted into the reference camera cutaway portion 1209d, for example, the third camera-side claw portion 1208c interferes with the second and third lens claw portions 1501e and 1501f.

Specifically, when viewed from the rear face side, the total sum of the angles of one reference lens claw portion, another lens claw portion adjacent thereto in the clockwise direction, and a lens cutaway portion situated between these lens claw portions, is taken as a first angle. Further, when viewed from the rear face side, the total sum of the angles of one reference camera cutaway portion, another camera cutaway portion adjacent thereto in the clockwise direction, and a camera claw portion situated therebetween, is taken as a second angle. Furthermore, when viewed from the rear face side, the total sum of the angles of one reference lens claw portion, another lens claw portion adjacent thereto in the counterclockwise direction, and a lens cutaway portion situated between these lens claw portions, is taken as a third angle. Moreover, when viewed from the rear face side, the total sum of the angles of one reference camera cutaway portion, another camera cutaway portion adjacent thereto in the counterclockwise direction, and a camera claw portion situated therebetween, is taken as a fourth angle. According to the present embodiment, it is sufficient to layout the claw portions and the cutaway portions on the camera mount 1201 side and the lens mount 1501 side such that the first angle described above is larger than the second angle, and the third angle is larger than the fourth angle.

This configuration causes at least two lens claw portions and one camera claw portion to interfere with each other. Thus, the risk of an incompatible interchangeable lens assembly being erroneously mounted to an image pickup apparatus, or an incompatible interchangeable lens assembly and an image pickup apparatus being erroneously mounted to mount units provided to both ends of a conversion adapter, can be reduced.

However, even in a case where the above conditions are satisfied, there may be cases where, in attempting to insert three claw portions into incompatible cutaway portions, for example, two claw portions are inserted into cutaway portions depending on the angles of the claw portions and the cutaway portions.

Accordingly, the claw portions and cutaway portions on the camera mount 1201 side and the lens mount 1501 side are disposed in the circumferential direction so as to satisfy $\theta A6<\theta A9$, $\theta A6<\theta A10$, $\theta A6<\theta A11$, $\theta A7<\theta A9$, $\theta A7<\theta A10$, and $\theta A7<\theta A11$. That is to say, when viewed from the rear face side, the total sum of the angles of two claws other than the reference claw portion described above, and a lens cutaway portion situated therebetween, is taken as a fifth angle. According to the present embodiment, it is sufficient to layout the claw portions and cutaway portions on the camera mount 1201 side and the lens mount 1501 side such that the second angle and the fourth angle described above are smaller than any of the first angle, third angle, and fifth angle.

FIG. 26 is a diagram exemplarily describing a state in which the claws interfere with each other, in attempting to mount a claw portion other than the reference claw portion on the lens mount 1501 side to a reference cutaway portion on the camera mount 1201 side according to the exemplary embodiment of the present invention. FIG. 26A illustrates a state in which the first lens claw portion 1501d and the third camera-side claw portion 1208c interfere in attempting to insert the second lens claw portion 1501e into the second camera-side cutaway portion 1209b. FIG. 26B illustrates a state in which the third lens claw portion 1501c and the third camera-side claw portion 1208c interfere in attempting to insert the second lens claw portion 1501e into the second camera-side cutaway portion 1209b. FIG. 26C illustrates a state in which the second lens claw portion 1501e and the third camera-side claw portion 1208c interfere in attempting to insert the third lens claw portion 1501f into the second camera-side cutaway portion 1209b. FIG. 26D illustrates a state in which the first lens claw portion 1501d and the third camera-side claw portion 1208c interfere in attempting to insert the third lens claw portion 1501f into the second camera-side cutaway portion 1209b.

As illustrated in FIGS. 26A to 26D, at least two lens claw portions and one camera claw portion interfere, regardless of the relative rotation angle of the lens mount 1501 and the camera mount 1201 according to the present embodiment. According to this configuration, erroneous mounting of a conversion adapter and an interchangeable lens assembly having the lens mount 501 (1501) to an image pickup apparatus and a conversion adapter having the camera mount 201 (1201) can be prevented even more effectively.

Figure 27:
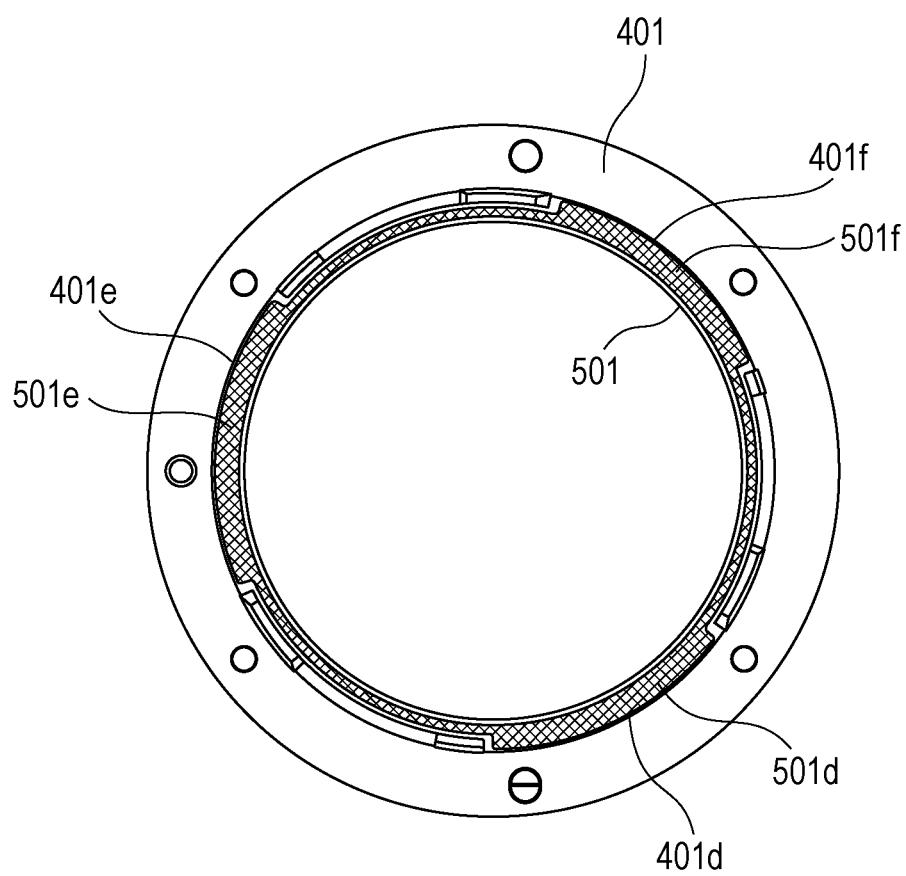
FIG. 27 is a diagram exemplarily illustrating a state in which claw portions provided on each of the camera mount 401 side and the lens mount 501 side according to an exemplary embodiment of the present invention are engaged.

FIG. 27 is a diagram exemplarily illustrating a state in which claw portions provided on the camera mount 401 side and the lens mount 501 side according to the exemplary embodiment of the present invention are engaged. The first lens claw portion 501d can be inserted into the first camera cutaway portion 401d, as illustrated in FIG. 27. The second lens claw portion 501e can be inserted into the second camera cutaway portion 401e. Further, the third lens claw portion 501f can be inserted into the third camera cutaway portion 401f. That is to say, the camera mount 401 side and the lens mount 501 side are a combination compatible with each other in terms of direct mutual mount. The camera mount 201 side and the lens mount 101 side are a combination compatible with each other in terms of direct mutual mount, as illustrated in FIG. 5.

As described above, the camera mount 401 compatible with an image pickup apparatus that has a long flange focal length (e.g., the camera body 60), and the lens mount 501 compatible with an interchangeable lens assembly that has a long flange focal length (e.g., the second lens 50) is directly mountable to each other. However, the camera mount 201 compatible with an image pickup apparatus having a short flange focal length (e.g., the camera body 200) and the lens mount 501 corresponding to an interchangeable lens assembly that has a long flange focal length (e.g., the second lens 50) cannot be directly mounted to each other. Moreover, the camera mount 201 compatible with an image pickup apparatus having a short flange focal length (e.g., the camera body 200) and the lens mount 101 compatible with an interchangeable lens assembly having a short flange focal length (e.g., the first lens 100) are directly mountable to each other. However, the camera mount 401 compatible with an image pickup apparatus that has a long flange focal length (e.g., the camera body 60) and the lens mount 101 compatible with an interchangeable lens assembly having a short flange focal length (e.g., the first lens 100) are not directly mountable to each other.

Thus, the image pickup apparatus and the camera accessory that employ the configuration of the above-described exemplary embodiment can prevent erroneous mounting of an image pickup apparatus and a camera accessory that have generally the same mount diameter but are not mutually compatible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A lens mount configured to be detachably mountable to a camera mount that includes a restricting portion and a plurality of first bayonet claw portions, the lens mount comprising:
   a plurality of second bayonet claw portions configured to enable engagement with the plurality of first bayonet claw portions;
   a restricted portion configured to be restricted by the restricting portion when the lens mount is mounted to the camera mount; and a fitting portion configured to restrict the camera mount in a direction orthogonal to a central axis direction of the lens mount when the lens mount is mounted to the camera mount, wherein the plurality of second bayonet claw portions includes, first and second claw portions adjacent to the restricted portion in a circumferential direction, and an opposite side claw portion disposed on opposite side of the restricted portion with respect to the first and second claw portions in the circumferential direction, when viewed in the central axis direction, a first reference line is a line passing through a center of the restricted portion and a central axis of the lens mount, a first line is a line passing through the central axis and an end of the first claw portion that is closer to the restricted portion, and a second line is a line passing through the central axis and an end of the second claw portion that is closer to the restricted portion, and $$90° < θ1+θ2 < 180°$$

is satisfied, where θ1 is an angle formed between the first reference line and the first line, and θ2 is an angle formed between the first reference line and the second line.

2. The lens mount according to claim 1, wherein $$90° < θ1+θ2 < 120°$$

is satisfied.

3. The lens mount according to claim 2, wherein $$90° < θ1+θ2 < 100°$$

is satisified.

4. The lens mount according to claim 1, wherein $$40° < θ1 < 70°, \text{ and}$$

$$40° < θ2 < 70°$$

are satisified.

5. The lens mount according to claim 4, wherein $$40° < θ1 < 60°, \text{ and}$$

$$40° < θ2 < 60°$$

are satisfied.

6. The lens mount according to claim 1, wherein $$1.00 ≤ θ1/θ2 ≤ 1.40$$

is satisified.

7. The lens mount according to claim 6, wherein $$1.00 ≤ θ1/θ2 ≤ 1.35$$

is satisfied.

8. The lens mount according to claim 1, wherein when viewed in the central axis direction, the first and second claw portions both overlap a boundary line that is orthogonal to the first reference line and passes through the central axis.

9. The lens mount according to claim 1, wherein when the lens mount is in a normal position, the second claw portion is positioned on a gravity direction side with respect to the first claw portion.

10. The lens mount according to claim 1, wherein a dimension of the second claw portion in the circumferential direction is larger than a dimension of the first claw portion in the circumferential direction.

11. The lens mount according to claim 1, wherein the plurality of first bayonet claw portions includes third and fourth claw portions adjacent to the restricting portion in a circumferential direction, and a fifth claw portion disposed on an opposite side of the restricting portion with respect to the third and fourth claw portions in the circumferential direction.

12. The lens mount according to claim 11, wherein when the lens mount is mounted to the camera mount, the opposite side claw portion engages with the fifth claw portion after being inserted between the fourth and fifth claw portions in the circumferential direction.

13. The lens mount according to claim 11, wherein when viewed in the central axis direction in a state of the lens mount and the camera mount contacting with each other, a second reference line is a line passing through the central axis and a center of the restricting portion, θ7 is a minimum value of an angle formed between a line passing through the central axis and a point that is, in a region where the first and third claw portions overlap each other, nearest to the restricting portion, and the second reference line, θ8 is a minimum value of an angle formed between a line passing through the central axis and a point that is, in a region where the second and fourth claw portions overlap each other, nearest to the restricting portion, and the second reference line, $$0.75 ≤ θ7/θ8 ≤ 1.25$$

is satisfied.

14. The lens mount according to claim 11, wherein $$0.80 < θ7/θ8 < 1.20$$

is satisfied.

15. The lens mount according to claim 11, wherein when viewed in the central axis direction in a state of the lens mount and the camera mount contacting with each other, a second reference line is a line passing through the central axis and a center of the restricting portion, θ5 is an angle formed between a line passing through the central axis and a point that is, in a region where the first and third claw portions overlap each other, nearest to the restricting portion, and the second reference line, θ6 is an angle formed between a line passing through the central axis and a point that is, in a region where the second and fourth claw portions overlap each other, nearest to the restricting portion, and the second reference line, θ7 is a minimum value of θ5, and θ8 is a minimum value of θ6, a maximum value of θ5 is θ9, $$90° < θ7+θ8 < 180°, \text{ and}$$

$$90° < θ9+θ8 < 180°$$

are satisfied.

16. The lens mount according to claim 15, wherein $$90° < θ7+θ8 < 110°, \text{ and}$$

$$90° < θ9+θ8 < 170°$$

are satisfied.

17. The lens mount according to claim 11, wherein when viewed in the central axis direction in a state of the lens mount and the camera mount contacting with each other, a second reference line is a line passing through the central axis and a center of the restricting portion, θ7 is a minimum value of an angle formed between a line passing through the central axis and a point that is, in a region where the first and third claw portions overlap each other, nearest to the restricting portion, and the second reference line, θ8 is a minimum value of an angle formed between a line passing through the central axis and a point that is, in a region where the second and fourth claw portions overlap each other, nearest to the restricting portion, and the second reference line, $$45° \leq \theta 7, \text{ and}$$

$$45° \leq \theta 8$$

are satisfied.

18. The lens mount according to claim 11, wherein a dimension of a cutaway between the third and fourth claw portions in the circumferential direction is larger than a dimension of a cutaway between the third and fifth claw portions in the circumferential direction.

19. The lens mount according to claim 18, wherein $$75° \leq \theta 10 \leq 105°$$

$$75° \leq \theta 20 \leq 105°$$

$$75° \leq \theta 30 \leq 105°, \text{ and}$$

$$75° \leq \theta L \leq 105°$$

are satisfied, where, among internal angles of a quadrangle formed by connecting a center of the opposite side claw portion, a center of the second claw portion, a center of the first claw portion, and the center of the restricted portion, θ10 is an internal angle in which a vertex thereof is the center of the opposite side claw portion, θ20 is an internal angle in which a vertex thereof is the center of the second claw portion, θ30 is an internal angle in which a vertex thereof is the center of the first claw portion, and θL is an internal angle in which a vertex thereof is the center of the restricted portion.

20. The lens mount according to claim 19, wherein at least one among θ10, θ20, θ30, and θL is in a range of 85° to 95°, inclusive.

21. The lens mount according to claim 19, wherein $$85° \leq \theta L \leq 95°$$

is satisfied.

22. The lens mount according to claim 21, wherein $$90° \leq \theta L \leq 95°$$

is satisfied.

23. The lens mount according to claim 18, wherein $$0.75 \leq \theta 30 / \theta 20 \leq 1.25$$

is satisfied, where, among internal angles of a quadrangle formed by connecting a center of the opposite side claw portion, a center of the second claw portion, a center of the first claw portion, and the center of the restricted portion, θ20 is an internal angle in which a vertex thereof is the center of the second claw portion, and θ30 is an internal angle in which a vertex thereof is the center of the first claw portion.

24. The lens mount according to claim 23, wherein $$0.85 \leq \theta 30 / \theta 20 \leq 1.15$$

is satisfied.

25. The lens mount according to claim 24, wherein $$0.95 \leq \theta 30 / \theta 20 \leq 1.05$$

is satisfied.

26. The lens mount according to claim 11, wherein a dimension of a cutaway between the third and fourth claw portions in the circumferential direction is larger than a dimension of a cutaway between the fourth and fifth claw portions in the circumferential direction.

27. The lens mount according to claim 26, wherein $$60° \leq \theta 10 \leq 100°$$

$$60° \leq \theta 20 \leq 100°$$

$$60° \leq \theta 00 \leq 100°, \text{ and}$$

$$60° \leq \theta L \leq 100°$$

are satisfied, where, among internal angles of a quadrangle formed by connecting a center of the opposite side claw portion, a center of the second claw portion, a center of the first claw portion, and the center of the restricted portion, θ10 is an internal angle in which a vertex thereof is the center of the opposite side claw portion, θ20 is an internal angle in which a vertex thereof is the center of the second claw portion, θ30 is an internal angle in which a vertex thereof is the center of the first claw portion, and θL is an internal angle in which a vertex thereof is the center of the restricted portion.

28. The lens mount according to claim 27, wherein $$65° \leq \theta 10 \leq 100°$$

$$65° \leq \theta 20 \leq 100°$$

$$65° \leq \theta 30 \leq 100°, \text{ and}$$

$$65° \leq \theta L \leq 100°$$

are satisfied.

29. The lens mount according to claim 28, wherein $$70° < \theta 10 \leq 100°$$

$$70° < \theta 20 \leq 100°$$

$$70° < \theta 30 < 100°, \text{ and}$$

$$70° < \theta L < 100°$$

are satisfied.

30. The lens mount according to claim 11, wherein, when the lens mount mounted to the camera mount is viewed in the central axis direction, among sides of a hexagon passing through both ends of a region where the first and third claw portions overlap each other, both ends of a region where the second and fourth claw portions overlap each other, and both ends of a region where the sixth and fifth claw portions overlap each other, the side nearest to the restricting portion is the longest.

31. The lens mount according to claim 1, wherein a dimension of the second claw portion in the circumferential direction is larger than a dimension of the opposite side claw portion in the circumferential direction.

32. The lens mount according to claim 1, wherein when viewed in the central axis direction, the first reference line and opposite side claw portion overlap each other.

33. The lens mount according to claim 1, wherein $$0.6 \leq \theta 3 / \theta 4 \leq 0.9$$

is satisfied, where θ3 is an angle formed between the first reference line and a line passing through the central axis and an end of the opposite side claw portion that is on the side of the first claw portion, and θ4 is an angle formed between the first reference line and a line passing through the central axis and an end of the opposite side claw portion that is on the side of the second claw portion.

34. The lens mount according to claim 33, wherein $$0.6 \leq \theta 3/\theta 4 \leq 0.8$$

is satisfied.

35. The lens mount according to claim 1, wherein a dimension of a cutaway between the first and second claw portions in the circumferential direction is larger than both of a dimension of a cutaway between the first claw portion and opposite side claw portion and a dimension of a cutaway between the second claw portion and opposite side claw portion in the circumferential direction.

36. The lens mount according to claim 1, further comprising a plurality of second terminals configured to contact a plurality of first terminals included in the camera mount,
wherein the plurality of second terminals are provided at positions that are different from positions of the plurality of second bayonet claw portions.

37. The lens mount according to claim 36, wherein the plurality of second terminals includes a terminal configured to be used to determine whether the lens mount is mounted to the camera mount.

38. The lens mount according to claim 36, wherein the plurality of second terminals includes a terminal configured to be used to distinguish a type of an accessory including the lens mount mounted to the camera mount.

39. The lens mount according to claim 36, wherein the plurality of second terminals includes:
a terminal configured to connect an image pickup apparatus including the camera mount and a communication control system of an accessory including the lens mount to ground, and
a terminal configured to supply power, used in an operation of the communication control system, from the image pickup apparatus to the accessory.

40. The lens mount according to claim 36, wherein the plurality of second terminals includes:
a terminal configured to connect an image pickup apparatus including the camera mount and a mechanical drive system of an accessory including the lens mount to the ground, and a terminal configured to supply power, used in the operation of the mechanical drive system, from the image pickup apparatus to the accessory.

41. The lens mount according to claim 36,
wherein the plurality of second terminals includes a first communication unit configured to perform a first communication, and
wherein the first communication unit includes:
a terminal configured to communicate a clock signal that is output from the camera mount to the lens mount,
a terminal configured to enable two-way communication between the camera mount and the lens mount, and
a terminal configured to communicate data that is output from the lens mount to the camera mount.

42. The lens mount according to claim 41,
wherein the plurality of second terminals includes a second communication unit configured to perform a second communication independent of the first communication, and
wherein the second communication unit includes a terminal configured to communicate data that is output from the lens mount to the camera mount.

43. The lens mount according to claim 42,
wherein the plurality of second terminals includes a third communication unit configured to perform a third communication independent of the first communication and the second communication, and
wherein the third communication unit includes:
a terminal configured to facilitate two-way communication between the camera mount and the lens mount, and
a terminal configured to communicate a communication request signal between the camera mount and the lens mount.

44. An accessory comprising:
the lens mount according to claim 1; and
a lens.

45. An accessory comprising the lens mount according to claim 1, wherein the accessory is configured to be detachably mountable to a lens apparatus.

46. The accessory according to claim 45, further comprising a plurality of third bayonet claw portions configured to enable engagement with the lens apparatus,
wherein an angle of a first cutaway adjacent to the opposite side bayonet claw portion in a circumferential direction is smaller than an angle of one of the plurality of third bayonet claw portions that overlaps to the first cutaway when viewed in the central axis direction, and
wherein an angle of a second cutaway adjacent to the opposite side bayonet claw portion in the circumferential direction is smaller than an angle of one of the plurality of third bayonet claw portions that overlaps to the second cutaway when viewed in the central axis direction.

47. The accessory according to claim 45, further comprising a third mount portion including a plurality of third bayonet claw portions configured to enable engagement with the lens apparatus,
wherein an angle of a first cutaway adjacent to the opposite side bayonet claw portion in a circumferential direction is smaller than an angle of each of the plurality of third bayonet claw portions in the circumferential direction, and
wherein an angle of a second cutaway adjacent to the opposite side bayonet claw portion in a circumferential direction is smaller than an angle of each of the plurality of third bayonet claw portions in the circumferential direction.

48. The accessory according to claim 45, further comprising a third mount portion including a plurality of third bayonet claw portions configured to enable engagement with the lens apparatus,
wherein, when viewed in the central axis direction, an angle between most apart ends of the opposite side bayonet claw portion and the first concave portion side bayonet claw portion in a circumferential direction, is larger than an angle between most apart ends of a first cutaway of the third mount portion that overlaps to the opposite side bayonet claw portion and a second cutaway of the third mount portion that overlaps to the first concave portion side bayonet claw portion in the circumferential direction.

49. The accessory according to claim 45, further comprising a third mount portion including a plurality of third bayonet claw portions configured to enable engagement with the lens apparatus,
wherein, when viewed in the central axis direction, an angle between most apart ends of a first cutaway of the third mount portion that overlaps to the opposite side bayonet claw portion and a second cutaway of the third mount portion that overlaps to the first concave portion side bayonet claw portion in a circumferential direction, is smaller than an angle between most apart ends of a two second bayonet claw portions adjacent with each other among the plurality of second bayonet claw portions in the circumferential direction, and wherein, when viewed in the central axis direction, an angle between most apart ends of the first cutaway and a third cutaway of the third mount portion that overlaps to the second concave portion side bayonet claw portion in the circumferential direction, is smaller than the angle between most apart ends of the two second bayonet claw portions.

50. A camera mount comprising:

a plurality of first bayonet claw portions; and a restricting portion, wherein the camera mount is configured to be detachably mountable to the lens mount according to claim 1.

51. An image pickup apparatus comprising:

the camera mount according to claim 50; and an image pickup element.

\* \* \* \* \*